United States Patent
Krishnaiah

(10) Patent No.: US 12,126,682 B2
(45) Date of Patent: *Oct. 22, 2024

(54) METHODS, SYSTEMS, APPARATUSES, AND DEVICES FOR FACILITATING MANAGING CLOUD STORAGE FOR OPERATIONS

(71) Applicant: Venkatesh Kumar Krishnaiah, Chantilly, VA (US)

(72) Inventor: Venkatesh Kumar Krishnaiah, Chantilly, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/651,237

(22) Filed: Apr. 30, 2024

(65) Prior Publication Data
US 2024/0283846 A1  Aug. 22, 2024

Related U.S. Application Data

(63) Continuation-in-part of application No. 18/298,177, filed on Apr. 10, 2023, now Pat. No. 12,028,274,
(Continued)

(51) Int. Cl.
*H04L 67/1097* (2022.01)
*G06F 16/28* (2019.01)

(52) U.S. Cl.
CPC ........ *H04L 67/1097* (2013.01); *G06F 16/285* (2019.01)

(58) Field of Classification Search
CPC .......................... H04L 67/1097; G06F 16/285
See application file for complete search history.

(56) References Cited

U.S. PATENT DOCUMENTS

2010/0050172 A1   2/2010   Ferris
2011/0313902 A1  12/2011   Liu et al.
(Continued)

FOREIGN PATENT DOCUMENTS

CN     109660366 A    2/2022
JP    2017068296 A    4/2017
(Continued)

OTHER PUBLICATIONS

"Breaking Down the Cost of Cloud Computing in 2023", retrieved from the internet retrieved on Apr. 6, 2023; <URL: https://www.techtarget.com/whatis/Breaking-Down-the-Cost-of-Cloud-Computing>.
(Continued)

*Primary Examiner* — Farzana B Huq

(57) ABSTRACT

A method for facilitating managing cloud storage for operations includes obtaining account information associated with a cloud account, analyzing the account information using a machine learning model, obtaining storage data corresponding to categories from the account information based on the analyzing, determining a value for a parameter associated with a utilization of the cloud storage resource based on the storage data, determining an action required to be implemented for the cloud account based on the determining, generating a cloud account controlling command for implementing the action for the cloud account based on the action, transmitting the cloud account controlling command to a cloud platform device, and storing the account information.

16 Claims, 35 Drawing Sheets

Related U.S. Application Data which is a continuation-in-part of application No. PCT/US2021/048091, filed on Aug. 27, 2021.

(60) Provisional application No. 63/561,639, filed on Mar. 5, 2024, provisional application No. 63/553,995, filed on Feb. 15, 2024, provisional application No. 63/230,416, filed on Aug. 6, 2021.

(56) References Cited

U.S. PATENT DOCUMENTS

| | | | |
|---|---|---|---|
| 2012/0101952 A1 | 4/2012 | Raleigh et al. | |
| 2012/0124211 A1 | 5/2012 | Kampas et al. | |
| 2015/0067171 A1* | 3/2015 | Yum | H04L 67/562 |
| | | | 709/226 |
| 2016/0034835 A1 | 2/2016 | Levi et al. | |
| 2018/0077029 A1 | 3/2018 | Mittal et al. | |
| 2019/0171966 A1* | 6/2019 | Rangasamy | G06F 11/3006 |
| 2019/0317821 A1 | 10/2019 | O'Neal et al. | |
| 2020/0073717 A1 | 3/2020 | Hari | |
| 2021/0044540 A1 | 2/2021 | Rushton et al. | |
| 2021/0099363 A1 | 4/2021 | Leemet et al. | |

FOREIGN PATENT DOCUMENTS

| | | |
|---|---|---|
| KR | 101987664 B1 | 6/2019 |
| WO | 2018203634 A1 | 11/2018 |

OTHER PUBLICATIONS

"Multi-Cloud Budgeting and Chargeback in Xi Beam" retrieved from the internet retrieved on Apr. 6, 2023; <URL: https://www.nutanix.com/blog/multi-cloud-chargeback-budgeting>.

"How to Manage and Optimize Costs of Public Cloud IaaS and PaaS" retrieved from the internet, retrieved on Apr. 6, 2023; <URL: https://www.gartner.com/en/documents/3982411>.

"Overview" retrieved from the internet, retrieved on Apr. 6, 2023; <URL: https://www.fingent.com/usecases/artificial-intelligence-for-faster-project-cost-estimation/>.

"Cloud Cost Pro Instant savings with ML-powered multi-cloud cost optimization and FinOps" retrieved from the internet, retrieved on Apr. 30, 2024; <URL: https://tinyurl.com/ypu4642y>.

* cited by examiner

METHODS, SYSTEMS, APPARATUSES, AND DEVICES FOR FACILITATING MANAGING CLOUD STORAGE FOR OPERATIONS

REFERENCE TO RELATED APPLICATIONS

This application claims the benefit of U.S. Provisional Patent Application No. 63/561,639, titled "METHODS AND SYSTEMS OF FACILITATING MANAGING A CLOUD STORAGE BUDGET USING ARTIFICIAL INTELLIGENCE", filed Mar. 5, 2024, which is incorporated by reference herein in its entirety. In addition, this application claims the benefit of U.S. Provisional Patent Application No. 63/553,995, titled "METHODS AND SYSTEMS FOR FACILITATING CLOUD BUDGET MANAGEMENT BASED ON ARTIFICIAL INTELLIGENCE", filed Feb. 15, 2024, which is incorporated by reference herein in its entirety. In addition, this application is a continuation in part of U.S. patent application Ser. No. 18/298,177, filed Apr. 10, 2023. The U.S. patent application Ser. No. 18/298,177 is a continuation in part of PCT/US21/48091, filed Aug. 27, 2021, which claims the benefit of U.S. Provisional Patent Application No. 63/230,416, filed Aug. 6, 2021, each of which is incorporated by reference herein in its entirety.

FIELD OF THE INVENTION

Generally, the present disclosure relates to the field of data processing. More specifically, the present disclosure relates to methods, systems, apparatuses, and devices for facilitating and managing cloud storage for operations.

BACKGROUND OF THE INVENTION

Historically, cloud storage has been celebrated for its remarkable scalability and ease of access, qualities that have fostered a widespread 'set-and-forget' mentality among users. This perception, when combined with the seemingly limitless nature of cloud resources, has frequently led to significant operational inefficiencies. These include the over-provisioning of resources, underutilization of allocated storage, and a lack of monitoring for growth in storage needs, which in turn have contributed to hidden creeping costs that stealthily exacerbate financial burdens on organizations. Such inefficiencies not only escalate operational costs but also raise environmental concerns due to the energy consumption and carbon footprint associated with maintaining and powering extensive data centers.

The advent and exponential growth in the use of cloud storage have introduced formidable challenges in managing storage resources efficiently, exacerbating the issue of billion-dollar cloud waste and unnecessary environmental impact. Both federal agencies and commercial entities grapple with the complexities of navigating through multi-cloud storage environments, where the nuanced dynamics of hidden creeping costs significantly contribute to overall inefficiency and financial drain. Traditional cloud storage management solutions have proven inadequate, lacking the necessary insights, flexibility, and control to effectively counter these challenges. Moreover, the absence of a unified console for monitoring storage statistics and growth rates across multiple clouds further complicates the ability to implement proactive measures for judicious resource management. As a result, organizations are often ill-equipped to address the dual challenges of optimizing cloud storage efficiency and curtailing unnecessary expenditures, leading to scenarios where the potential for scalable and accessible cloud storage paradoxically becomes a source of significant financial and operational inefficiency. Furthermore, current technologies do not bridge the existing gaps in cloud storage management—especially one that methodically uncovers and addresses hidden creeping costs.

Therefore, there is a need for improved methods, systems, apparatuses, and devices for facilitating managing cloud storage for operations that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating managing cloud storage for operations, in accordance with some embodiments. Accordingly, the method may include a step of obtaining, using a processing device, at least one account information associated with at least one cloud account of at least one cloud platform. Further, the at least one cloud account may be associated with at least one operation. Further, the method may include a step of analyzing, using the processing device, the at least one account information using at least one machine learning model. Further, the at least one machine learning model may include a first machine learning model. Further, the first machine learning model may be configured for identifying at least one of a pattern, a trend, and a correlation in the at least one account information. Further, the first machine learning model may be configured for classifying a cloud storage resource of the at least one cloud account into one or more categories based on the identifying of at least one of the pattern, the trend, and the correlation. Further, the method may include a step of obtaining, using the processing device, one or more storage data corresponding to the one or more categories from the at least one account information based on the analyzing of the at least one account information. Further, the method may include a step of determining, using the processing device, at least one value for at least one parameter associated with a utilization of the cloud storage resource based on the one or more storage data. Further, the method may include a step of determining, using the processing device, at least one action required to be implemented for the at least one cloud account based on the determining of the at least one value of the at least one parameter. Further, the method may include a step of generating, using the processing device, at least one cloud account controlling command for implementing the at least one action for the at least one cloud account based on the at least one action. Further, the method may include a step of transmitting, using a communication device, the at least one cloud account controlling command to at least one cloud platform device associated with the at least one cloud platform. Further, the method may include a step of storing, using a storage device, the at least one account information.

Further disclosed herein is a system for facilitating managing cloud storage for operations, in accordance with some embodiments. Accordingly, the system may include a processing device, a communication device, and a storage device. Further, the processing device may be configured for obtaining at least one account information associated with at least one cloud account of at least one cloud platform. Further, the at least one cloud account may be associated with at least one operation. Further, the processing device may be configured for analyzing the at least one account information using at least one machine learning model. Further, the at least one machine learning model may include a first machine learning model. Further, the first machine learning model may be configured for identifying at least one of a pattern, a trend, and a correlation in the at least one account information. Further, the first machine learning model may be configured for classifying a cloud storage resource of the at least one cloud account into one or more categories based on the identifying of at least one of the pattern, the trend, and the correlation. Further, the processing device may be configured for obtaining one or more storage data corresponding to the one or more categories from the at least one account information based on the analyzing of the at least one account information. Further, the processing device may be configured for determining at least one value for at least one parameter associated with a utilization of the cloud storage resource based on the one or more storage data. Further, the processing device may be configured for determining at least one action required to be implemented for the at least one cloud account based on the determining of the at least one value of the at least one parameter. Further, the processing device may be configured for generating at least one cloud account controlling command for implementing the at least one action for the at least one cloud account based on the at least one action. Further, the communication device may be communicatively coupled with the processing device. Further, the communication device may be configured for transmitting the at least one cloud account controlling command to at least one cloud platform device associated with the at least one cloud platform. Further, the storage device may be communicatively coupled with the communication device. Further, the storage device may be configured for storing the at least one account information.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
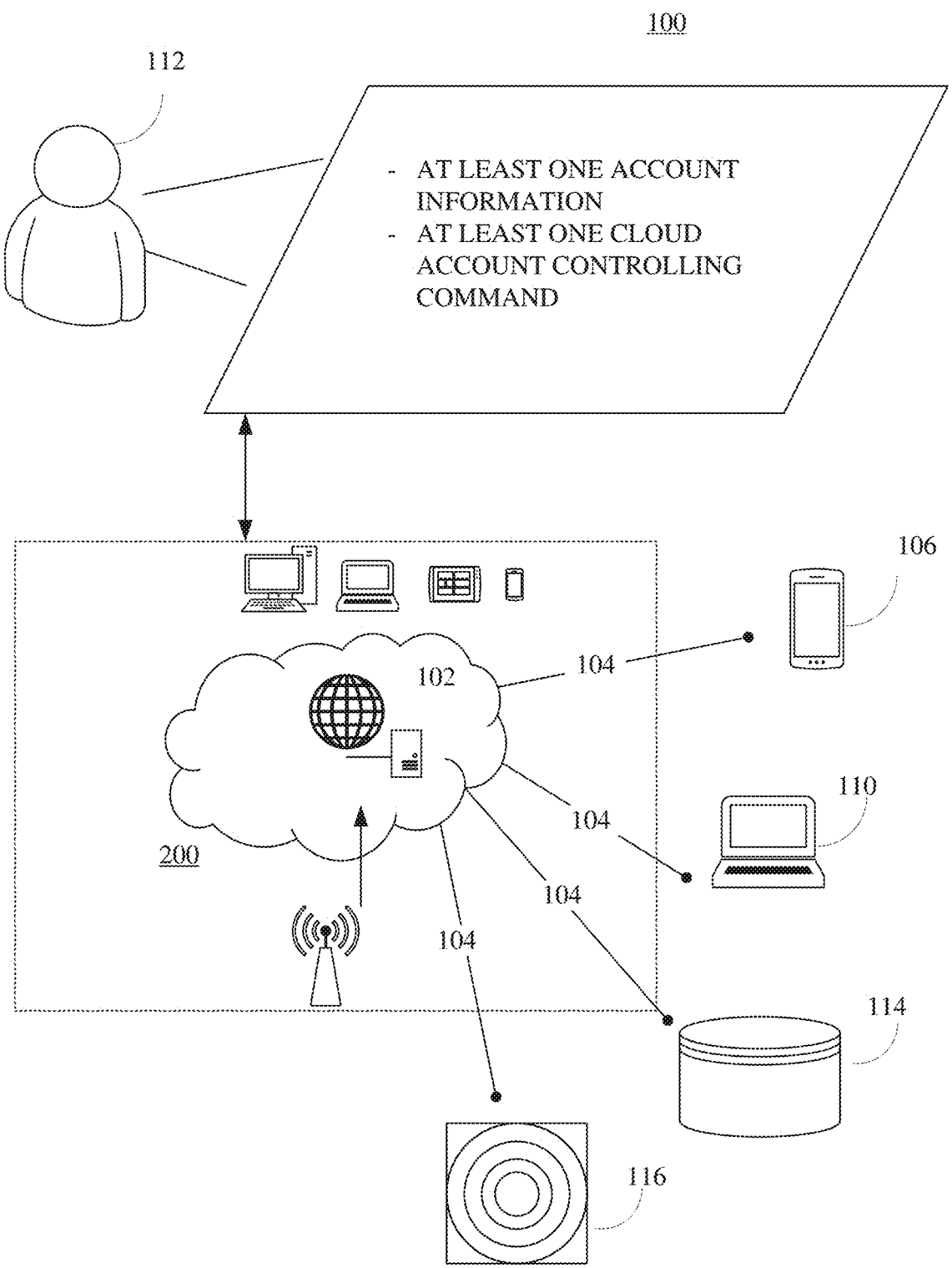
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating managing cloud storage for operations, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state (e.g. motion, direction of motion, orientation, speed, velocity, acceleration, trajectory, etc.) of the device corresponding to the performance of the one or more steps, and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods, systems, apparatuses, and devices for facilitating managing cloud storage for operations.

Further, the present disclosure describes a system and a method for facilitating controlling and managing cloud usage costs incurred by cloud accounts for using cloud resources of a cloud server. The disclosed system may include a centralized cloud usage-cost control management system of setting up one or more cloud account budgets, controlling and monitoring the usage cost, limiting resource usage by a given threshold, and facilitating Information Technology (IT) cloud budget planning. The disclosed system may be configured to control multiple cloud account budgets across multiple cloud providers interactively over the defined period from a centralized interface. The disclosed system may be configured to set up the allocated budget for the cloud account for a given period or financial year set by the enterprise budget team. The System monitors the budget and controls the cloud usage cost to help the organization manage cloud usage costs on the allocated budget for the given period or execute fixed price cloud usage-cost projects. The System monitors monthly usage costs and sends alerts to the administrator and/or product owner if the usage costs exceed threshold levels on the cloud usage cost. Further, the disclosed system may be configured to control the cloud usage cost and not to initiate cloud resources unless account usage cost is brought back to below threshold levels or overriding set thresholds by adding funds or exceptions. Further, the disclosed system may be configured to provide Artificial Intelligence (AI)/Machine Learning (ML) based budget estimation for any given period or fiscal year based on similar workloads and/or enterprise historical usage-cost data. This estimation is used for IT cloud budget planning, forecast cloud usage costs, and cloud cost and budget management across cloud accounts. Further, the disclosed system may be configured to generate various reports on the show back and/or chargeback, IT cloud budget planning, budget planner, AI-based multi-cloud cost savings recommendation, etc.

Further, the disclosed system may be associated with a centralized cloud budget planner. The disclosed system may be associated with a unified management console to plan, manage, and control cloud usage cost spending of products or cloud applications from development to Operation and Maintenance (O&M). The disclosed system is configurable to set up multi-level budget thresholds and alerts across all the cloud accounts to notify if the set budget cost reached the threshold on any given period. Suppose the set budget reached a critical threshold. In that case, the system restricts from spinning of more cloud resources in that cloud account or subscription. Upon reaching a critical budget threshold, the system alerts the application team, who must then remediate existing resources contributing to high costs to maintain spending within the set limit for that period. Cloud usage costs may surge beyond the allocated budget threshold for various reasons. Developers or application teams run multiple environments without shutting down unwanted environments or run numerous test resources or spin oversized resources, or maybe forgotten resources. These unwanted resources may ramp up the usage cost, preventing recovery of the metered cost, which impacts project execution, and deliverables, and creates funding chaos.

Further, the disclosed system may be configured to allow overriding the budget amount during any given period due to changes in application design or requirements or funding or any negations to override the critical threshold point, allowing the reset to new threshold levels. If a project or product requires restructuring of the whole budget based on the application design changes, the system may reconfigure the budget at any time.

Further, the disclosed system may be configured to plan, manage, and control the allocated budget for the project or product cloud accounts and maintain the applications over the multi-cloud infrastructure ecosystem. Further, the disclosed system may be configured to collect all the organization's cloud accounts from the different cloud providers' master/payer accounts, classify the organizational accounts based on the Cloud Service Providers (CSP), and associate the product or project information with the accounts, and maps the associated charge code. Through a unified console, the disclosed system may be configured to create a budget plan for an account, manage a budget plan, and create a new budget plan for the entire portfolio of cloud accounts for a given period or fiscal year. Budget and cost control systems can be implemented on any virtual machine, or server, or provided as software as a service from a remote server as a managed service. The system has a unified interface to log in and manage the entire enterprise's multi-cloud accounts, cost control, and budget planning system. The unified interface console can be accessed through an Internet web browser from a computer device, mobile phone, tablet, or any device with a compatible internet web browser.

Before access to the system, a user may log in to the system through a unified interface. As discussed before, administrative (admin) users, finance users, cloud infrastructure users, project/product/application users, or any stakeholder users can access the system. By default, one admin user exists for the initial system setup and configuration. The system allows a different type of user access to be created based on the duties as per information technology data security industry standard requirements. The system allows categorizing the users by admin, technical, and viewer, based on the access type that the individual access policies are attached to the different users. Admin users can access and set all the system-level configurations, page default, field default values, drop-down lists, data feed, cloud cross-account access, configure budget data, create users, and reset user passwords. Admin users also have all other users' permissions by default. Technical users can add, edit, update cloud accounts, set up a budget for an account, data feed, budget planner for the given period or fiscal year, report, and dashboard. The viewer user can view the shared dashboard, generate the reports, search, and view cloud-account information and budget information.

To set up a budget and/or budget planning or cost control for a cloud account, at least one cloud account, related business product/project information, and cloud vendor or reseller information should exist. First, cloud service provider, vendor, or reseller information is collected before importing respective cloud accounts and enterprise product information. The system allows capturing cloud service provider, vendor, or reseller information. The required vendor information is captured and can include, but is not limited to, vendor-name, contract period, contract number, service provider, task, scope, markup, admin fees, discount, credits, and status. This vendor information is automatically mapped to the vendor's name associated with the cloud accounts. If captured vendor details from the cloud account do not have the correct information, the system enables a manual mapping of the vendor information. This manual mapping takes precedence over automapping.

Cloud account information may be captured by manually entering each account information through the cloud account information entry page or by bulk import interface. Required cloud-account information is captured and can include, but is not limited to, account number, account-name, account-status, cloud service provider, vendor/reseller name, creation date, organization group, and join method. For bulk account information, imports can be uploaded through Comma-Separated Values (CSV) format files. This bulk account information is retrieved and exported from resellers' master or payer accounts or can be created manually in a CSV format. If an account is already present during bulk account import, those accounts are not imported, and the system creates a rejected duplicate list for further review.

Most organizations have a broader Business Product Components classification to view the budget and IT spending by business area, components, portfolio, product, product line, cyber identification (ID), etc. The system also allows to input organization-specific bulk product information import via CSV format. The system captures enterprise-specific business product information through the product information entry page. The required product/project information is captured and can include, but is not limited to, project ID, Project, business area, business unit, portfolio, product line, product owner, master system technical lead, cost center, etc. These system field names are dynamically configurable to align with enterprise or agency-specific business field names or naming standards through admin login. Once the accounts and business product information are captured in the system, the system automatically maps the product name associated with the cloud account using the account name. For example, when the cloud account name is not aligned with the business product name or any changes in the business-naming conventions, the system allows manual mapping of the product name to account ID. Manual mapping overrides auto mapping to avoid ambiguity.

Further, the system allows input of any vendor's markups, administration fees, discounts, and credits associated and/or negotiated from the vendor, reseller, or cloud service provider. These fees, discounts, and credits are part of budget formulation on top of cloud service provider usage costs. To accurately forecast budget planning and monitoring budget burndown rate, the system allows vendor fees and discounts to be included in part of budget planning and cost control on cloud accounts. By enabling markup, discounts, and credits as part of the budget formulation, the system accurately tracks the organization's cloud IT spending.

Further, the system has the feature to normalize the billing and utilize the data to remove duplicate tags, misspelled tags, assign missing tags to categorize, resources grouping, resource automation, security management, resource triggers, alerts, group products, and map the resources to product or project the resources belong to. This feature aligns with organization resource tag classification if there are any misaligned or untagged tags resources to track accurate budget and cost tracking. Further, the disclosed system may be configured to allow adding additional tags to track by environment, vendor, external/internal, etc., to help track budget spending by the environment, vendor, external/internal, etc. Further, the disclosed system may be configured to allow to enter tag-mapping manually or bulk upload through to a tag and mapping interface.

Advanced charge code mapping allows tracking the budget and burn rate of the product or project by the project, environment, phases, and releases by weekly, monthly, yearly, and even by Agile Sprints levels. These financial reports are also to be used for the show back or chargeback. Further, the disclosed system may be configured to allow entering the organization specific charge code through the chargeback interface. The required charge code information is captured and can include, but is not limited to, project name, program name, account, start date, end date, etc.

After capturing cloud accounts, vendor information, and product information, the system is ready to create a budget for the cloud accounts and/or generate a budget plan for any given period. The system allows the creation of a budget for an account for a given period and/or create a budget plan for a given period or fiscal year. To create a budget for an account, an account from the existing account list is chosen, and budget details are entered including, but not limited to, start date, end date, allocated or computed budget amount for the period, warning threshold, and critical threshold. Once all required budget information is entered, the system may generate a monthly budget plan for the account before pushing the budget information relevant to the cloud service provider account. The budget is validated and submitted to enforce the budget governance on that cloud account. Once the budget is submitted, the system may generate a schedule via the budget scheduler module to push the budget schedule to the respective cloud account. On the cloud account side, once the cloud account receives new or changes in the budget schedule, the serverless budget governance agent may execute the budget schedule and set all required budget parameters to that cloud account. After successful budget governance is set to the account, the agent validates and sends the budget status back to the budget and cost control system to make sure the budget values set at the cloud account align with the budget values set on the system. After receiving the status, the budget scheduler validates the feedback received from the cloud account versus the budget schedule in the system. If there is any misalignment from the budget set at the cloud account, the budget scheduler engine pushes the schedule again. The schedule engine tries several times before raising the deviation or error notice at the panel or in the schedule status report. If the budget schedule engine does not receive feedback from the cloud account, the schedule engine tries multiple times before raising an alert or notice at the interface panel and marks that budget as failed to set.

Once the budget is set, the schedule engine periodically pulls the budget information from all the cloud accounts to make sure the budget information aligns with the budget set in the system. If any deviation is found, the budget scheduler pushes the schedule to that account to align with a set value. If there is any budget information access issue from the cloud account, the system sends alerts and generates an error report for validation and auditing purposes. This validation process helps to identify any changes in the cloud component, network-related issues, any deviation or manipulated budget at an account level, compromised account, or policy changes that caused budget and cost control to break. Any component or service may break due to the dynamic nature of the cloud service provider's managed resources, services, and/or any changes that occurred at the infrastructure level. Deviation from the budget set at the system compared to account-level budget due to manipulation or compromised cloud account can also be identified.

Further, the budget and cost control system allows configuring two levels of thresholds based on control preference. For example, the warning threshold can be set to send warning alerts on the budget amount spent. The critical threshold can be set to send a critical alert on the budget amount spent. An add-on feature on the critical threshold setting restricts the spin of more resources to control the cost until the usage cost consumption goes below the set critical threshold value. This feature is more beneficial for the development environment to keep cost control on the projected budget burn rate on the allocated funds. For example, if a warning threshold is set at 70% on the allocated account budget, the system sends the warning alert to the respective team when the usage hits 70%. If a critical threshold is set at 90% on the allocated account budget, a critical alert is sent when the usage hits 90%. Suppose the critical threshold along with the resource restricts feature is enabled. In that case, the system sends a critical alert and stops spinning more resources on that account to control the cost until the usage cost consumption goes below the set critical threshold value.

Further, the system allows changing the budget which has been already created or in place for any changes in the project funding, budget schedules, and architectural changes that affect the usage cost and override the critical threshold for the given period. If there are any changes in the project funding or budget, the system allows updating the new amount on the existing budget. If there is a change in the schedule and the amount, the system enables make those changes, and those updated budget schedules are pushed to the appropriate account. One of the system's main features is to enter the override amount on the critical threshold that has been triggered. For example, a critical alert is triggered when the budget burn-rate reaches 90% of the monthly set budget, the cloud account is restricted from spinning more resources. In this scenario, the system allows overriding of the budget amount by adding the budget amount for that month. This feature avoids a deadlock scenario on the cloud account to override resource spin restriction. There are several common scenarios in the development environment to spin more resources than required which are not anticipated during the project planning and design phase. Here are a few scenarios that burn up the allocated monthly budget: (1) underestimating resources or capacity needed during the design phase, (2) forgetting resources that are not noticed, which are being charged, and consume the allocated budget, (3) spinning oversized resources than required for testing purposes, and (4) creating too many test resources and/or resource stacks that are not shut down and are not required.

Further, the disclosed system may be configured to allow the creation of a budget planner for the fiscal year or any given period. This budget planner monitors budget burn-down cost, sends threshold alerts, controls cloud usage cost, and also restricts the cloud account to not allow more resources to be brought up to avoid usage costs beyond the allocated budget. In the system, budget planning can be created in three methods, namely, (1) creating a budget plan for an individual account through a budget planning interface, (2) creating a new budget plan from the previously existing budget year/period plan, or (3) creating a new budget plan through AI-based forecasted budget estimation. The second method may include creating a new budget plan from the previously existing budget year/period plan through the budget planner interface page. By entering the new start and end dates for all accounts, the system allows selectively to change dates and other values like threshold, the budget amount, and so on for individual accounts. Once the new budget plan is published, the system enables it to save and/or save and publish. The new budget is active based on the start and end dates mentioned in the plan. Further, the third method may include creating a new AI-based forecasted budget estimation plan based on historical or last year's cost consumption through the budget planner interface page. By entering the new start and end dates for all accounts, the system allows selectively to change dates and other values like threshold, the budget amount, and so on for individual accounts. Once the new AI-based forecasted budget plan is updated, the system enables it to save and/or save and publish. The new budgeting is active based on the start and end dates mentioned in the plan.

Further, in an embodiment, the disclosed system may be configured to upload the bulk budget plan through CSV format for all cloud accounts or some cloud accounts. The existing budget for all cloud accounts is exported in CSV format. Then, the exported file is opened, and the new start and end dates are edited as well as the threshold percentage, the budget amount, and other values for the cloud accounts. The updated budget file is then imported into the system to publish the new budget. Further, in an embodiment, the disclosed system may be configured to create a budget plan in the CSV file for the cloud accounts that need to control budget and usage costs. To create a bulk budget plan for the cloud accounts, the cloud-account numbers and budget details are entered including, but not limited to, start date, end date, allocated budget amount for the period, warning-threshold in percentage, and critical-threshold in percentage. The newly created CSV file is uploaded to the system and saved before publishing the Budget. Furthermore, the system generates various finance, show back/chargeback, and IT budget plan reports, which play a crucial role in IT planning, cloud IT cost distribution, cloud infrastructure cost of ownership, and auditing. The system uses a ML algorithm to generate AI-based budget estimates for the next budget based on the usage cost consumption year.

Regarding cloud IT budget planning, analysts and managers have to reach out to various teams to pull the historical cloud usage-cost data for Total Cost of Ownership (TCO) analysis for the cloud IT planning. Capacity and forecast estimation need to be calculated for the application or project to compute accurate IT budget formulation. These calculations are often manual which can be time and resource consuming. To avoid this, the disclosed system may be configured to eliminate all these manual processes by providing AI-based budget estimate recommendations. The system also provides the provision to include markups, discounts, and credits from vendors and/or cloud resellers. This allows the system to provide the exact budget estimate recommendations required for the given period. In addition to AI-based budget estimate recommendations, the system can automatically generate cloud account budget estimation, forecasting, and planning for the next budget period or fiscal year. The engine for AI-based budget estimate recommendations could be built using any commercially available, fully managed services offered by cloud service providers, third-party vendors, or through proprietary systems developed in-house. Further, AI estimation services can utilize one or models generated using different methods including, but not limited to, machine learning, deep learning, predictive analytics, natural language processing, and intelligent data discovery. The different models for cost forecasting can be tuned from historical usage-cost data captured by the system on the cloud accounts. The system computes the data generated by the AI estimation service to provide budget estimation forecast recommendations for the given period or next budget cycle. Further, the disclosed system may be configured to generate several reports using the report and analytical engine. Using an analytical engine, the user can create and interact with visuals and tell data-driven stories. Some data points represent a significant event, and others represent a random occurrence. The analysis uncovers which data is worth investigating, based on what driving factors (key drivers) contributed to the event.

Further, the system has several cloud cost control features to control the cloud usage cost within the allocated fixed budget that the users can set through a unified cost control interface. This feature enables the organization to control the cost of fixed budget projects, applications, or services within the allocated funds. This cost management feature also enables control of cloud usage costs within the allocated or available budget and shuts down the cloud resources when not necessary. This unified interface eliminates the tedious job of logging into individual accounts and manually shutdown resources across multiple clouds to stop cloud resources to save on usage-cost. Using this unified interface, users can set or change the budget, budgeting period for the project/application, dynamically change the startup, and selectively shut down the any cloud resources based on the enterprise working hours, service level requirements (SLAs), or stop the resources as necessary.

Further, the main feature of the system is to remotely control usage costs by throttling endpoints on how much the enterprise wants to spend the funds or budget on a given period to provide services. This feature enables the organization to control how much customers can utilize the enterprise contents and/or services without hogging the application bandwidth or interrupting other customers who want to use the same services and not bring down the entire application. This handy feature for the organization enables control over funds and throttles the data miners on publicly disseminated information like historical labor statistics data, census data, research and national archives data, patent and trademark data, media content delivery, bulk download contents, etc.

The system also has an integrated visualization dashboard. The visualization dashboard is a graphical representation of data. A dashboard is a read-only snapshot of an analysis to share with other users for reporting purposes. A dashboard preserves the analysis configuration at the time of publishing, including filtering, parameters, controls, and sort order. The data used for the analysis is dynamic, and the visualization dashboard reflects the current data in the data sets used by the analysis. The system visualization dashboard consists of several visualization pages with associated reports. Some of the reports include but are not limited to, billing summary, tagged/untagged services usage cost, budget monitoring, budget burn rate on individual accounts and across all the accounts or organization level, AI-based anomaly detection, AI-based forecast, and AI-based multi-cloud, multi-account savings plan recommendation.

The billing summary includes a summary of consolidated cloud usage-cost at an organization level which shows usage-cost by account, associated project, and product as well as any chargeback over the selected period. Tagged/untagged services usage cost shows the usage of the different environments by accounts, by services with tags, or by untagged cloud resources (system, environment, business area, etc.). Budget monitoring includes high-level view of monitoring account usage by comparing it with the monthly budget allocated per account. The visuals show the comparison between the actual usage cost of an account versus the budget amount allocated to the account monthly. AI-based anomaly detection shows the outliers, spikes, or deviations in the usage cost or budget that fall outside a distribution pattern. Anomaly detection identifies the causations and correlations to enable users to make data-driven decisions. AI-based forecast shows key business metrics which are the costs for a forward period, which can be configured as per the requirement. Analytics insight is quick data interpretation that gives a high-level takeaway from the visuals the system creates. These insights enable the user to perform any computation, using customized wordings to provide context to the fields. AI-based multi-cloud, multi-account savings plan recommendation includes the most frequently used instance utilization types across all the cloud accounts breakdown by product/portfolio. These statistics help the organization generate purchase saving plan/reserved instance recommendations for targeted cloud resources like instances and RDS. This helps in potential savings on on-demand multi-cloud resource costs which are 30% to 70% higher than those of reserved instance purchases. Using these explorative analytics, the user can perform deep-dive analysis by drilling down to specific cloud resources, pricing, and other specifications. This offers the ability to monitor budget control, cost savings, and optimization. This also provides flexibility in cost comparison between multi-clouds for long term investments and savings plans. Further, the disclosed system may be integrated with an enterprise active directory to set up email notifications. The disclosed system may be configured to send email notifications and alerts to various users and teams such as sending the budget summary alert, soft and hard cap threshold alerts, burn-rate alerts, monthly finance reports, executive reports, etc.

Further, the present disclosure describes methods and systems of facilitating managing a cloud storage budget using artificial intelligence. Further, the disclosed system may be configured for comprehensive online management of cloud storage resources across multiple cloud platforms. Further, CloudThrottle, an exemplary embodiment of the disclosed system herein, may be configured to deliver a unified console view/dashboard designed to aggregate metrics and management controls for a diverse array of cloud storage types-objects, files, blocks/managed disks, database storage, snapshots, images, and volumes across different cloud environments within a single, integrated online platform. The disclosed system is particularly adept at addressing the critical challenge of hidden creeping costs, a predominant factor in cloud waste, by providing tools for the meticulous monitoring and proactive management of storage resources to mitigate unnecessary expenditures and inefficiencies. Tailored to meet the complex demands of both federal and commercial sectors, the disclosed system proposes a comprehensive solution for managing cloud storage expansion, enforcing budgetary control, and minimizing environmental impacts across multi-cloud environments. By enabling real-time visibility, analytics, and control over cloud storage with a focus on multi-cloud unification, CloudThrottle effectively confronts the issue of hidden creeping costs that contribute to significant cloud waste, offering a strategic and sustainable approach to efficient cloud storage management across various cloud platforms.

Further, the disclosed system may be configured to signify a transformative strategy in managing, allocating, and budgeting cloud storage resources across varied cloud environments. The disclosed system may be distinguished by its comprehensive approach, integrating a unified console/dashboard for real-time observability, an advanced operational workflow management system for seamless integration with organizational processes, and a suite of innovative features aimed at addressing the entirety of cloud storage management challenges, particularly the reduction of hidden creeping costs.

Further, the disclosed system may include an AI-driven predictive analytics and data collection engine. At the forefront, the system employs proprietary machine learning algorithms and advanced statistical models for the in-depth analysis of vast quantities of both historical and real-time cloud storage data. The predictive engine is adept at identifying patterns, forecasting future storage needs with unparalleled accuracy, and facilitating real-time monitoring and decision-making. Enhanced by advanced proprietary data collection techniques, CloudThrottle can access and analyze granular data across cloud platforms, surpassing traditional data gathering methods in efficiency and depth of insight.

Further, the disclosed system may provide a unified console/dashboard with enhanced centralized storage management. Central to the system, CloudThrottle offers a holistic view, amalgamating data from multiple cloud storage types and providing a rich suite of analytics and management tools. Further, the disclosed system supports strategic planning and informed decision-making by enabling visualization of storage metrics, monitoring growth rates, and tracking budget usage. Embedded within this console is a novel analytics engine that offers predictive insights and employs machine learning for dynamic classification and analysis of cloud storage data, ensuring cross-platform compatibility and operational benefits through technological innovation.

A critical component, the disclosed system introduces a sophisticated protocol for the governance of cloud storage resources and financial allocations, including automated overrun management, control workflows for real-time detection of usage excesses, and a dynamic approval process for resource expansion. This ensures strategic alignment of storage expansion with objectives and fiscal constraints.

Employing predictive analytics for trend detection, the disclosed system sets intelligent thresholds and alerts for proactive management. Further, the disclosed system integrates advanced budget management features, including proration, rollover, and budget override mechanisms, coupled with a strategic decision support system for resource allocation and cost management.

The system optimizes storage allocation and utilization, contributing to energy-efficient cloud computing practices and minimizing environmental impact. Further, the disclosed system also features integration capabilities with external observability platforms, enhancing monitoring, alerting, and performance optimization through adaptive learning mechanisms.

Further, in the first instance, the disclosed system may be used in advanced cloud storage management in federal and commercial sectors. Facing the complexities of managing escalating cloud storage costs within fixed budgets for the fiscal year, a federal agency and a multinational corporation in the commercial sector implement an advanced cloud storage management system. The disclosed system is designed to optimize storage growth rates and ensure compliance with their budgetary constraints, leveraging a unified console, sophisticated workflows, and real-time data capabilities as part of the ProActive Storage & Budget Observability (ProSBO) framework. Further, the disclosed system may provide a unified console that centralizes control over cloud storage across multiple providers and accounts, offering a comprehensive overview.

Real-Time Data: Further, the disclosed system provides immediate insights into storage usage and costs, enabling proactive management and optimization.

Multi-Cloud and Multi-Account Management: Further, the disclosed system integrates various storage types across multi-cloud environments for complete oversight.

Automated Workflows: Further, the disclosed system handles scenarios like budget caps being approached or exceeded, ensuring timely, automatic interventions.

Federal Agency Use Case: Further, the disclosed system may adhere to strict budgetary guidelines set by government regulations, ensuring cloud storage costs remain within the allocated budget while meeting operational demands.

In further embodiments, the present disclosure describes a method for facilitating advanced cloud storage management in federal sectors. Further, the method may include setting an initial storage quota based on past usage and anticipated needs, aligned with the fiscal year's budget. Further, the method may include growth rate and monitoring by establishing a conservative growth rate with a robust monitoring system to alert when usage nears set thresholds.

Further, the method may include regulatory compliance and reporting by maintaining storage usage and budgetary expenditures within federal standards, with transparent reporting for accountability.

Further, in a second instance, the disclosed system may be used in a commercial corporation. Further, the disclosed system may maximize cloud storage efficiency across departments to avoid budget overruns, supporting productivity and growth.

In further embodiments, the present disclosure describes a method for facilitating advanced cloud storage management in commercial corporations. Further, the method may include dynamic quota allocation that adjusts storage quotas dynamically based on real-time departmental usage and growth forecasts. Further, the method may include implementing a tiered alert system for quota approaches or exceedances, with immediate restrictions on further storage provisioning. Further, the method may include AI-driven forecasting by employing an AI predictive engine for accurate forecasting of storage needs, informing budget allocations and adjustments.

Both the Federal agency and the commercial corporation benefit from the system's capabilities, ensuring efficient, budget-compliant storage utilization. This approach enables:

Consolidated Monitoring and Management: The unified console simplifies management tasks, providing a single view of all cloud storage data.

Proactive and Automated Cost Control: Automated workflows and real-time data analytics prevent budget overruns by addressing potential issues immediately.

Strategic Forecasting and Planning: AI and machine learning offer insights into future storage requirements and budget impacts, allowing for strategic planning and timely adjustments.

The Federal agency and the multinational corporation achieved significant advancements in managing their cloud storage costs, effectively staying within their allocated budgets for the fiscal year. The deployment of the advanced management tool brings enhanced visibility and control, along with automated management capabilities, enabling both entities to adeptly navigate the intricacies of cloud storage across diverse cloud platforms and accounts. This strategic implementation addresses the critical issue of creeping cloud storage costs, which, if left unchecked, contribute to the billion-dollar phenomenon of cloud waste. By optimizing operational efficiency and ensuring strict adherence to budgetary constraints, the entities not only demonstrate fiscal responsibility and operational excellence but also contribute to mitigating the environmental impact associated with excessive and inefficient cloud resource utilization. Strategic resource allocation, informed by real-time data and AI-driven forecasting, plays a pivotal role in preventing unnecessary expenditure and reducing the carbon footprint of digital infrastructure, aligning with broader sustainability goals and promoting more responsible use of cloud technologies.

Further, in another instance, the disclosed system may allow a startup company to scale rapidly. Further, a startup specializing in video streaming services experiences rapid user growth. Their cloud storage needs are skyrocketing due to the vast amounts of video content being uploaded and streamed daily. The startup uses the ProActive Storage & Budget Observability (ProSBO) framework to manage its cloud storage more efficiently. They're particularly interested in preventing over-provisioning and overspending while ensuring they can scale up resources quickly to meet demand.

Further described herein is a method for allowing a startup to scale rapidly. Further, the method may include the startup beginning by aggregating historical data on their cloud storage use, focusing on storage types utilized for video content and metadata storage. Further, the method may include identifying patterns in usage spikes during certain hours and suggests optimizing storage allocation according to these patterns.

Based on the analysis, the method may include the startup setting storage budgets and thresholds that align with their growth strategy, ensuring they don't overspend on underutilized resources.

The present invention unveils a holistic framework for managing and optimizing cloud storage resources that is cloud-agnostic, supporting seamless operation across multiple cloud platforms including, but not limited to, object storage, file storage, block storage, and database storage. Further, the disclosed system introduces a sophisticated storage size control mechanism, proactive budget management strategies, and an AI-driven framework for enhanced storage and budget observability. Further, the disclosed system may address and mitigate prevalent challenges in cloud storage management, such as overutilization, inefficient budget allocation, and environmental impacts, across diverse cloud environments. By facilitating a cloud-agnostic approach, the disclosed system ensures compatibility and flexibility across different cloud providers, enabling users to optimize their cloud storage resources efficiently without being confined to a single cloud ecosystem. This multi-cloud support empowers organizations to achieve optimal storage allocation, utilization, and financial oversight, thereby enhancing operational efficiency, cost-effectiveness, and environmental sustainability in the management of cloud storage resources.

In today's digital landscape, organizations utilize a multi-cloud approach to meet their diverse data management needs, leveraging various cloud services for enhanced flexibility, cost optimization, and performance. This strategy necessitates a robust framework for categorizing cloud storage, controlling growth rates, and managing budgets effectively.

Cloud Storage Categorization: To navigate the complexities of multi-cloud environments, storage is broadly categorized into four main types, each designed to address specific requirements:

Object Storage: Tailored for vast amounts of unstructured data, providing scalability and enhanced data retrieval with metadata-rich objects.

File Storage: Offers a traditional hierarchical structure for easy file sharing and management across cloud platforms, ideal for web applications and collaboration tools.

Block Storage: Delivers high-performance, low-latency storage for database applications and virtual machine file systems, supporting dynamic resource allocation.

Database Storage: Manages structured data efficiently, accommodating both SQL and NoSQL databases, optimized for diverse workloads across cloud environments.

Cloud Storage Architecture Elements: The architecture incorporates data files, volumes, snapshots, and images to ensure data is organized, protected, and recoverable. Volumes act as virtual hard drives, snapshots provide robust data recovery options, and images facilitate streamlined infrastructure deployment.

Growth Control and Budget Management: Effective multi-cloud storage management requires meticulous control over storage growth and budget allocation. By establishing initial storage quotas and monitoring consumption, organizations can maintain system performance and avoid unnecessary expenditures. Growth rates are carefully predicted, with thresholds set to trigger alerts before limits are exceeded, ensuring proactive adjustments.

Budget management strategies are crucial for aligning financial resources with storage needs. Advanced budgeting features, such as proration and rollover, allow for precise allocation, tracking, and adjustment of funds in response to changing storage demands. This approach ensures efficient utilization of cloud storage resources, preventing overspending and fostering sustainability.

A strategic framework for categorizing and managing multi-cloud storage not only optimizes resource utilization but also ensures financial prudence. By controlling growth and meticulously managing budgets, organizations can leverage the benefits of a multi-cloud environment effectively, ensuring data is accessible, secure, and aligned with operational goals.

The present disclosure pertains to the field of cloud storage management, particularly focusing on the identification and mitigation of challenges associated with the utilization of cloud storage resources. It addresses the intricacies of cloud storage economics and environmental sustainability within digital infrastructure management.

Cloud storage has become a cornerstone of modern data management, offering scalable, flexible, and accessible solutions for storing vast amounts of data. Despite its advantages, the proliferation of cloud storage has introduced significant challenges, notably in its utilization practices. These challenges stem from a combination of user misconceptions, ease of access to cloud resources, and a lack of proactive management strategies, leading to overutilization, inefficient resource allocation, and unintended financial and environmental repercussions.

Misconceptions and Ease of Use: Further, the disclosed system identifies a prevalent misconception among users that cloud storage is an infinite resource, leading to a 'set-and-forget' mentality. This perception is compounded by user-friendly interfaces and the simplicity with which storage resources can be provisioned, exacerbating the tendency towards indiscriminate storage use without due consideration for the associated costs or capacity limitations.

Over-Provisioning in Development and Testing: A specific challenge arises from the practices of developers and IT professionals, particularly in testing environments, where there is a marked tendency to allocate more resources than necessary. This over-provisioning, often done as a precautionary measure to buffer against potential risks or performance issues, results in a significant allocation of unused or underutilized storage resources, leading to inefficiencies in resource utilization and budget allocation.

Excessive Utilization and Environmental Impact: The present disclosure further highlights the issue of excessive resource utilization, where non-essential services are left running, and multiple backups and copies are maintained without a strategic retention policy. Such practices not only inflate costs but also contribute to a larger environmental footprint due to the energy consumption and carbon emissions associated with maintaining and cooling the data centers that house these cloud storage resources.

Advanced Storage Growth Rate and Control System with Added Focus on Mitigating Hidden Costs: The Advanced Storage Growth Rate and Control System are engineered to meticulously manage the expansion of cloud storage within an organizational infrastructure, uniquely addressing the challenge of hidden creeping costs associated with cloud storage. This system ensures the efficient allocation of storage resources, upholding optimal performance across the cloud infrastructure, and enabling strategic, cost-effective capacity planning. By instituting a regimented approach to storage growth oversight, it adeptly curtails unexpected overutilization and its consequent performance degradation and expense escalation.

Key Components and Implementation with Examples

Initial Storage Quota Allocation Example: Initially, a cloud account is provisioned with a 1.2 TB storage quota, specifically chosen to meet the requirements of the applications it hosts. This precision in allocation is key to preventing wasteful resource allocation, one of the primary sources of hidden costs in cloud storage.

Growth Rate Determination and Monitoring with Example: The system sets an annual growth expectation of 10% for the cloud account, reflecting a calculated increase of 120 GB for the initially allocated 1.2 TB. This proactive stance on growth planning is vital for managing and mitigating unexpected spikes in storage needs, effectively addressing the issue of creeping costs.

Monthly Growth Computation and Monitoring Example: By dissecting the annual growth projection into a monthly increment of 10 GB, the system allows for detailed control and real-time monitoring of storage usage. This granularity facilitates immediate adjustments and serves as a critical measure against the accumulation of unforeseen costs.

Monitoring and Notification System with Example: Through its vigilant monitoring framework, the system issues alerts at critical consumption thresholds say, 65% (Preliminary Alert) and 85% (Critical Alert) of the monthly quota. This early notification mechanism plays a pivotal role in preemptively tackling storage overuse and the stealthy escalation of associated costs. Following a critical alert, stringent restrictions are put in place to prevent further storage additions, directly combating the issue of hidden costs.

Goals and Advantages

Predictability and Cost Transparency: The system not only introduces predictability into the cloud storage landscape but also ensures transparency in storage-related expenditures, significantly aiding organizations in avoiding the pitfall of hidden costs.

Strategic Cost Management: By preventing unanticipated increases in storage consumption, the system effectively minimizes the financial implications of cloud storage, directly addressing and mitigating the challenge of creeping costs.

Optimized System Performance: Maintaining storage growth within established limits guarantees that system performance is not compromised by excessive data storage, which can introduce latency and increase operational costs.

Proactive Cost Mitigation: The implementation of an early warning system is crucial for addressing potential storage-related challenges before they morph into complex, costly issues, thereby safeguarding against the hidden costs that can accrue from reactive management.

Implementation Strategy

Technical Integration and Administrative Protocols: By deploying monitoring tools that interface with cloud storage APIs and establishing clear policies for responding to threshold alerts, the system is seamlessly integrated into the cloud infrastructure, enabling effective management of storage resources and the proactive mitigation of hidden costs.

Continuous Review and Cost Adjustment: Regular evaluations of the storage growth rate and quota thresholds ensure that the system remains aligned with evolving business needs and storage requirements, enabling organizations to stay ahead of hidden costs through strategic planning and adjustments.

The Advanced Storage Growth Rate and Control System represents a comprehensive approach to managing cloud storage expansion. By establishing clear quotas, monitoring growth, and implementing effective notification and enforcement protocols, organizations can ensure that their cloud storage resources are utilized efficiently, cost-effectively, and within the operational parameters necessary for optimal performance and future scalability.

Advanced Cloud Storage Budget Management: CloudThrottle System with Examples

The CloudThrottle system is engineered for sophisticated financial management and budgeting of cloud storage resources, accommodating the complexity and diversity of cloud storage solutions. This system ensures precise and efficient financial oversight and resource allocation.

Key Features with Examples

Budget Proration: Example: If a project with significant storage needs with an annual budget of $120,000, CloudThrottle automatically prorates the first month's budget to $10,000, aligning the budget with actual storage resource usage, ensuring financial resources are aligned with storage consumption.

Budget Rollover: Imagine the company sets an annual cloud storage budget of $120,000, broken down into $10,000 monthly. If, after the first month, spending is only $8,000, leaving $2,000 unspent, this surplus is rolled over. Thus, instead of a reduced total of $110,000 for the next 11 months, the budget is now $112,000, or roughly $10,182 per month. In the second month, if spending further reduces to $6,000, creating a $4,000 surplus, this amount is also rolled over. So, the budget for the remaining 10 months increases to $106,000, or $10,600 per month. This rollover mechanism ensures efficient resource allocation and budget flexibility by carrying forward unspent funds.

Triggers and Thresholds: Example: An organization may set a soft cap at 75% of the monthly storage budget to initiate closer monitoring and a hard cap at 90% to freeze further storage allocation without senior management approval. This mechanism prevents budget overruns and promotes proactive financial management.

Dynamic Adjustments: Example: Facing an unexpected data influx, a project manager can request a budget increase, securing an additional $5,000 for the month to accommodate immediate storage needs. This demonstrates CloudThrottle's capability to adjust budgets dynamically in response to changing storage requirements.

Advantages with Contextual Clarification

Precision in Financial Oversight: By employing budget proration and rollover, CloudThrottle ensures that financial management is closely aligned with actual storage needs, reducing wastage and enhancing budgetary precision.

Efficient Resource Allocation: The system's ability to carry forward unused funds and adjust budgets dynamically ensures resources are allocated efficiently, matching expenditure with actual storage usage.

Cost Control: Using triggers and thresholds for budget control helps organizations maintain spending within predefined limits, offering a proactive approach to managing storage costs.

Adaptability: CloudThrottle's design to accommodate budget adjustments and overrides in response to unforeseen demands or strategic shifts underscores its adaptability, a critical feature in the dynamic cloud storage landscape.

Implementation and Real-world Application: Integrating CloudThrottle into an organization's cloud infrastructure involves setting up API connections and utilizing a dashboard for real-time monitoring of storage consumption and budget status. This integration allows for active regulation of storage utilization and budgeting, with continuous feedback mechanisms to refine and optimize performance based on real-world data and scenarios.

ProActive Storage & Budget Observability (ProSBO)

This framework represents a cutting-edge, AI-driven system designed to revolutionize the management of cloud storage allocation and financial planning within organizations. This framework is structured to provide an anticipatory, intelligent management layer over cloud storage resources, ensuring that both storage allocation and budgetary considerations are optimized for efficiency, cost-effectiveness, and scalability. Below are the key components and functionalities of the ProSBO framework:

AI-Based Predictive Management:

Storage Size and Allocation: ProSBO utilizes advanced algorithms and machine learning models to predict the necessary storage sizes and allocations based on historical data analysis, current trends, and future growth projections. This allows for the dynamic adjustment of storage resources in real-time, ensuring that storage capacities are always aligned with actual needs, preventing both underutilization and overallocation.

Budget Forecasting and Control: The framework integrates financial forecasting models that analyze past spending patterns, current allocations, and projected future needs to provide a comprehensive budget management solution. This includes setting budget thresholds, alerts for potential overruns, and mechanisms for adjusting allocations in response to changing storage and financial landscapes.

Thresholds and Alerts System:

Early Detection of Budget and Storage Issues: ProSBO employs a sophisticated monitoring system that continuously tracks storage utilization and spending against set thresholds. This early warning system is designed to alert administrators to potential issues before they escalate, allowing for proactive adjustments to storage allocations and budgetary allocations.

Adaptive Thresholds: Recognizing the dynamic nature of cloud storage needs, the framework allows for the flexible setting of thresholds that can be adapted over time based on evolving usage patterns, project requirements, and budgetary constraints.

Operational Flexibility and Scalability:

Responsive to Demand Fluctuations: ProSBO's AI engine is capable of adapting to sudden changes in demand, ensuring that storage resources can be scaled up or down as required without manual intervention. This flexibility is crucial for organizations dealing with variable workloads or rapid growth.

Optimization of Resources: By intelligently managing storage allocation and budgeting, ProSBO ensures that resources are utilized in the most efficient manner possible.

This includes minimizing wastage, optimizing performance, and reducing unnecessary costs associated with over-provisioning or underutilization.

Integration and Deployment:

Seamless Integration: The ProSBO framework is designed to integrate seamlessly with existing cloud infrastructure and management tools. This ensures that organizations can adopt the framework without significant disruptions to their current operations.

Microservice Architecture: The deployment of ProSBO is facilitated through a microservice architecture, enabling easy integration, scalability, and maintenance. This architectural choice ensures that the framework can be updated and improved over time without impacting the overall system.

Continuous Learning and Adaptation:

AI Predictive Engine: At the heart of ProSBO is an AI predictive engine that continually learns from new data, adjusting its models to better predict future storage and budgetary needs. This continuous learning process ensures that the system remains accurate and effective over time.

Feedback Loops: The framework incorporates feedback mechanisms to refine and optimize its predictions and recommendations. This iterative process ensures that the system evolves in response to changing storage trends, usage patterns, and organizational objectives.

The ProActive Storage & Budget Observability (ProSBO) framework provides organizations with a powerful tool for managing their cloud storage resources and financial planning more effectively. By leveraging AI and machine learning, ProSBO delivers a proactive, predictive, and adaptive solution that addresses not only current storage and budget needs but also anticipates future requirements, ensuring optimal performance and cost efficiency.

Process Flow and Framework Implementation: It is a dynamic resource allocation and operational workflow management system that encapsulates a comprehensive approach to cloud storage and budget management, leveraging predictive analytics and AI technologies. This approach is designed to optimize cloud storage utilization, prevent resource wastage, and ensure alignment with strategic objectives and budgetary constraints. The system is structured around two main components: a dynamic resource allocation system and an operational workflow management system.

Dynamic Resource Allocation System:

Automatic Adjustments and Control Measures: The system is equipped to automatically adjust provisioning levels and implement control measures in real-time. Further, the disclosed system uses predictive analytics to identify when storage usage is approaching or has exceeded strategic limits. This capability allows for preemptive actions to limit storage expansion, ensuring that resource usage remains within predefined boundaries and is optimized for cost and performance.

Intelligent Workflow Management: An integral part of the system is its ability to manage resource expansion approvals and enforce freezes on provisioning when critical conditions are detected. This workflow is designed to respond dynamically to changes in storage usage, with the flexibility to adjust resource allocations based on current needs and future projections, thereby preventing unnecessary resource wastage.

Operational Workflow Management System:

Automated Overrun Management and Control Workflow: This feature enables the system to detect storage usage overruns in real-time by continuously monitoring storage metrics against predictive forecasts and predefined thresholds. Upon identifying an overrun, the system initiates an automatic provisioning freeze to prevent further expansion, effectively managing resource utilization and avoiding cost overruns.

Dynamic Approval Process for Resource Expansion: When additional storage resources are needed, either due to impending demand or as a result of a freeze triggered by an overrun, the system activates a dynamic approval process. AI algorithms enhance this process, which evaluates the necessity and justification for the requested expansion, considering factors such as historical usage, projected needs, and budgetary constraints. The approval process involves multiple tiers of decision-makers, ensuring that requests are scrutinized and aligned with organizational goals. Manual override capabilities are provided for administrators to address exceptional circumstances, allowing for flexibility in decision-making while maintaining oversight and accountability.

Key Features of the System:

Real-time Detection and Analysis: Utilizes proprietary algorithms to analyze current usage metrics against historical data and predictive forecasts, enabling early detection of potential overruns.

Automated Control Mechanisms: Implements automatic freezes on provisioning when critical thresholds are reached, based on a rule-based logic that considers the severity and implications of the overrun.

Intelligent Notification System: Customizes alerts and notifications for administrators and stakeholders, ensuring timely and effective communication based on the urgency and role of the recipient.

AI-Enhanced Evaluation for Expansion Requests: Applies AI algorithms to assess requests for additional storage, considering various factors to justify the need for expansion while maintaining budgetary discipline.

Multi-Tiered Approval Process: Incorporates a structured approval hierarchy, allowing for comprehensive review and decision-making on resource expansion requests, with the flexibility for manual overrides by administrators in exceptional cases.

This comprehensive system provides a robust framework for managing cloud storage and budget overruns, integrating advanced technologies to optimize resource utilization, ensure cost efficiency, and maintain high system performance. Through its predictive capabilities and responsive workflows, the system addresses the dynamic and complex challenges of cloud storage management, offering a proactive solution to meet the evolving needs of organizations.

Further, the present disclosure describes a method for ProActive Storage & Budget Observability (ProSBO). Further, the method may include data aggregation and standardization. Further, the method may include gathering historical data pertaining to cloud storage use, focusing on key variables like storage types, access patterns, cost metrics, and related metadata. Further, the method may include implementing a rigorous data standardization pipeline to correct inconsistencies, remove outliers, and normalize features, preparing a cohesive dataset for detailed analysis and modeling.

Further, the method may include performing pattern recognition and analysis. Further, the method may include initiating an Exploratory Data Analysis (EDA) process to detect initial patterns, correlations, and trends within the data. Further, the method may include applying clustering algorithms to sort the data into distinct groups, highlighting common storage usage behaviors, and identifying any anomalies for further examination. Further, the method may include developing new features in the feature engineering phase, concentrating on temporal dynamics and usage frequency to enhance the model's predictive accuracy. Further, the method may include conducting a thorough feature selection procedure and choosing the most impactful features based on methods like importance scoring. Further, the method may include selecting the modeling approach—concentrating on time-series forecasting models like LSTM (Long Short-Term Memory) or SARIMA (Seasonal Autoregressive Integrated Moving Average) for their proficiency in modeling and predicting complex storage usage trends. Further, the method may include refining the selected model using advanced hyperparameter tuning techniques, including grid search or Bayesian optimization, to systematically explore and select the best parameters, thereby optimizing the model's performance. Further, the method may include model training and validation. Further, the method may include dividing the dataset into training and validation sets, using the training set for model fitting and the validation set for evaluating performance and training the model on the training data, and utilizing cross-validation methods to prevent overfitting and ensure model reliability.

Further, the method may include model assessment and iterative enhancement. Further, the method may include evaluating the model's predictive capability using the validation set, focusing on time-series forecasting accuracy metrics such as Mean Absolute Error (MAE), Root Mean Square Error (RMSE), and Mean Absolute Percentage Error (MAPE). Further, the method may include establishing a feedback loop for model improvement if the performance metrics fall short of set standards, and revisiting feature engineering and model parameter adjustments. Further, the method may include incorporating a continuous learning mechanism to integrate new data in real-time, allowing the model to adapt to the latest storage usage trends. Further, the method may include setting up a structured model retraining schedule, the frequency of which is determined by the dynamic nature of storage data and the need for precise forecasting. Further, the method may include integrating the refined model into a microservice architecture to ensure seamless compatibility with existing cloud management platforms. Further, the method may include executing a thorough deployment process, including extensive testing to confirm the model's predictive strength in various operational conditions. After deployment, the method may include launching a monitoring system to track the model's performance continuously, identifying any decline in accuracy. Further, the method may include implementing a routine optimization process involving regular model reviews and updates to adapt to changes in data trends or cloud storage technologies.

FIG. 1 is an illustration of an online platform 100 consistent with various embodiments of the present disclosure. By way of non-limiting example, the online platform 100 to facilitate managing cloud storage for operations may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
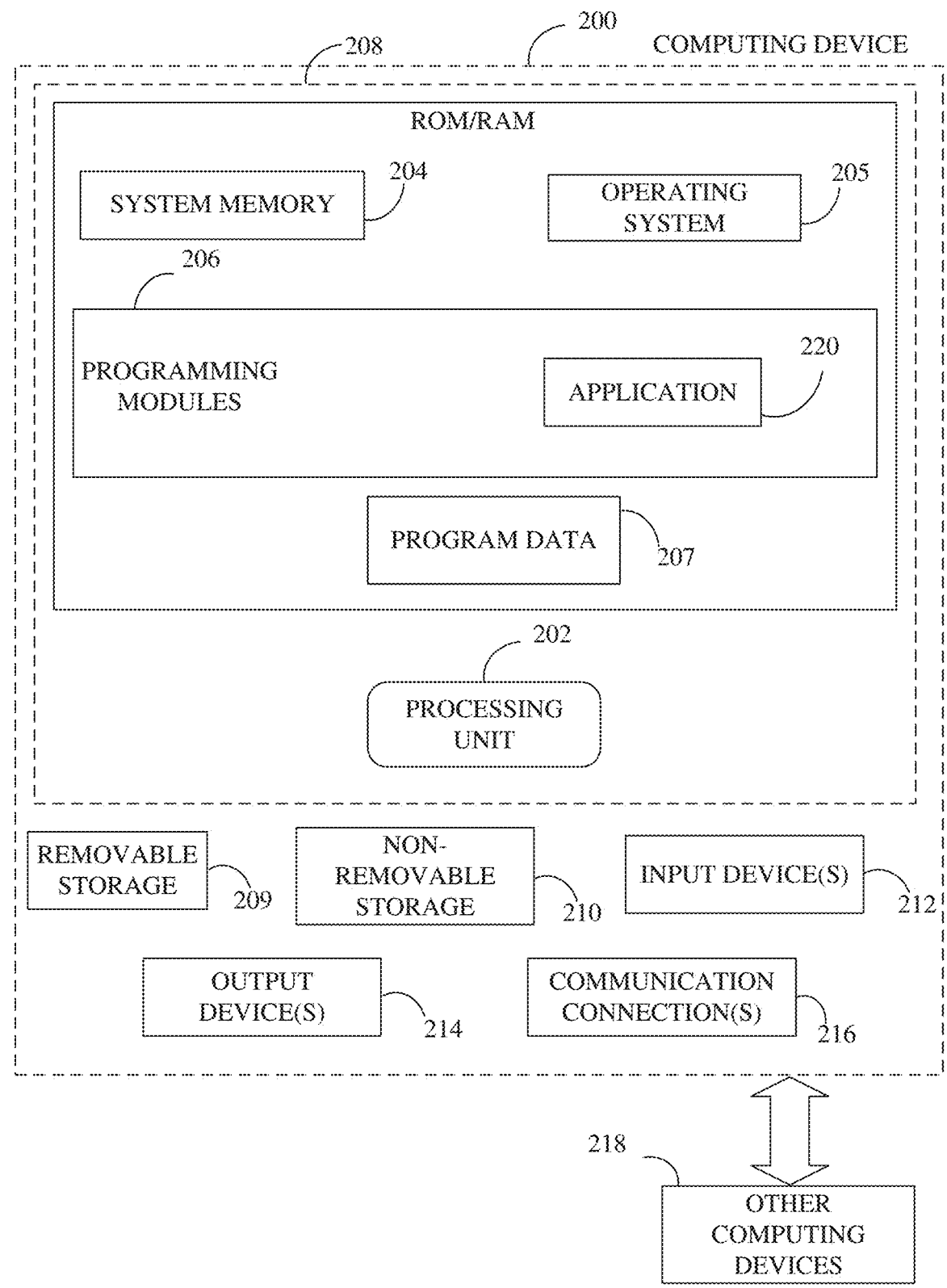
FIG. 2 is a block diagram of a computing device for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g. random-access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable, and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3:
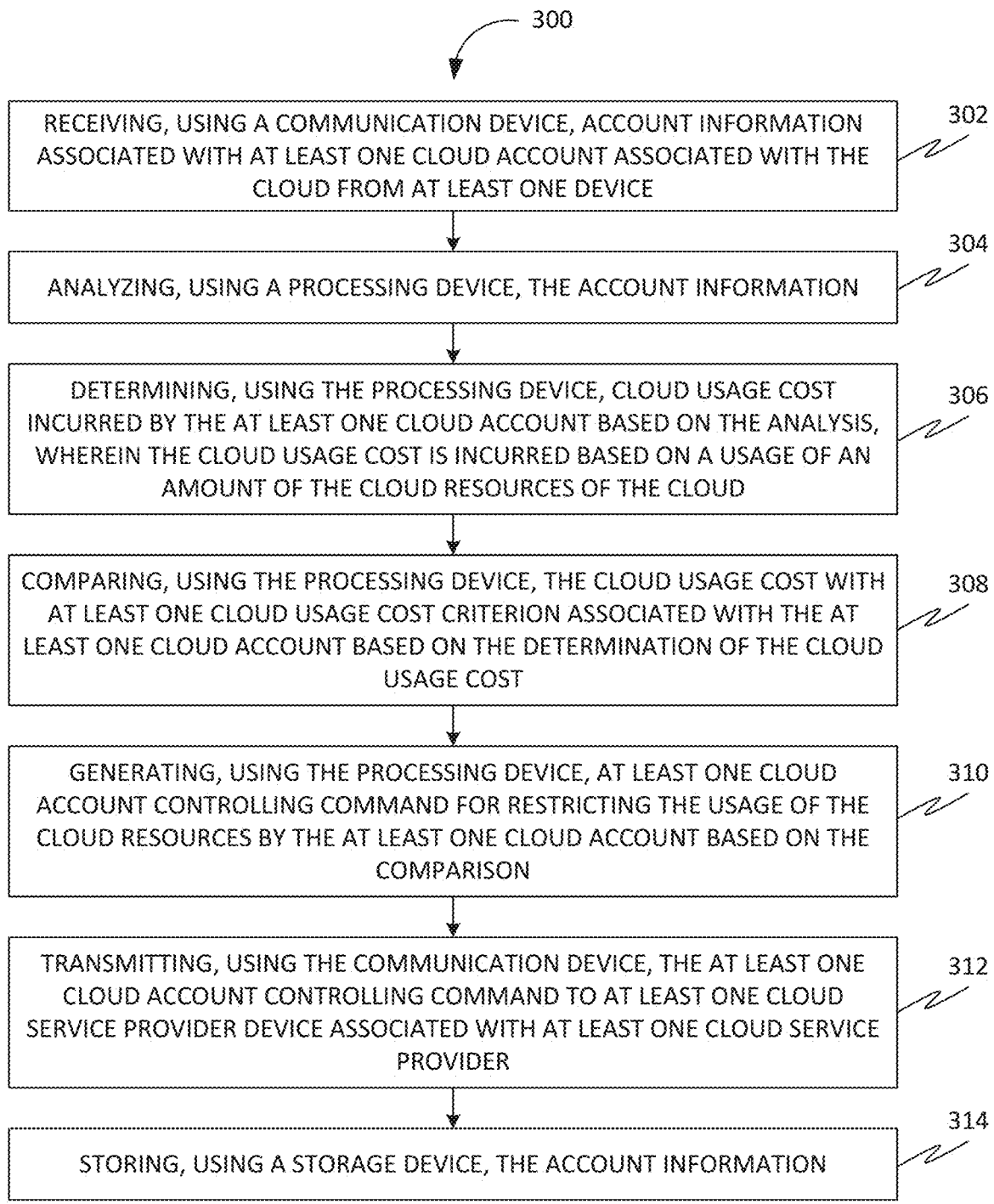
FIG. 3 is a flow chart of a method 300 for facilitating controlling and managing cloud usage costs incurred by cloud accounts for using cloud resources of a cloud server, in accordance with some embodiments.

FIG. 3 is a flow chart of a method 300 for facilitating controlling and managing cloud usage costs incurred by cloud accounts for using cloud resources of a cloud, in accordance with some embodiments. The method 300 may include a step 302 of receiving, using a communication device (such as a communication device 1002), account information associated with one or more cloud accounts associated with the cloud from one or more devices. Further, the account information may include cloud resources usage information associated with a usage of the cloud resources by the one or more cloud accounts. The method 300 may include a step 304 of analyzing, using a processing device (such as a processing device 1004), the account information. Further, the method 300 may include a step 306 of determining, using the processing device, cloud usage cost incurred by the one or more cloud accounts based on the calculation. Further, the cloud usage cost is incurred based on the usage of the cloud resources of the cloud. Further, the method 300 may include a step 308 of comparing, using the processing device, the cloud usage cost with cloud usage cost criterion associated with the one or more cloud accounts based on the calculation of the cloud usage cost. The method

300 may include a step 310 of generating, using the processing device, one or more cloud account controlling commands for restricting the usage of the cloud resources by the one or more cloud accounts based on the comparison. Further, the method 300 may include a step 312 of transmitting, using the communication device, the one or more cloud account controlling commands to one or more cloud service provider devices associated with the cloud service provider. Further, the one or more service provider devices restrict the usage of the cloud resources by the one or more cloud accounts based on the at least one cloud account controlling commands. Further, the method 300 may include a step 314 of storing, using a storage device (such as a storage device 1006), the account information.

In some embodiments, the restricting may include limiting the one or more cloud accounts from using additional amounts of the cloud resources during a second time period. The restricting may include initiating additional amounts of the cloud resources for the one or more cloud accounts during the second time period. The restricting may include terminating portions of the additional amounts of the cloud resource used by the one or more cloud accounts during the second time period. Further, the one or more cloud usage cost criterions may include one or more cloud usage cost endpoints. Further, the method 300 may include receiving, using the communication device, the one or more cloud usage cost endpoints associated with the one or more cloud accounts from one or more external devices. Further, the comparison of the cloud usage cost with the one or more cloud usage cost criterions may include comparing the cloud usage cost with the one or more cloud usage cost endpoints. Further, the generating of the one or more cloud account controlling commands for the restricting of the usage of the cloud resources by the one or more cloud accounts is based on the comparing of the cloud usage cost with the one or more cloud usage cost endpoints.

Figure 4:
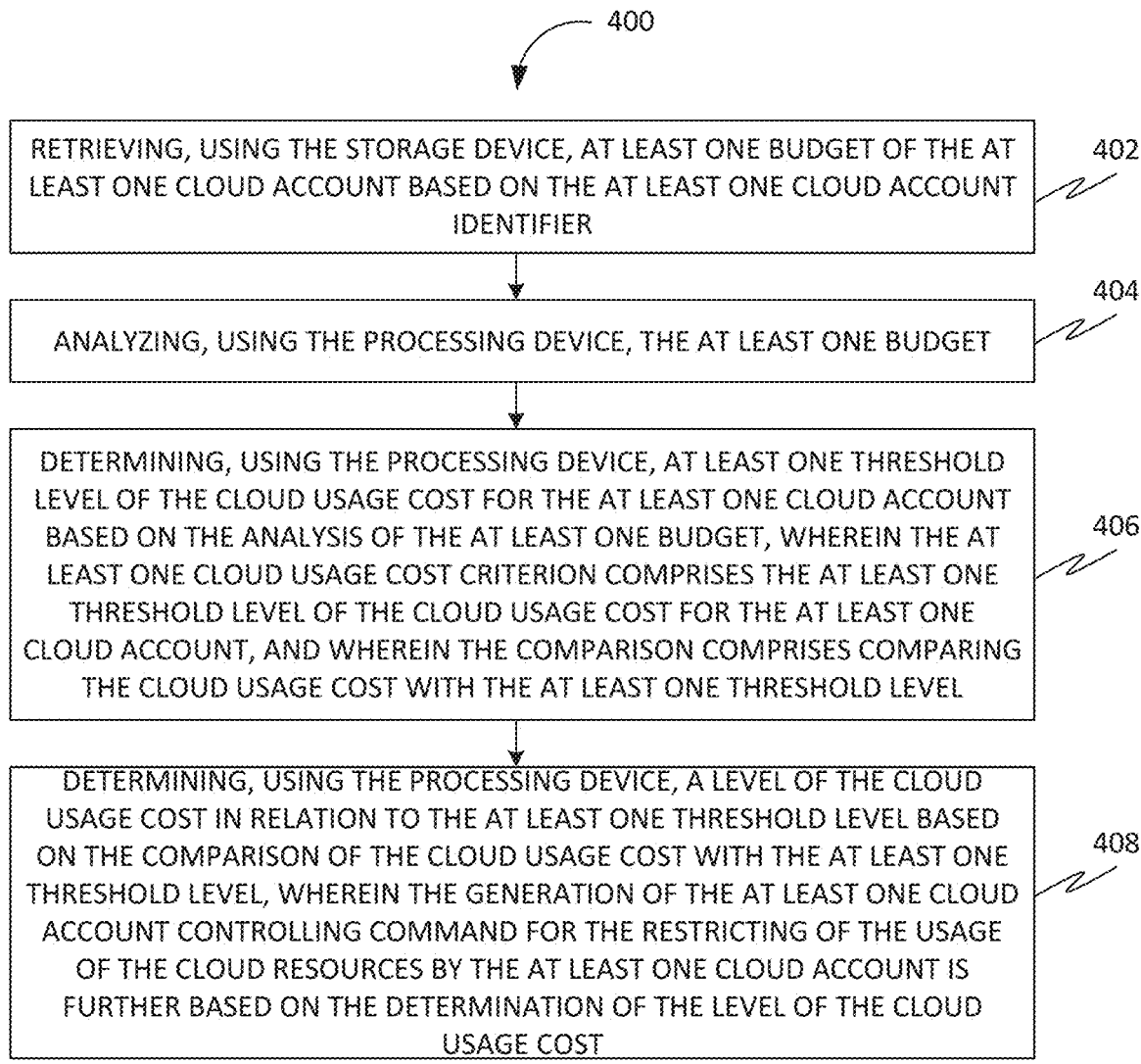
FIG. 4 is a flow chart of a method 400 for facilitating controlling and managing cloud usage costs incurred by cloud accounts for using cloud resources of a cloud server in which the method 400 may include determining a level of the cloud usage cost in relation to one or more threshold levels, in accordance with some embodiments.

FIG. 4 is a flow chart of a method 400 for facilitating controlling and managing cloud usage costs incurred by cloud accounts for using cloud resources of a cloud. The method 400 may include determining a level of the cloud usage cost in relation to one or more threshold levels, in accordance with some embodiments. Further, the account information may include one or more cloud account identifiers of the one or more cloud accounts. Further, at 402, the method 400 may include retrieving, using the storage device, one or more budgets of the one or more cloud accounts based on the one or more cloud account identifiers. Further, at 404, the method 400 may include analyzing, using the processing device, the one or more budgets. Further, at 406, the method 400 may include determining, using the processing device, one or more threshold levels of the cloud usage cost for the one or more cloud accounts based on the analysis of the one or more budgets. The one or more cloud usage cost criterions may include the one or more threshold levels of the cloud usage cost for the one or more cloud accounts. Further, the comparison may include comparing the cloud usage cost with the one or more threshold levels. Further, at 408, the method 400 may include determining, using the processing device, a level of the cloud usage cost in relation to the one or more threshold levels based on the comparison of the cloud usage cost with the one or more threshold levels. Further, the generating of the one or more cloud account controlling commands for the restricting of the usage of the cloud resources by the one or more cloud accounts is based on the determining of the level of the cloud usage cost.

Figure 5:
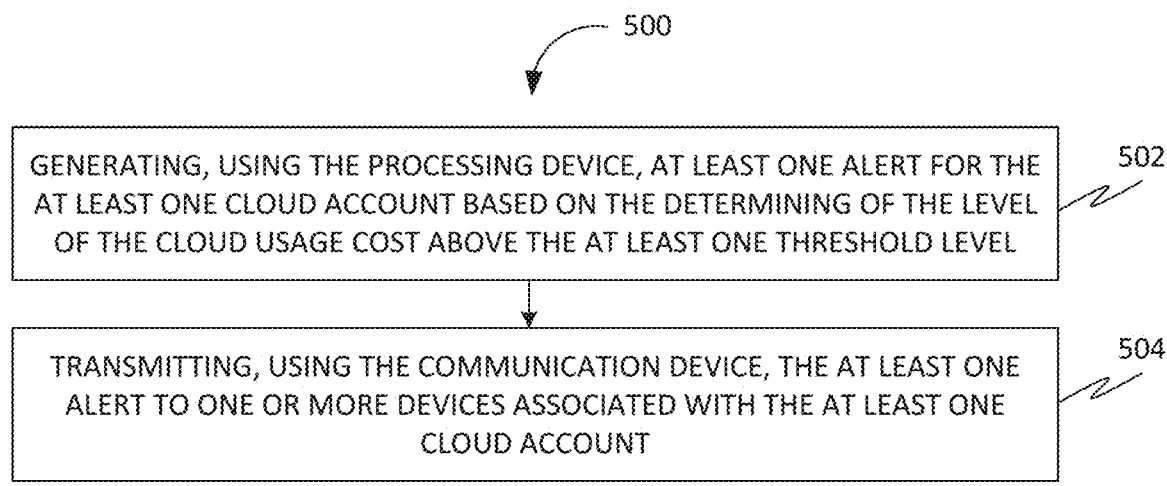
FIG. 5 is a flow chart of the method 500 for facilitating controlling and managing cloud usage costs incurred by cloud accounts for using cloud resources of a cloud server in which the method 500 may include transmitting the one or more alerts to one or more devices associated with the one or more cloud accounts, in accordance with some embodiments.

FIG. 5 is a flow chart of a method 500 for facilitating controlling and managing cloud usage costs incurred by cloud accounts for using cloud resources of a cloud. The method 500 may include transmitting the one or more alerts to one or more devices associated with the one or more cloud accounts, in accordance with some embodiments. Further, at 502, the method 500 may include generating, using the processing device, one or more alerts for the one or more cloud accounts based on the determination of the level of the cloud usage cost above the one or more threshold levels. Further, at 504, the method 500 may include transmitting, using the communication device, the one or more alerts to one or more devices associated with the one or more cloud accounts.

In some embodiments, the one or more threshold levels may include two or more threshold levels. Further, the determination of the level of the cloud usage cost above the one or more threshold levels may include determining the level of the cloud usage cost above a threshold level of the two or more threshold levels. Further, the generating of the one or more alerts may include generating an alert from two or more alerts for the one or more cloud accounts based on the determination of the level of the cloud usage cost above the threshold level of the two or more threshold levels.

Figure 6:
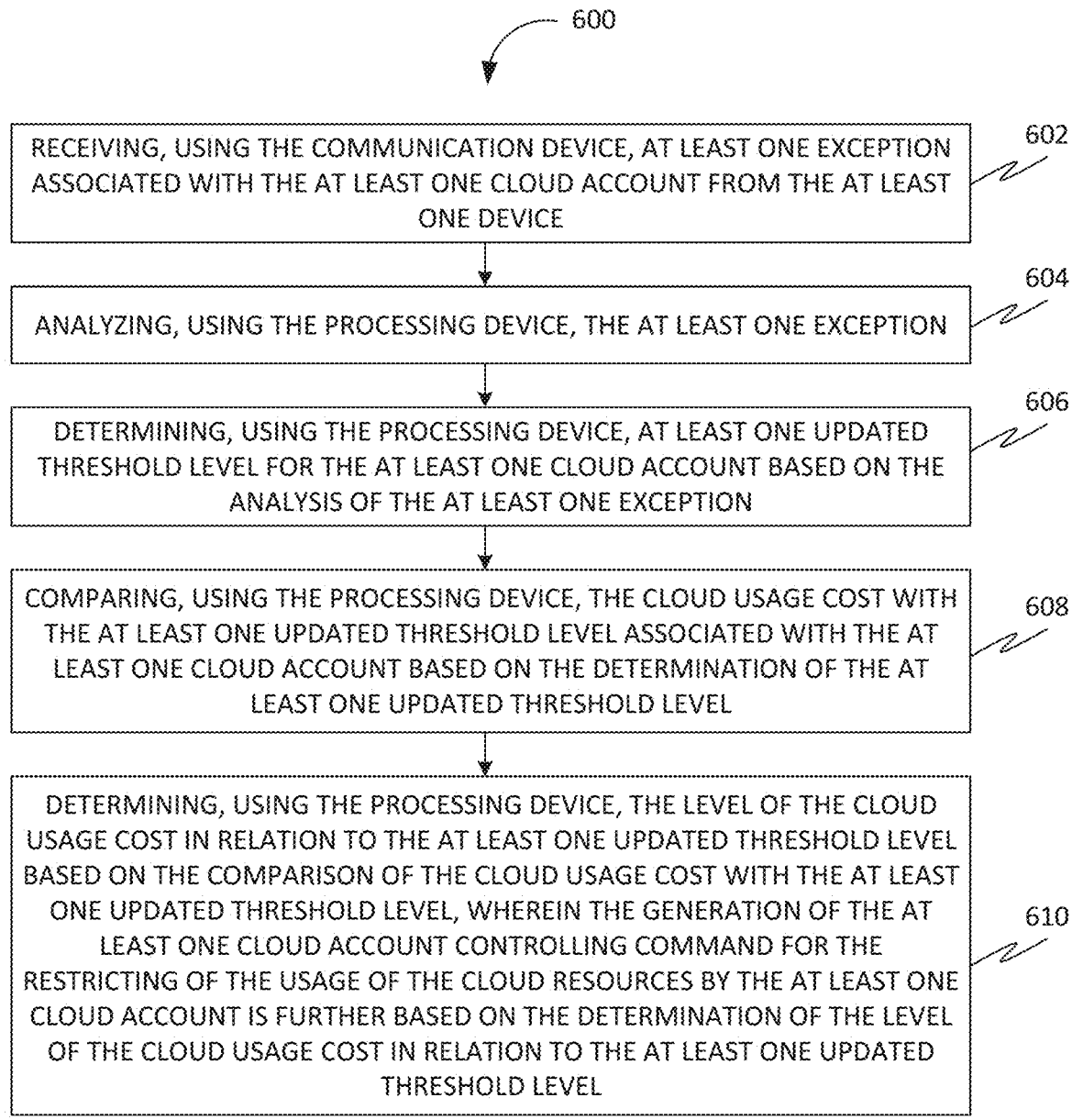
FIG. 6 is a flow chart of a method 600 for facilitating controlling and managing cloud usage costs incurred by cloud accounts for using cloud resources of a cloud server in which the method 600 may include determining the level of the cloud usage cost, in accordance with some embodiments.

FIG. 6 is a flow chart of a method 600 for facilitating controlling and managing cloud usage costs incurred by cloud accounts for using cloud resources of a cloud. The method 600 may include determining the level of the cloud usage cost, in accordance with some embodiments. Further, the method 600 may include a step 602 of receiving, using the communication device, one or more exceptions associated with the one or more cloud accounts from the one or more devices. The method 600 may include a step 604 of analyzing, using the processing device, the one or more exceptions. Further, the method 600 may include a step 606 of determining, using the processing device, one or more updated threshold levels for the one or more cloud accounts based on the analysis of the one or more exceptions. Further, the method 600 may include a step 608 of comparing, using the processing device, the cloud usage cost with the one or more updated threshold levels associated with the one or more cloud accounts based on the determination of the one or more updated threshold levels. Further, the method 600 may include a step 610 of determining, using the processing device, the level of the cloud usage cost in relation to the one or more updated threshold levels based on the comparison of the cloud usage cost with the one or more updated threshold levels. Further, the generating of the one or more cloud account controlling commands for the restricting of the usage of the cloud resources by the one or more cloud accounts is further based on the determination of the level of the cloud usage cost in relation to the one or more updated threshold levels.

Figure 7:
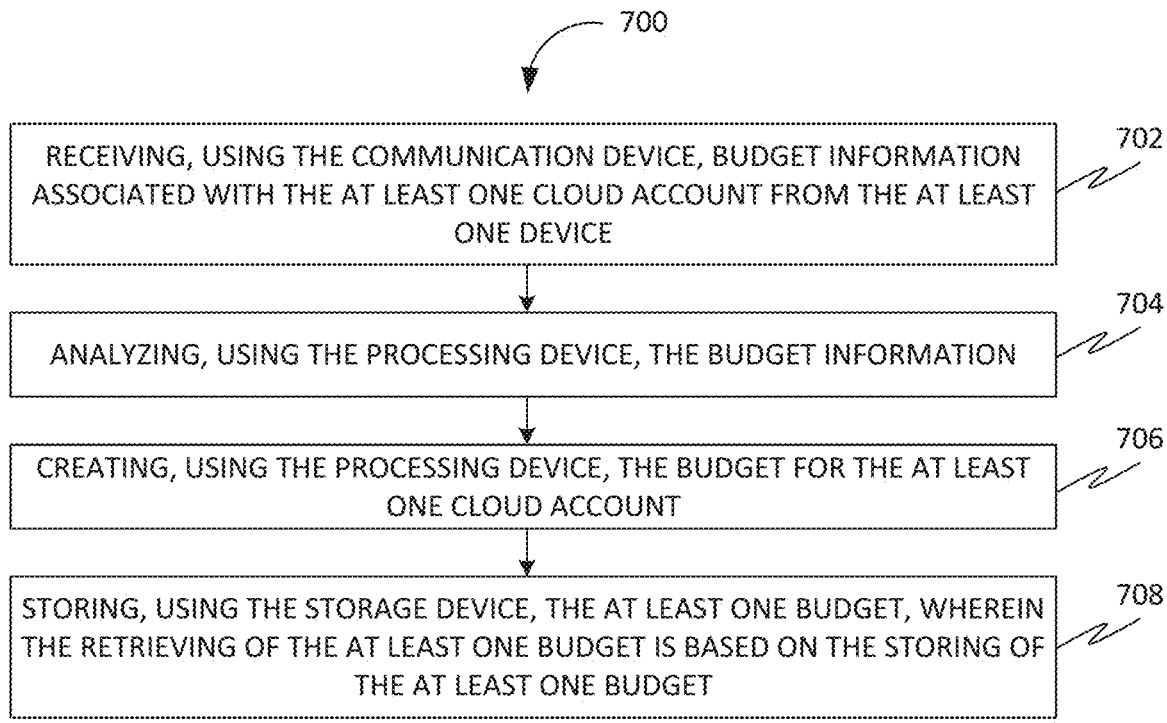
FIG. 7 is a flow chart of a method 700 for facilitating controlling and managing cloud usage costs incurred by cloud accounts for using cloud resources of a cloud server in which the method 700 may include creating the budget for the one or more cloud accounts, in accordance with some embodiments.

FIG. 7 is a flow chart of a method 700 for facilitating controlling and managing cloud usage costs incurred by cloud accounts for using cloud resources of a cloud. The method 700 may include creating the one or more budgets for the one or more cloud accounts, in accordance with some embodiments. Further, the method 700 may include a step 702 of receiving, using the communication device, budget information associated with the one or more cloud accounts from the one or more devices. The method 700 may include a step 704 of analyzing, using the processing device, the budget information. Further, the method 700 may include a step 706 of creating, using the processing device, the one or more budgets for the one or more cloud accounts. The method 700 may include a step 708 of storing, using the storage device, the one or more budgets. Further, the retrieving of the one or more budgets is based on the storing of the one or more budgets. Further, in some embodiments, the receiving of the budget information may include receiving the budget information from one or more budget planning interfaces of the one or more devices.

Further, in some embodiments, the one or more budget information may include one or more historical budgets of the one or more cloud accounts. Further, the analysis of the budget information may include analyzing the one or more historical budgets. Further, the creation of the one or more budgets is based on the analysis of the one or more historical budgets. Further, in some embodiments, the budget information may include historical cloud usage cost incurred by the one or more cloud accounts. Further, the analysis of the budget information may include analyzing the historical cloud usage cost using one or more ML algorithms. Further, the creation of the one or more budgets is based on the analyzing of the historical cloud usage cost.

Figure 8:
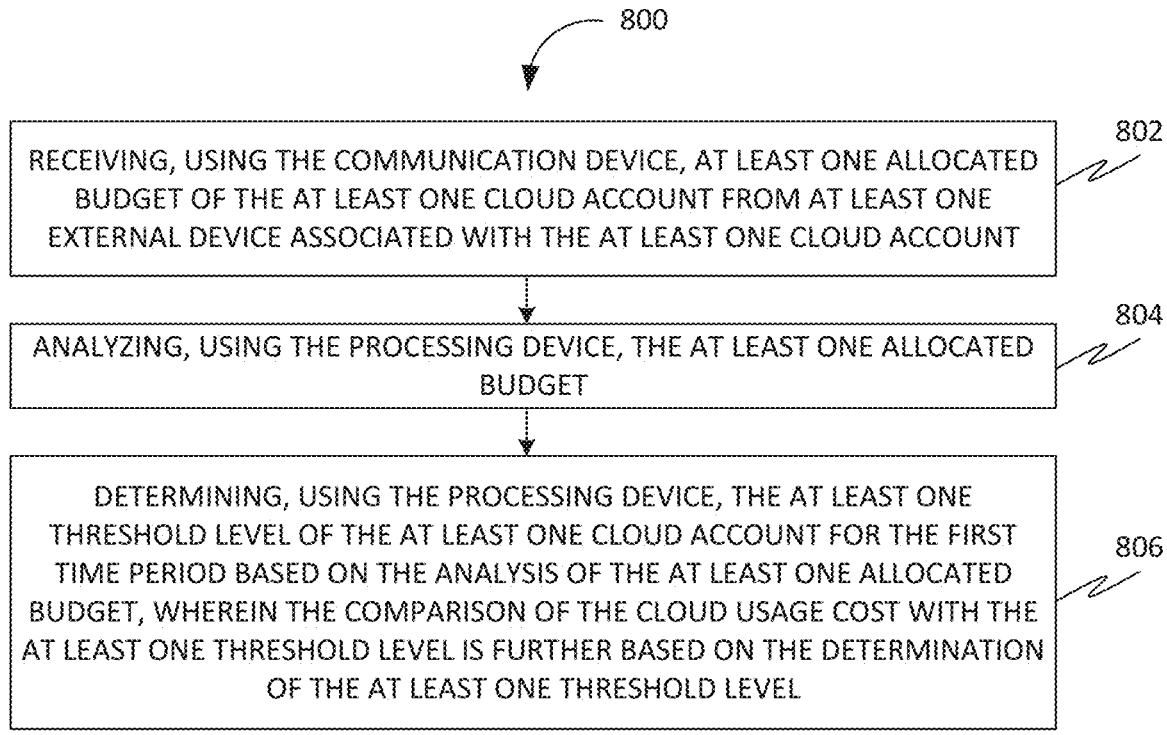
FIG. 8 is a flow chart of a method 800 for facilitating controlling and managing cloud usage costs incurred by cloud accounts for using cloud resources of a cloud server in which the method 800 may include determining the one or more threshold levels of the one or more cloud accounts, in accordance with some embodiments.

FIG. 8 is a flow chart of a method 800 for facilitating controlling and managing cloud usage costs incurred by cloud accounts for using cloud resources of a cloud. The method 800 may include determining the one or more threshold levels of the one or more cloud accounts, in accordance with some embodiments. Further, the method 800 may include a step 802 of receiving, using the communication device, one or more allocated budgets of the one or more cloud accounts from one or more external device associated with the one or more cloud accounts. The method 800 may include a step 804 of analyzing, using the processing device, the one or more allocated budgets. Further, the method 800 may include a step 806 of determining, using the processing device, the one or more threshold levels of the one or more cloud accounts for the first time period based on the analyzing of the one or more allocated budgets. Further, the comparing of the cloud usage cost with the one or more threshold levels may be based on the determination of the one or more threshold levels.

Figure 9:
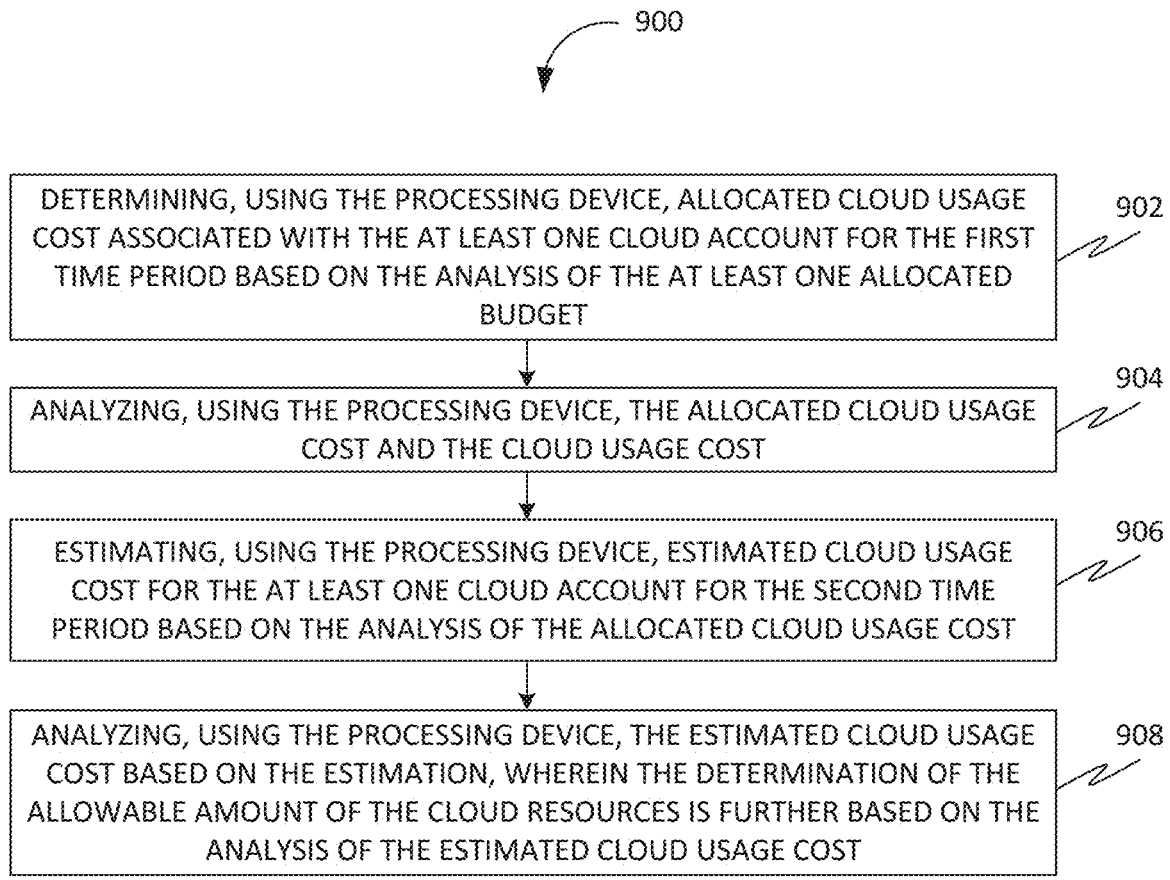
FIG. 9 is a flow chart of a method 900 for facilitating controlling and managing cloud usage costs incurred by cloud accounts for using cloud resources of a cloud server in which the method 900 may include analyzing the estimated cloud usage cost, in accordance with some embodiments.

FIG. 9 is a flow chart of a method 900 for facilitating controlling and managing cloud usage costs incurred by cloud accounts for using cloud resources of a cloud in which the method 900 may include analyzing the one or more estimated cloud usage cost, in accordance with some embodiments. Further, the method 900 may include a step 902 of determining, using the processing device, one or more allocated cloud usage cost associated with the one or more cloud account for the one or more first time period based on the analyzing of the one or more allocated budget. Further, the method 900 may include a step 904 of analyzing, using the processing device, the allocated cloud usage cost and the cloud usage cost. The method 900 may include a step 906 of estimating, using the processing device, estimated cloud usage cost for the one or more cloud accounts for a second time period based on the analysis of the allocated cloud usage cost. Further, the method 900 may include a step 908 of analyzing, using the processing device, the estimated cloud usage cost based on the estimation. Further, the determination of the allowable amount of the cloud resources may be based on the analysis of the estimated cloud usage cost.

Figure 10:
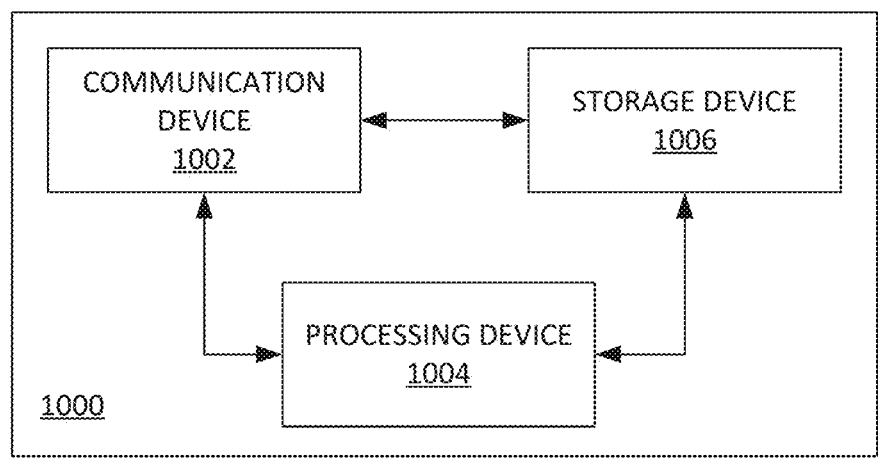
FIG. 10 is a block diagram of a system 1000 for facilitating controlling and managing cloud usage costs incurred by cloud accounts for using cloud resources of a cloud server, in accordance with some embodiments.

FIG. 10 is a block diagram of a system 1000 for facilitating controlling and managing cloud usage costs incurred by cloud accounts for using cloud resources of a cloud, in accordance with some embodiments. The system 1000 may include a communication device 1002, a processing device 1004, and a storage device 1006. The communication device 1002 may be configured for performing a step of receiving account information associated with one or more cloud accounts associated with the cloud from one or more devices. Further, the account information may include cloud resources usage information associated with a usage of the cloud resources by the one or more cloud accounts. The communication device 1002 may be configured for performing a step of transmitting one or more cloud account controlling commands to one or more cloud service provider devices associated with one or more cloud service providers. Further, the one or more service provider devices restrict the usage of the cloud resources by the one or more cloud accounts based on the one or more cloud account controlling commands.

The processing device 1004 may be communicatively coupled with the communication device 1002. Further, the processing device 1004 may be configured for performing a step of analyzing the account information. The processing device 1004 may be configured for performing a step of determining cloud usage cost incurred by the one or more cloud accounts based on the analysis. Further, the cloud usage cost may be incurred based on the usage of one or more amounts of the cloud resources of the cloud. The processing device 1004 may be configured for performing a step of comparing the cloud usage cost with one or more cloud usage cost criterions associated with the one or more cloud accounts based on the determining of the cloud usage cost. Further, the processing device 1004 may be configured for performing a step of generating the one or more cloud account controlling commands for restricting the usage of the cloud resources by the one or more cloud accounts based on the comparison.

The storage device 1006 may be communicatively coupled with the processing device 1004. Further, the storage device 1006 may be configured for performing a step of storing the account information. The account information may include one or more cloud account identifiers of the one or more cloud accounts. Further, the storage device 1006 may be configured for retrieving one or more budgets of the one or more cloud accounts based on the one or more cloud account identifiers. Further, the processing device 1004 may be configured for analyzing the one or more budgets. The processing device 1004 may be configured for determining one or more threshold levels of the cloud usage cost for the one or more cloud accounts based on the analysis of the one or more budgets. Further, the one or more cloud usage cost criterions may include the one or more threshold levels of the cloud usage cost for the one or more cloud accounts. Further, the comparison may include comparing the cloud usage cost with the one or more threshold levels. Further, the processing device 1004 may be configured for determining a level of the cloud usage cost in relation to the one or more threshold levels based on the comparison of the cloud usage cost with the one or more threshold levels. Further, the generation of the one or more cloud account controlling commands for the restricting of the usage of the cloud resources by the one or more cloud accounts may be based on the determination of the level of the cloud usage cost.

Further, in some embodiments, the communication device 1002 may be configured for receiving budget information associated with the one or more cloud accounts from the one or more devices. The processing device 1004 may be configured analyzing the budget information. Further, the processing device 1004 may be configured for creating the one or more budgets for the one or more cloud accounts. The storage device 1006 may be configured for storing the one or more budgets. Further, the retrieving of the one or more budgets may be based on the storing of the one or more budgets. Further, in an embodiment, the receiving of the budget information may include receiving the budget information from one or more budget planning interfaces of the one or more devices.

Further, in an embodiment, the budget information may include one or more historical budgets of the one or more cloud accounts. The analysis of the budget information may include analyzing the one or more historical budgets. Further, the creation of the one or more budgets may be based on the analysis of the one or more historical budgets. In an embodiment, the budget information may include historical cloud usage cost incurred by the one or more cloud accounts. Further, the analysis of the budget information may include analyzing the historical cloud usage cost using one or more ML algorithms. Further, the creation of the one or more budgets may be based on the analysis of the historical cloud usage cost.

Further, in some embodiments, the one or more cloud usage cost criterions may include one or more cloud usage cost endpoints. The communication device 1002 may be configured for receiving the one or more cloud usage cost endpoints associated with the one or more cloud accounts from one or more external devices. Further, the comparison of the cloud usage cost with the one or more cloud usage cost criterions may include comparing the cloud usage cost with the one or more cloud usage cost endpoints. Further, the generation of the one or more cloud account controlling commands for the restricting of the usage of the cloud resources by the one or more cloud accounts may be further based on the comparison of the cloud usage cost with the one or more cloud usage cost endpoints. In some embodiments, the restriction may include stopping the one or more cloud accounts from using additional amounts of the cloud resources during the second time period. In some embodiments, the restriction may include initiating additional amounts of the cloud resource for the one or more cloud accounts during the second time period. In some embodiments, the restriction may include terminating one or more portions of the amounts of the cloud resource used by the one or more cloud accounts during the second time period.

In some embodiments, the processing device 1004 may be configured for performing a step of generating one or more alerts for the one or more cloud accounts based on the determination of the level of the cloud usage cost above the one or more threshold levels. Further, the communication device 1002 may be configured for performing a step of transmitting the one or more alerts to one or more devices associated with the one or more cloud accounts. In some embodiments, the one or more threshold levels may include two or more threshold levels. Further, the determining of the level of the cloud usage cost above the one or more threshold levels may include determining the level of the cloud usage cost above a threshold level of the two or more threshold levels. Further, the generation of the one or more alerts may include generating an alert from two or more alerts for the one or more cloud accounts based on the determination of the level of the cloud usage cost above the threshold level of the two or more threshold levels.

In some embodiments, the communication device 1002 may be configured for performing a step of receiving one or more exceptions associated with the one or more cloud accounts from the one or more devices. The processing device 1004 may be configured for performing a step of analyzing the one or more exceptions. Further, the processing device 1004 may be configured for performing a step of determining one or more updated threshold levels for the one or more cloud accounts based on the analysis of the one or more exceptions. The processing device 1004 may be configured for performing a step of comparing the cloud usage cost with the one or more updated threshold levels associated with the one or more cloud accounts based on the determination of the one or more updated threshold levels. Further, the processing device 1004 may be configured for performing a step of determining the level of the cloud usage cost in relation to the one or more updated threshold levels based on the comparison of the cloud usage cost with the one or more updated threshold levels. Further, the generating of the one or more cloud account controlling commands for the restricting of the usage of the cloud resources by the one or more cloud accounts may be further based on the determining of the level of the cloud usage cost in relation to the one or more updated threshold levels.

In some embodiments, the communication device 1002 may be configured for performing a step of receiving historical cloud usage data associated with the one or more cloud accounts from one or more external devices associated with the one or more cloud accounts. Further, the processing device 1004 may be configured for performing a step of analyzing the historical cloud usage data using one or more ML algorithms. The processing device 1004 may be configured for performing a step of estimating one or more budgets of the one or more cloud accounts for the first time period based on the analysis of the historical cloud usage data. Further, the processing device 1004 may be configured for performing a step of determining the one or more threshold levels of the one or more cloud accounts for the first time period based on the one or more budgets. Further, the comparison of the cloud usage cost with the one or more threshold levels may be based on the determination of the one or more threshold levels.

In some embodiments, the communication device 1002 may be configured for performing a step of receiving one or more allocated budgets of the one or more cloud accounts from one or more external devices associated with the one or more cloud accounts. Further, the processing device 1004 may be configured for performing a step of analyzing the one or more allocated budgets. Further, the processing device 1004 may be configured for performing a step of determining the one or more threshold levels of the one or more cloud accounts for the first time period based on the analysis of the one or more allocated budgets. Further, the comparing of the cloud usage cost with the one or more threshold levels may be based on the determining of the one or more threshold levels.

In some embodiments, the processing device 1004 may be configured for performing a step of determining allocated cloud usage cost associated with the one or more cloud accounts for the first time period based on the analysis of the allocated budget. Further, the processing device 1004 may be configured for performing a step of analyzing the allocated cloud usage cost and the cloud usage cost. Further, the processing device 1004 may be configured for performing a step of estimating estimated cloud usage cost for the one or more cloud accounts for the second time period based on the analysis of the allocated cloud usage cost. Further, the processing device 1004 may be configured for performing a step of analyzing the estimated cloud usage cost based on the estimation. Further, the determination of the allowable amount of the cloud resources may be based on the analyzing of the estimated cloud usage cost.

Figure 11:
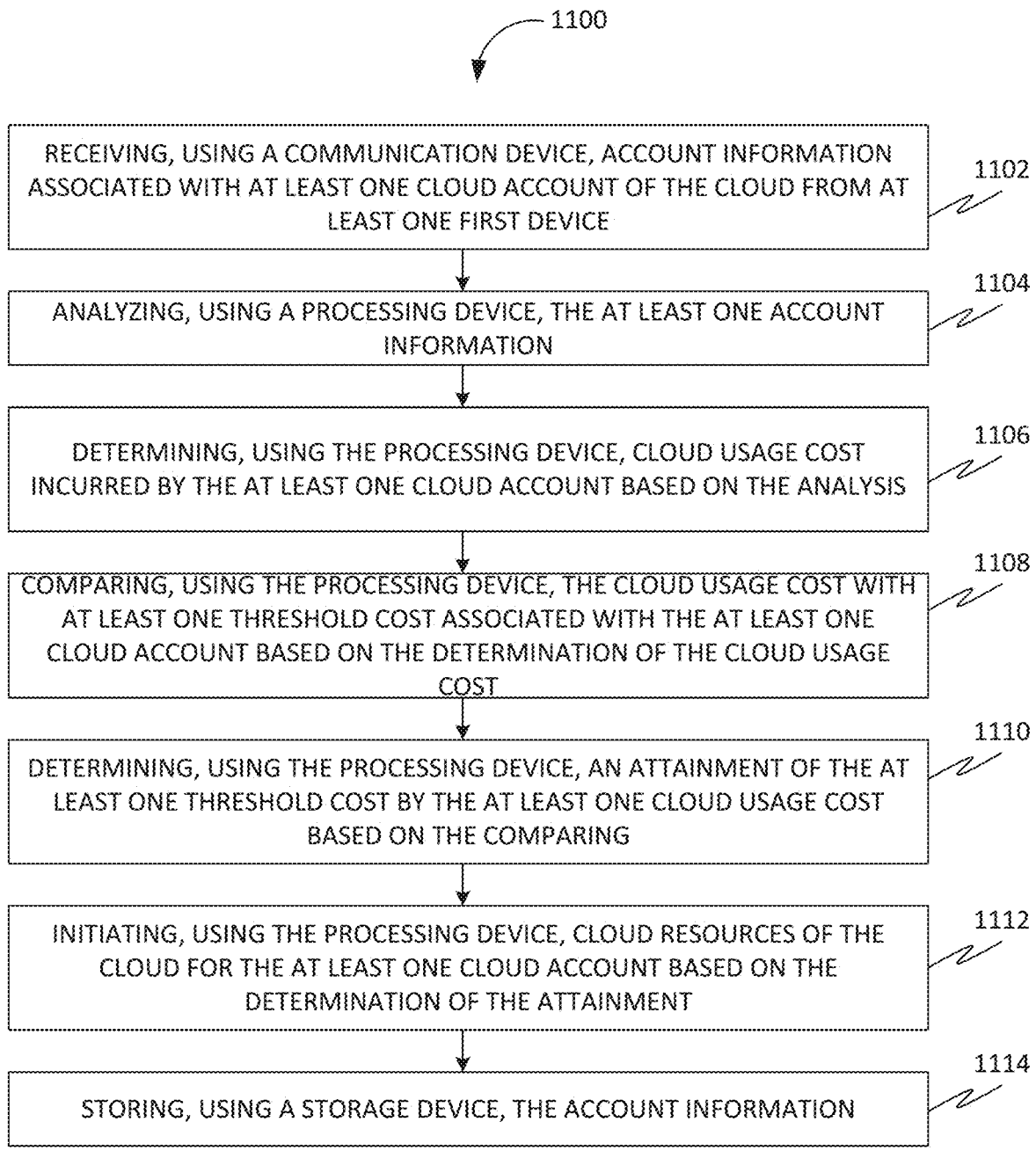
FIG. 11 is a flowchart of a method 1100 for facilitating, controlling, and managing cloud usage costs incurred by cloud accounts of a cloud server, in accordance with some embodiments.

FIG. 11 is a flowchart of a method 1100 for facilitating controlling and managing cloud usage costs incurred by cloud accounts of a cloud, in accordance with some embodiments. Accordingly, the method 1100 may include a step 1102 of receiving, using a communication device, account information associated with at least one cloud account of the cloud from at least one first device. Further, the method 1100 may include a step 1104 of analyzing, using a processing device, the account information. The method 1100 may include a step 1106 of determining, using the processing device, the cloud usage cost incurred by the cloud account based on the analysis. Further, the method 1100 may include a step 1108 of comparing, using the processing device, the cloud usage cost with at least one threshold cost associated with the cloud account based on the determination of the cloud usage cost. The method 1100 may include a step 1110 of determining, using the processing device, an attainment of the at least one threshold cost by the cloud usage cost based on the comparison. Further, the method 1100 may include a step 1112 of initiating, using the processing device, cloud resources of the cloud for the cloud account based on the determination of the attainment. The cloud resources may not be initiated for the cloud account if the cloud usage cost attains the at least one threshold cost. Further, the cloud resources may be initiated for the cloud account if the cloud usage cost does not attain the at least one threshold cost. The method 1100 may include a step 1114 of storing, using a storage device, the account information.

Figure 12:
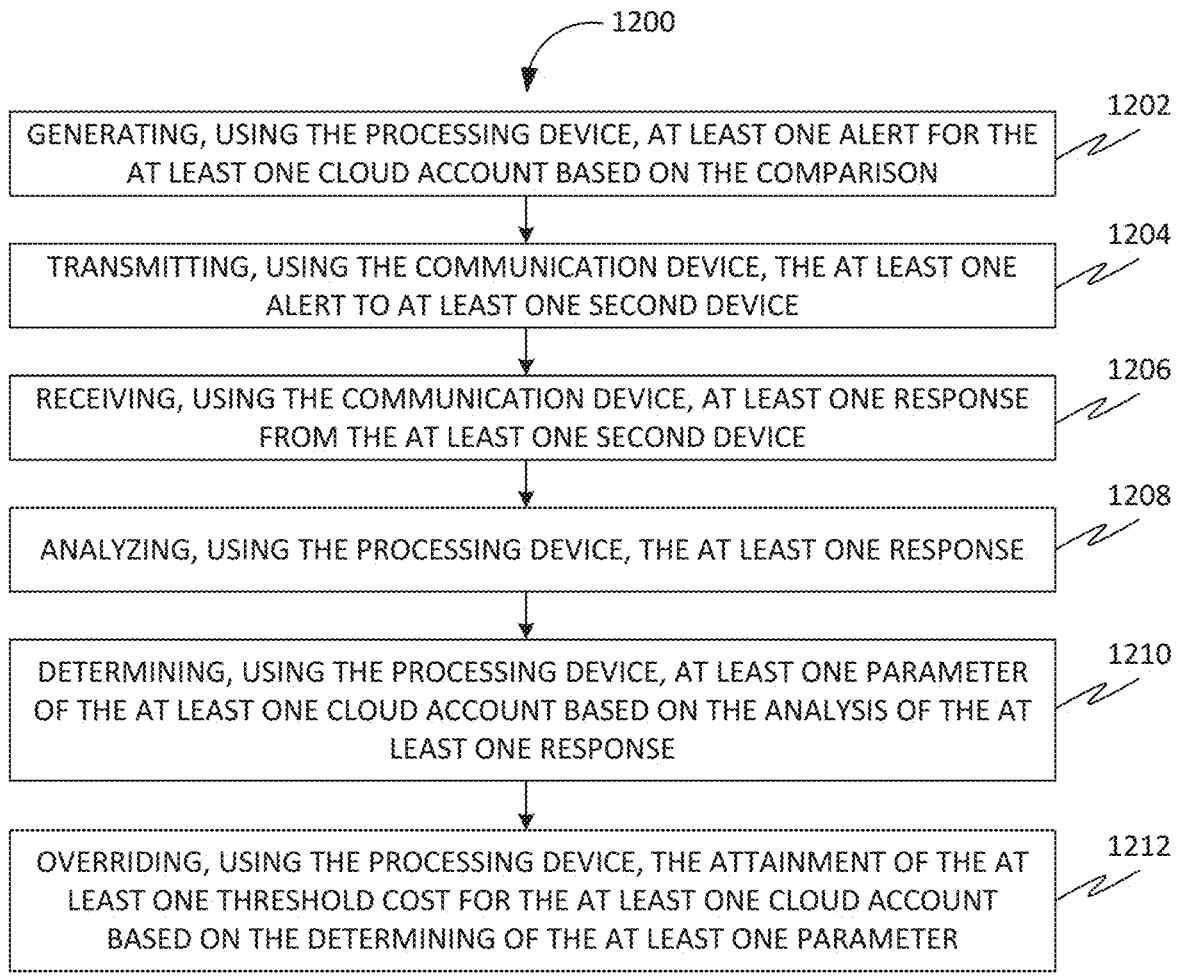
FIG. 12 is a flowchart of a method 1200 for facilitating overriding the attainment of the threshold cost by the at least one cloud usage cost, in accordance with some embodiments.

FIG. 12 is a flowchart of a method 1200 for facilitating overriding the attainment of the at least one threshold cost by the cloud usage cost, in accordance with some embodiments. Accordingly, the method 1200 may include a step 1202 of generating, using the processing device, at least one alert for the one cloud account based on the comparison. Further, the method 1200 may include a step 1204 of transmitting, using the communication device, the at least one alert to at least one second device. The method 1200 may include a step 1206 of receiving, using the communication device, at least one response from the at least one second device. Further, the method 1200 may include a step 1208 of analyzing, using the processing device, the at least one response. The method 1200 may include a step 1210 of determining, using the processing device, at least one parameter of the cloud account based on the analysis of the at least one response. Further, the method 1200 may include a step 1212 of overriding, using the processing device, the attainment of the at least one threshold cost for the cloud account based on the determination of the at least one parameter. Further, the initiating of the cloud resources for the cloud account may be based on the overriding.

Figure 13:
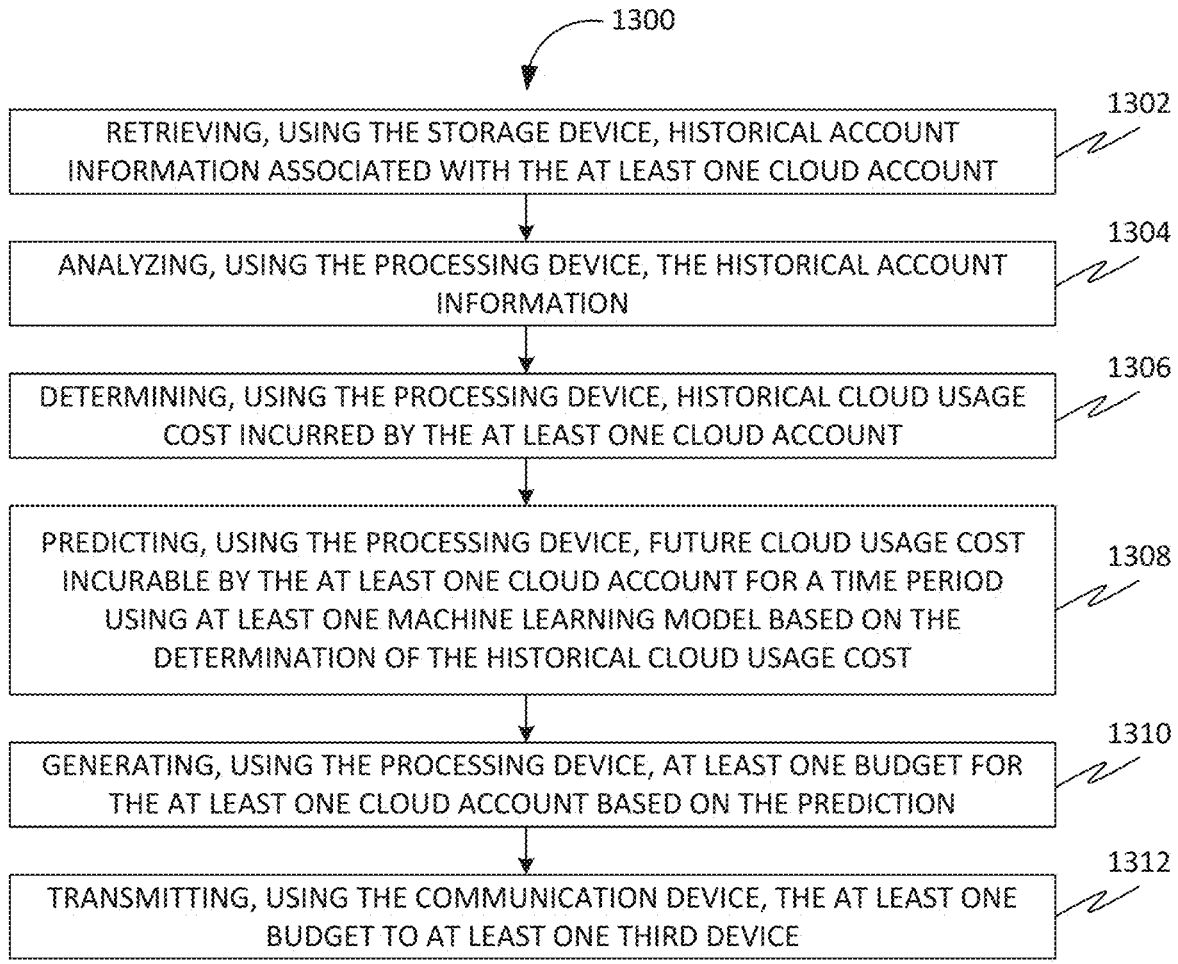
FIG. 13 is a flowchart of a method 1300 for estimating budgets for the cloud accounts of the cloud server, in accordance with some embodiments.

FIG. 13 is a flowchart of a method 1300 for facilitating generating of a budget for the cloud account, in accordance with some embodiments. Accordingly, the method 1300 may include a step 1302 of retrieving, using the storage device, historical account information associated with the at least one cloud account. Further, the method 1300 may include a step 1304 of analyzing, using the processing device, the historical account information. Further, the method 1300 may include a step 1306 of determining, using the processing device, historical cloud usage cost incurred by the at least one cloud account. Further, the method 1300 may include a step 1308 of predicting, using the processing device, future cloud usage cost incurred by the at least one cloud account for a time period using at least one machine learning model based on the determination of the historical cloud usage cost. Further, the method 1300 may include a step 1310 of generating, using the processing device, at least one budget for the at least one cloud account based on the prediction. Further, the method 1300 may include a step 1312 of transmitting, using the communication device, the at least one budget to at least one third device.

Figure 14:
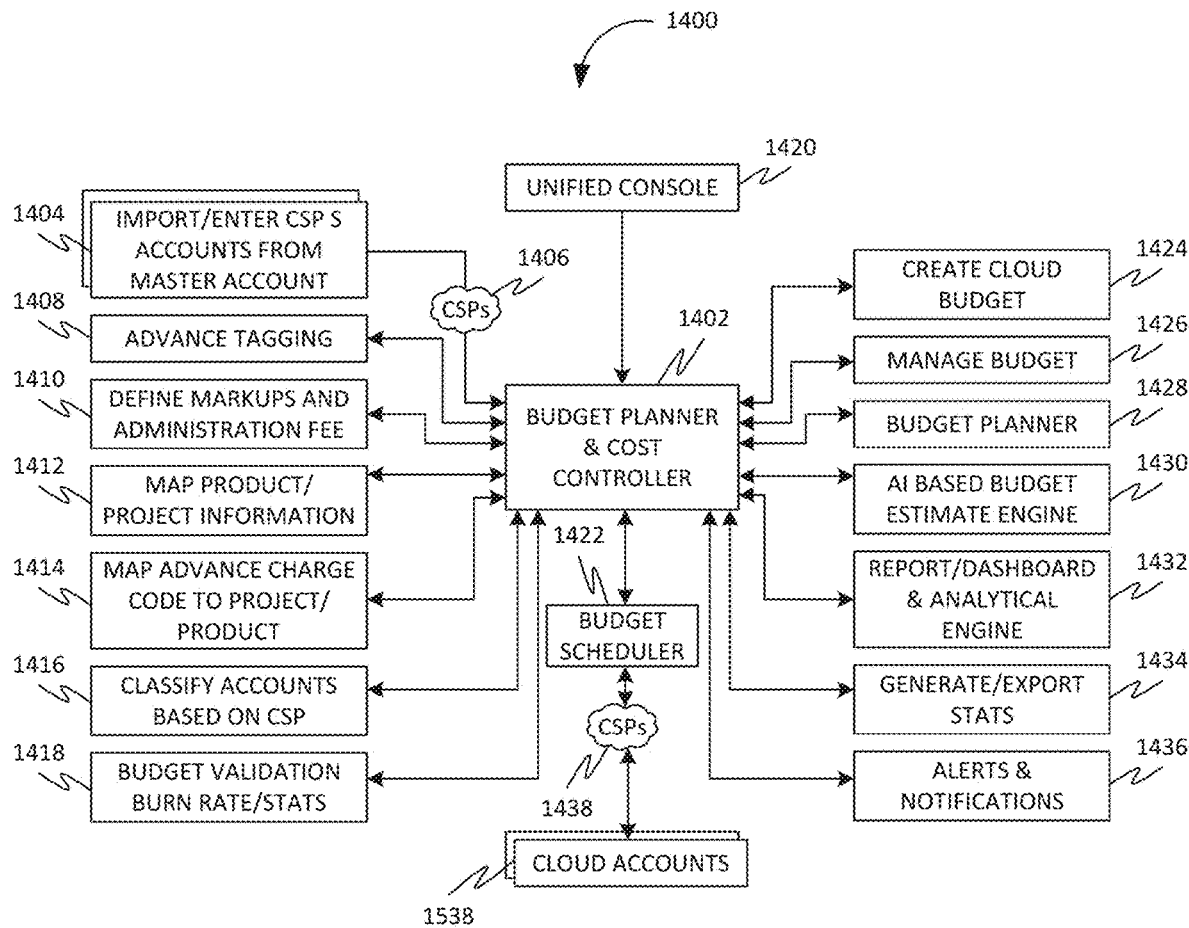
FIG. 14 is a block diagram of a system 1400 for creating, manage and planning a budget for any given period or fiscal year across all the accounts in the cloud server, in accordance with some embodiments.

FIG. 14 is a block diagram of a system 1400 for creating, managing, and planning a budget for any given period or fiscal year across all the accounts in the cloud, in accordance with some embodiments. Further, the system 1400 may include a budget planner and cost controller 1402. At 1404, the budget planner and cost controller 1402 imports/enters CSP's accounts from a master account using a CSP 1406. Further, at 1408, the budget planner and cost controller 1402 performs advance tagging. At 1410, the budget planner and cost controller 1402 define markups and administration fees. Further, at 1412, the budget planner and cost controller 1402 maps product/project information. At 1414, the budget planner and cost controller 1402 maps charge code to project/product. Further, at 1416, the budget planner and cost controller 1402 classifies accounts based on CSP. Further, at 1418, the budget planner and cost controller 1402 determines budget validation/burn rate/stats. The system 1400 may include a unified console 1420, a budget scheduler 1422, a create cloud budget 1424, a manage budget 1426, a budget planner 1428, an AI based budget estimate engine 1430, a report/dashboard and analytical engine 1432, a generate/export stats 1434, and alerts and notifications 1436. Further, the system 1400 generates a schedule via the budget scheduler 1422 to push the schedule to cloud accounts 1538 using a CSP 1438.

Figure 15:
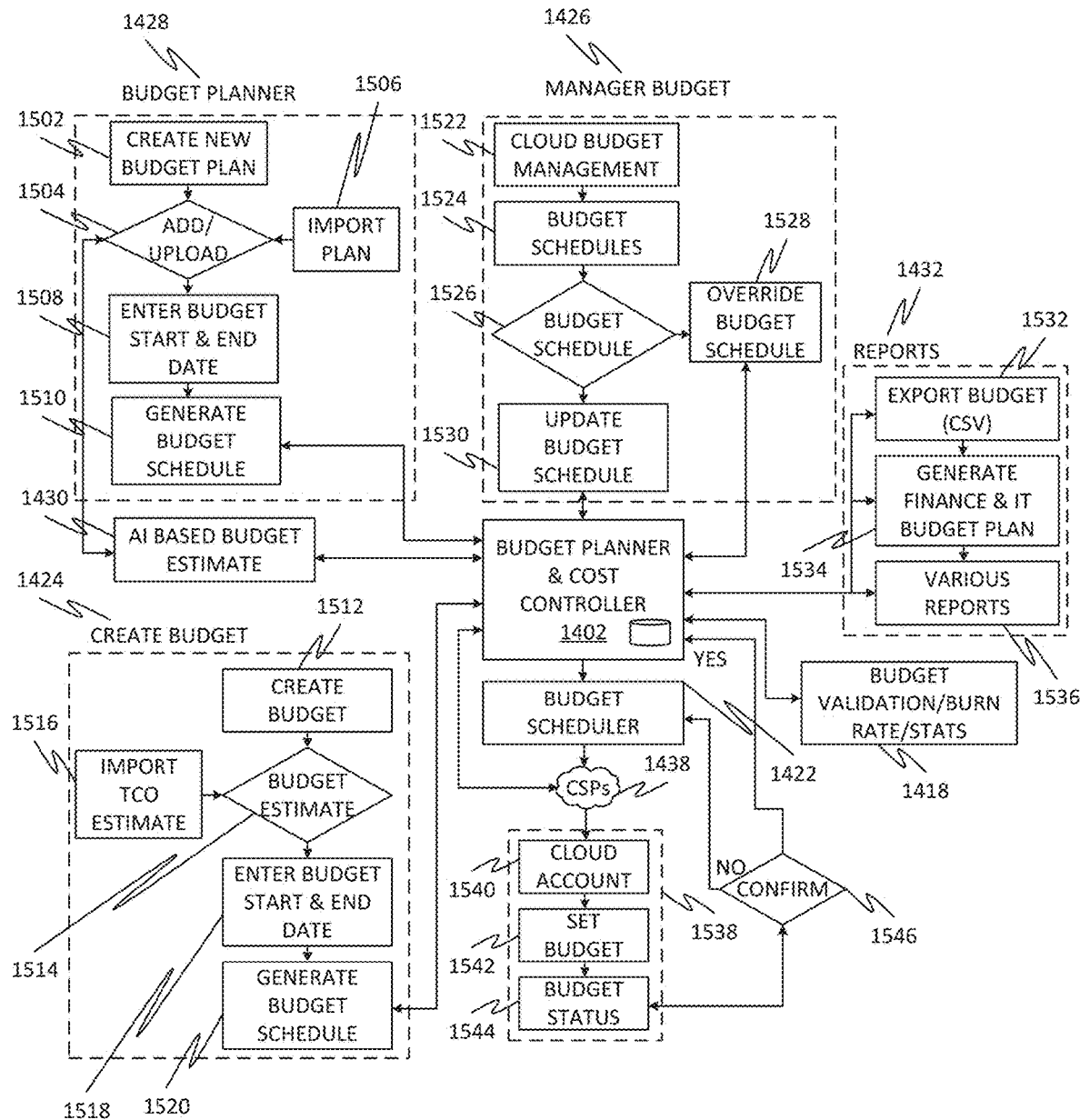
FIG. 15 is a flowchart of methods for creating, managing, and controlling the budget, budget schedules, and budget planning for the cloud accounts across multiple cloud service providers, in accordance with some embodiments.

FIG. 15 is a flow diagram of methods for creating, managing, and controlling the budget, budget schedules, and budget planning for the cloud accounts 1538 across multiple cloud service providers, in accordance with some embodiments. At 1502, the budget planner 1428 may include creating a new budget plan. Further, at 1504, the budget planner 1428 may include adding/uploading based on importing a plan 1506 or from the system generated budget plan from AI-based budget estimate engine 1430. Further, at 1508, the budget planner 1428 may include entering the budget's start and end dates. At 1510, the budget planner 1428 may include generating a budget schedule. Further, the budget planner and cost controller 1402 receives the budget schedule after the step 1510. At 1512, the create cloud budget 1424 may include creating a budget. Further, at 1514, the create cloud budget 1424 may include budget estimation based on importing TCO 1516. Further, at 1518, the create cloud budget 1424 may include entering the budget's start and end dates. Further, at 1520, the create cloud budget 1424 may include generating a budget schedule. Further, the budget planner and cost controller 1402 receives the budget schedule after the step 1520. Further, at 1522, the managed budget 1426 may include a cloud-based budget management. At 1524, the managed budget 1426 may include budget schedules. Further, at 1526, the managed budget 1426 may include a budget schedule. At 1528, the managed budget 1426 may include overriding the budget schedule based on the budget schedule 1526. Further, at 1530, the managed budget 1426 may include updating the budget schedule based on the budget schedule 1526. Further, the budget planner and cost controller 1402 receives the budget schedule after the step 1530. The budget planner and cost controller 1402 receives the budget schedule after the step 1528. Further, the report 1432 may include export budget (CSV) 1532, generate finance and IT budget plan 1534, and various reports 1536. Further, the cloud accounts 1538 may include cloud account 1540, set budget 1542, and budget status 1544. Further, the budget planner and cost controller 1402 and the budget scheduler 1422 receive the budget status 1544 via a step of 1546.

Figure 16:
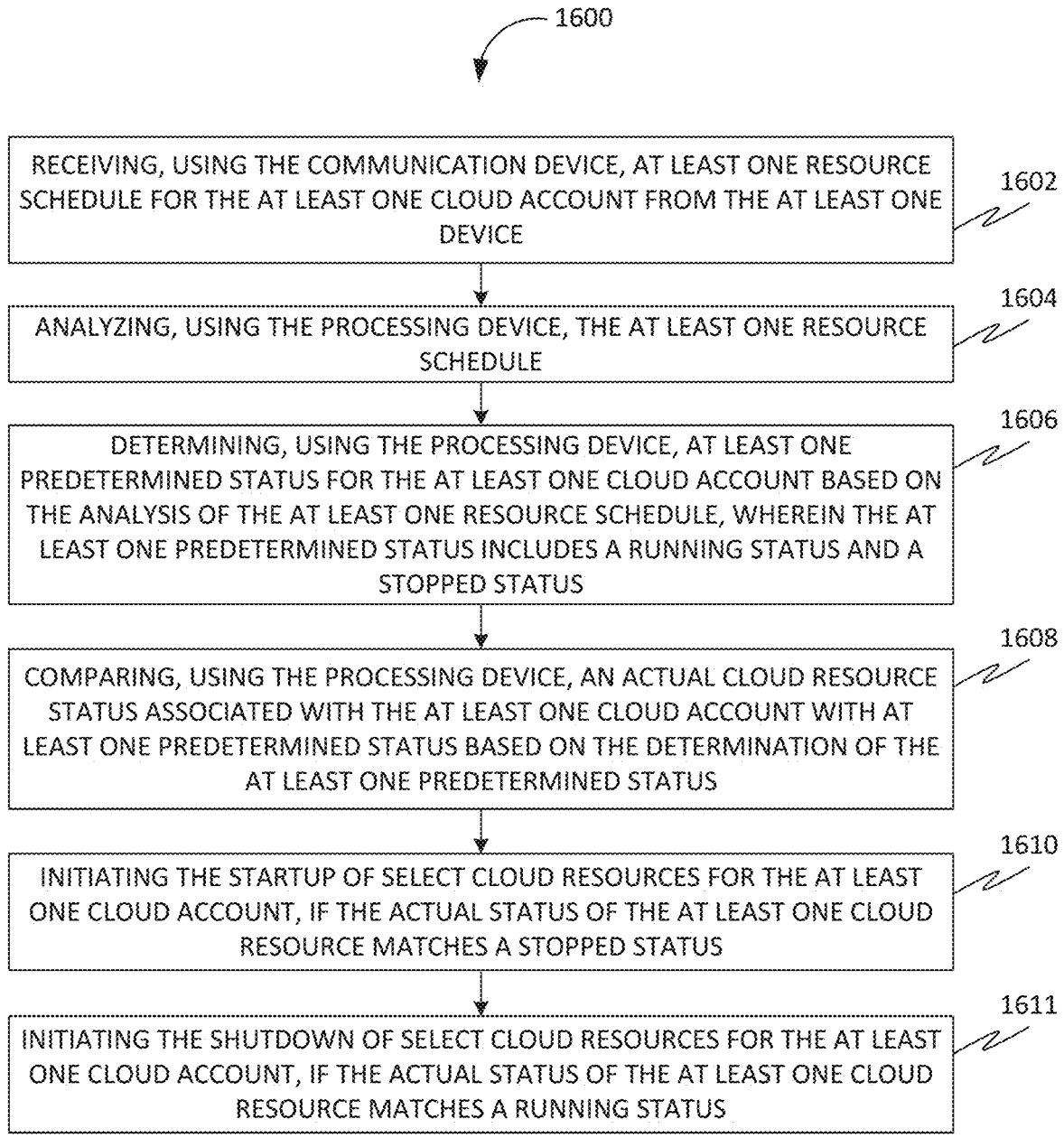
FIG. 16 is a flowchart of a method 1600 for dynamically terminating cloud resources when the cloud resources are not in use, in accordance with some embodiments.

FIG. 16 is a flowchart of a method 1600 for dynamically stopping cloud resources when the cloud resources are not in use, in accordance with some embodiments. Accordingly, the method 1600 may include a step 1602 of receiving, using the communication device, at least one resource schedule for the at least one cloud account from the at least one device. The method 1600 may include a step 1604 of analyzing, using the processing device, the at least one resource schedule. Further, the method 1600 may include a step 1606 of determining, using the processing device, at least one predetermined status for the at least one cloud account based on the analysis of the at least one resource schedule, wherein the at least one predetermined status includes a running status and a stopped status. The method 1600 may include a step 1608 of comparing, using the processing device, an actual cloud resource status associated with the at least one cloud account with at least one predetermined status based on the determination of the at least one predetermined status. In addition, the method 1600 may include a step 1610 of initiating the startup of select cloud resources for the at least one cloud account, if the actual status of the at least one cloud resource matches a stopped status. Alternatively, the method 1600 may also include a step 1611 of initiating the shutdown of select cloud resources for the at least one cloud account, if the actual status of the at least one cloud resource matches a running status.

In the preferred embodiment, the at least one resource schedule may correspond to predetermined working hours associated with the at least one cloud account, wherein the running status corresponds to working hours within the range of the predetermined working hours, and wherein the stopped status corresponds to non-working hours outside the range of the predetermined working hours. In other words, if the cloud resources are not running during predetermined working hours, the cloud resources can be dynamically started if the cloud resources have not been manually started. If the cloud resources are running during predetermined non-working hours, the cloud resources can be dynamically stopped to save cloud usage cost if the cloud resources are not manually stopped.

In an alternate embodiment, the at least one resource schedule corresponds to predetermined service level requirements (SLAs) associated with the at least one cloud account, wherein the running status corresponds to service levels within the range of SLAs, and wherein the stopped status corresponds to service levels outside the range of SLAs. In other words, if the usage of cloud resources by the cloud account falls within the SLAs, the cloud resources can be dynamically brought up and running if the cloud resources have not been manually started. Further, the cloud resources can be dynamically stopped if the usage of cloud resources by the cloud account falls outside the predetermined SLAs.

Figure 17:
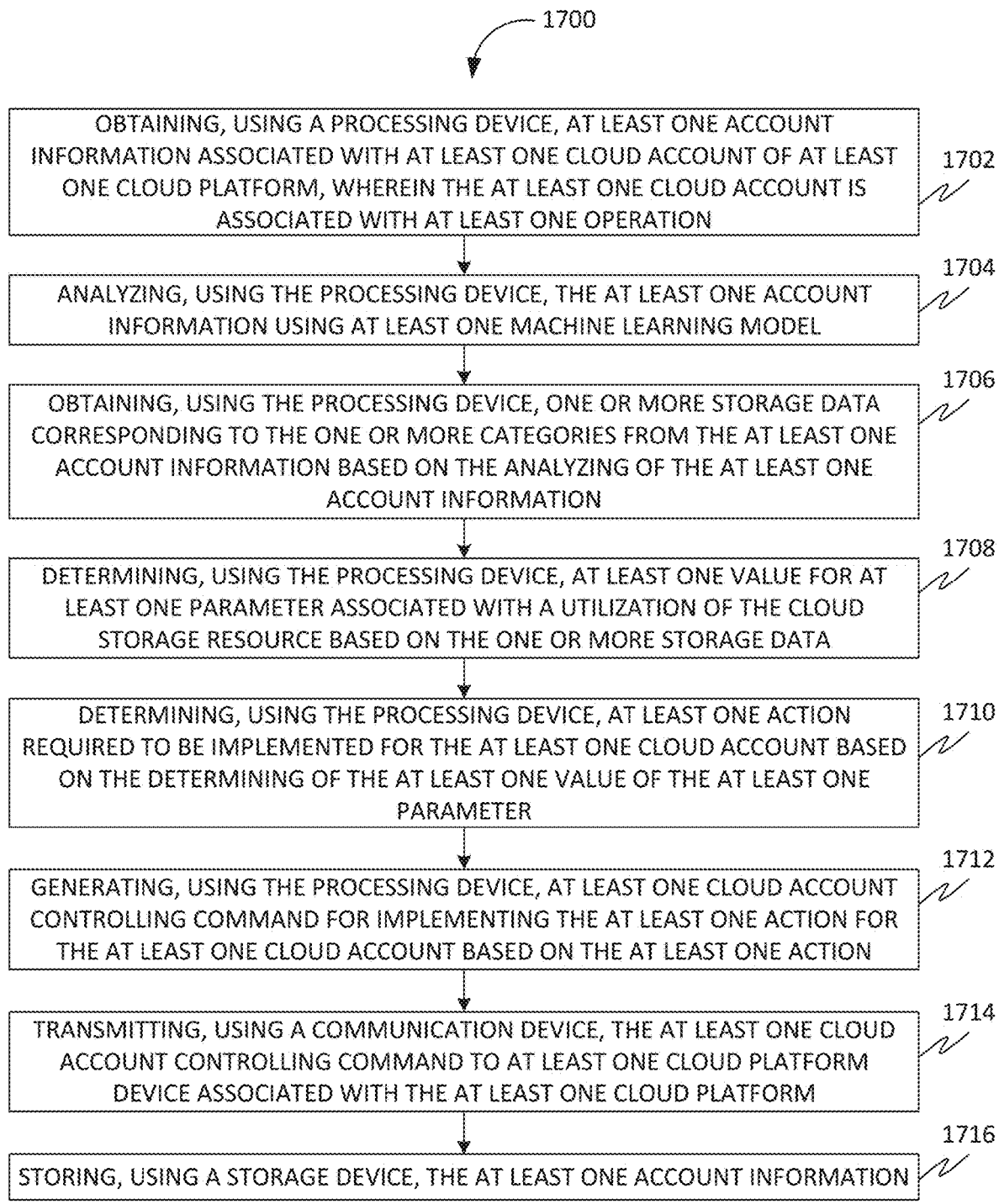
FIG. 17 is a flow chart for a method 1700 for facilitating managing cloud storage for operations, in accordance with some embodiments.

FIG. 17 is a flow chart for a method 1700 for facilitating managing cloud storage for operations, in accordance with some embodiments. Accordingly, at 1702, the method 1700 may include obtaining, using a processing device, at least one account information associated with at least one cloud account of at least one cloud platform. Further, the at least one cloud account may be associated with at least one operation. Further, the at least one account information may include a cloud storage resource usage information associated with a cloud storage resource of the at least one cloud account. Further, the at least one account information may include a cloud data stored in the cloud storage resource. Further, the at least one account information may include a current account information, a historical account information, etc. Further, the at least one operation may include hosting of an application (software application, web application, etc.), deployment of a project, etc. Further, the at least one cloud platform may be associated with a cloud environment. Further, the managing may include allocating, budgeting, etc. of the cloud storage resource. Further, the at least one account information may be obtained in real time from an instance of time.

Further, at 1704, the method 1700 may include analyzing, using the processing device, the at least one account information using at least one machine learning model. Further, the at least one machine learning model may include a first machine learning model. Further, the first machine learning model may be configured for identifying at least one of a pattern, a trend, and a correlation in the at least one account information. Further, the first machine learning model may be configured for classifying a cloud storage resource of the at least one cloud account into one or more categories based on the identifying of at least one of the pattern, the trend, and the correlation. Further, the cloud storage resource may include a storage type, a storage option, etc. Further, the cloud storage resource may include objects, files, blocks/managed disks, database storage, snapshots, images, volumes, etc.

Further, at 1706, the method 1700 may include obtaining, using the processing device, one or more storage data corresponding to the one or more categories from the at least one account information based on the analyzing of the at least one account information. Further, the one or more storage data may include a usage data associated with the one or more categories, a stored date in the one or more categories, etc. Further, the at least one machine learning model may include one or more proprietary algorithms. Further, the one or more proprietary algorithms may include a proprietary classification algorithm with adaptive learning "CloudThrottle IntelliClass", a proprietary machine learning algorithm "CloudGrowthPredictor", etc. Further, the at least one machine learning model may be a refined model developed using ProActive Storage & Budget Observability (ProSBO) Framework Implementation Process.

Further, at 1708, the method 1700 may include determining, using the processing device, at least one value for at least one parameter associated with a utilization of the cloud storage resource based on the one or more storage data. Further, the at least one parameter may include a storage size, a storage size change rate, a storage size growth rate, one or more storage metrics, usage metrics, a budget usage, a budget usage change rate, a budget usage growth rate, etc., of a cloud storage resource, a budgetary resource (budget), etc. associated with the one or more categories, the at least one cloud account, etc.

Further, at 1710, the method 1700 may include determining, using the processing device, at least one action required to be implemented for the at least one cloud account based on the determining of the at least one value of the at least one parameter. Further, the at least one action may include adjusting an allocation of the cloud storage resource, the budgetary resource (budget), dynamically allocating the cloud storage resource, the budgetary resource (budget), etc. for the one or more categories, the at least one cloud account, etc., dynamically adjusting the cloud storage resource, the budgetary resource (budget), etc. for the one or more categories, the at least one cloud account, etc. Further, the at least one action may be implemented using a proration mechanism, a rollover mechanism, a override mechanism, etc.

Further, at 1712, the method 1700 may include generating, using the processing device, at least one cloud account controlling command for implementing the at least one action for the at least one cloud account based on the at least one action.

Further, at 1714, the method 1700 may include transmitting, using a communication device, the at least one cloud account controlling command to at least one cloud platform device associated with the at least one cloud platform.

Further, at 1716, the method 1700 may include storing, using a storage device, the at least one account information.

Further, in some embodiments, the first machine learning model may be further configured for optimizing at least one initial classification criterion based on at least one of the pattern, the trend, and the correlation. Further, the first machine learning model may be configured for determining at least one classification criterion based on the optimizing of the at least one initial classification criterion. Further, the classifying of the cloud storage resource into the one or more categories may be based on the at least one classification criterion. Further, the at least one classification criterion may be dynamically updated.

Figure 18:
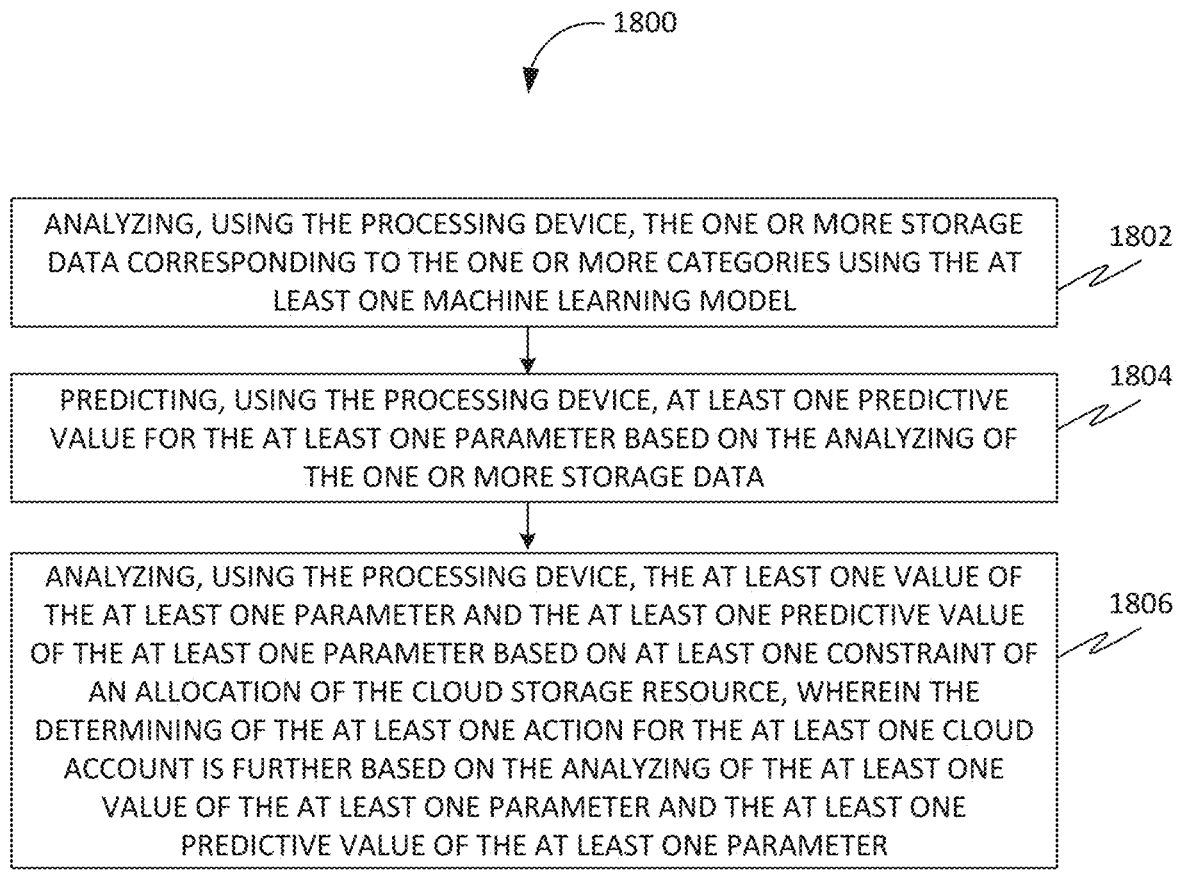
FIG. 18 is a flow chart for a method 1800 for facilitating managing cloud storage for operations, in accordance with some embodiments.

FIG. 18 is a flow chart for a method 1800 for facilitating managing cloud storage for operations, in accordance with some embodiments. Accordingly, at 1802, the method 1800 may include analyzing, using the processing device, the one or more storage data corresponding to the one or more categories using the at least one machine learning model. Further, the at least one machine learning model may include a second machine learning model. Further, the second machine learning model may be configured for identifying at least one of a pattern, a trend, and a correlation in the one or more storage data.

Further, at 1804, the method 1800 may include predicting, using the processing device, at least one predictive value for the at least one parameter based on the analyzing of the one or more storage data. Further, the at least one predictive value corresponds to a value of the at least one parameter after at least one time period in the future.

Further, at 1806, the method 1800 may include analyzing, using the processing device, the at least one value of the at least one parameter and the at least one predictive value of the at least one parameter based on at least one constraint of an allocation of the cloud storage resource. Further, the determining of the at least one action for the at least one cloud account may be based on the analyzing of the at least one value of the at least one parameter and the at least one predictive value of the at least one parameter. Further, the at least one constraint may be associated with the utilization of the cloud storage resource, the budgetary resource (budget), etc.

Figure 19:
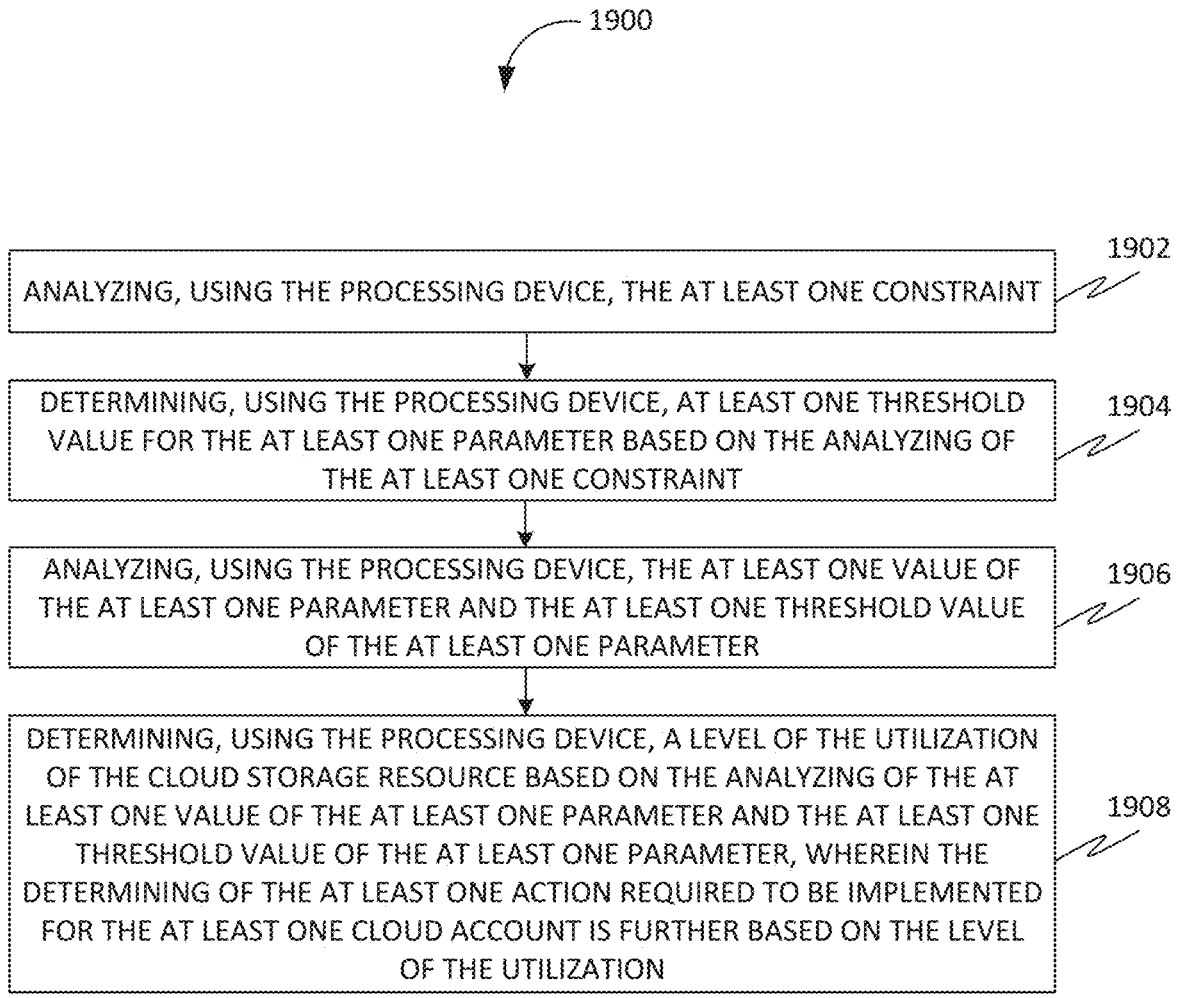
FIG. 19 is a flow chart for a method 1900 for facilitating managing cloud storage for operations, in accordance with some embodiments.

FIG. 19 is a flow chart for a method 1900 for facilitating managing cloud storage for operations, in accordance with some embodiments. Accordingly, at 1902, the method 1900 may include analyzing, using the processing device, the at least one constraint.

Further, at 1904, the method 1900 may include determining, using the processing device, at least one threshold value for the at least one parameter based on the analyzing of the at least one constraint.

Further, at 1906, the method 1900 may include analyzing, using the processing device, the at least one value of the at least one parameter and the at least one threshold value of the at least one parameter.

Further, at 1908, the method 1900 may include determining, using the processing device, a level of the utilization of the cloud storage resource based on the analyzing of the at least one value of the at least one parameter and the at least one threshold value of the at least one parameter. Further, the determining of the at least one action required to be implemented for the at least one cloud account may be further based on the level of the utilization. Further, the level corresponds to a soft cap and a hard cap.

Figure 20:
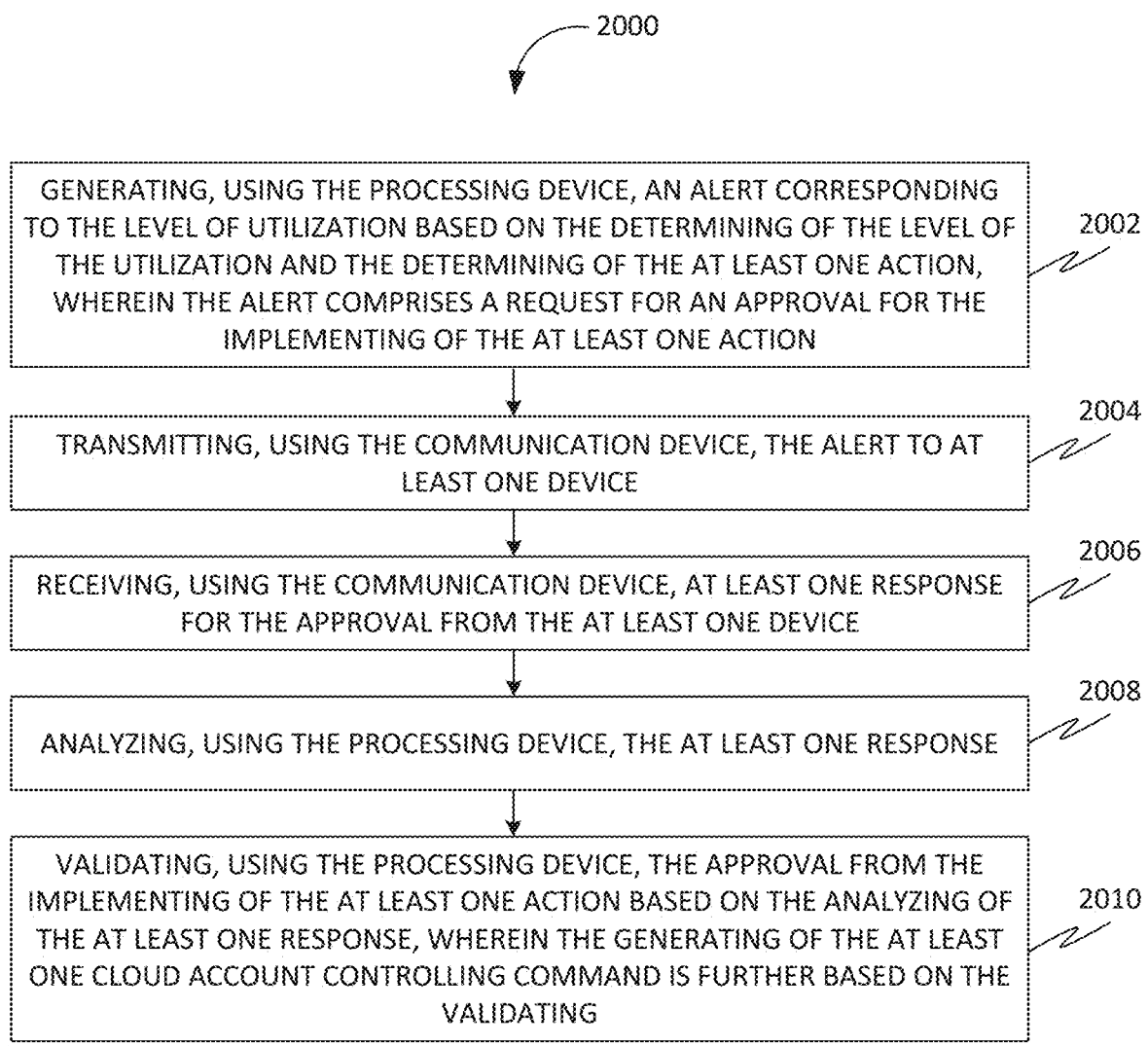
FIG. 20 is a flow chart for a method 2000 for facilitating managing cloud storage for operations, in accordance with some embodiments.

FIG. 20 is a flow chart for a method 2000 for facilitating managing cloud storage for operations, in accordance with some embodiments. Accordingly, at 2002, the method 2000 may include generating, using the processing device, an alert corresponding to the level of utilization based on the determining of the level of the utilization and the determining of the at least one action. Further, the alert may include a request for an approval for the implementing of the at least one action.

Further, at 2004, the method 2000 may include transmitting, using the communication device, the alert to at least one device.

Further, at 2006, the method 2000 may include receiving, using the communication device, at least one response for the approval from the at least one device.

Further, at 2008, the method 2000 may include analyzing, using the processing device, the at least one response.

Further, at 2010, the method 2000 may include validating, using the processing device, the approval from the implementing of the at least one action based on the analyzing of the at least one response. Further, the generating of the at least one cloud account controlling command may be further based on the validating.

Figure 21:
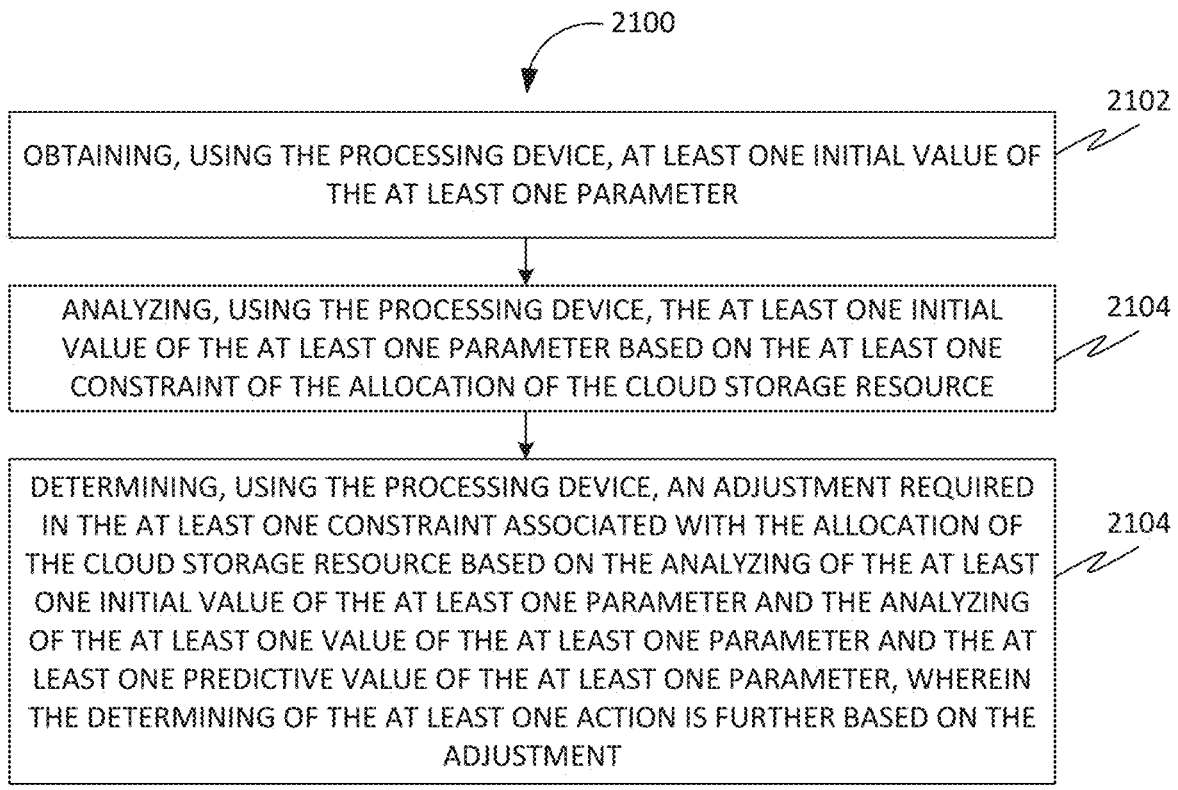
FIG. 21 is a flow chart for a method 2100 for facilitating managing cloud storage for operations, in accordance with some embodiments.

FIG. 21 is a flow chart for a method 2100 for facilitating managing cloud storage for operations, in accordance with some embodiments. Accordingly, at 2102, the method 2100 may include obtaining, using the processing device, at least one initial value of the at least one parameter.

Further, at 2104, the method 2100 may include analyzing, using the processing device, the at least one initial value of the at least one parameter based on the at least one constraint of the allocation of the cloud storage resource.

Further, at 2106, the method 2100 may include determining, using the processing device, an adjustment required in the at least one constraint associated with the allocation of the cloud storage resource based on the analyzing of the at least one initial value of the at least one parameter and the analyzing of the at least one value of the at least one parameter and the at least one predictive value of the at least one parameter. Further, the determining of the at least one action may be based on the adjustment.

Figure 22:
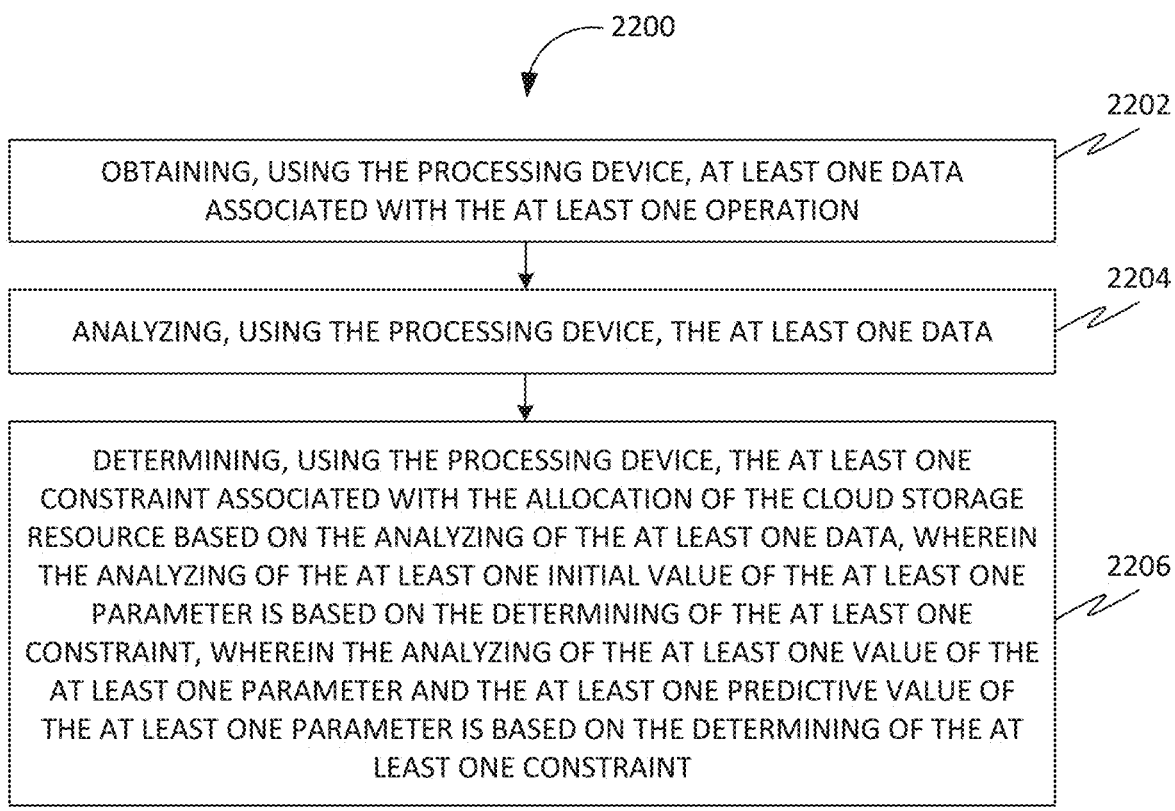
FIG. 22 is a flow chart for a method 2200 for facilitating managing cloud storage for operations, in accordance with some embodiments.

FIG. 22 is a flow chart for a method 2200 for facilitating managing cloud storage for operations, in accordance with some embodiments. Accordingly, at 2202, the method 2200 may include obtaining, using the processing device, at least one data associated with the at least one operation. Further, the at least one data may include a requirement for performing the at least one operation.

Further, at 2204, the method 2200 may include analyzing, using the processing device, the at least one data.

Further, at 2204, the method 2200 may include determining, using the processing device, the at least one constraint associated with the allocation of the cloud storage resource based on the analyzing of the at least one data. Further, the analyzing of the at least one initial value of the at least one parameter may be based on the determining of the at least one constraint. Further, the analyzing of the at least one value of the at least one parameter and the at least one predictive value of the at least one parameter may be based on the determining of the at least one constraint.

Figure 23:
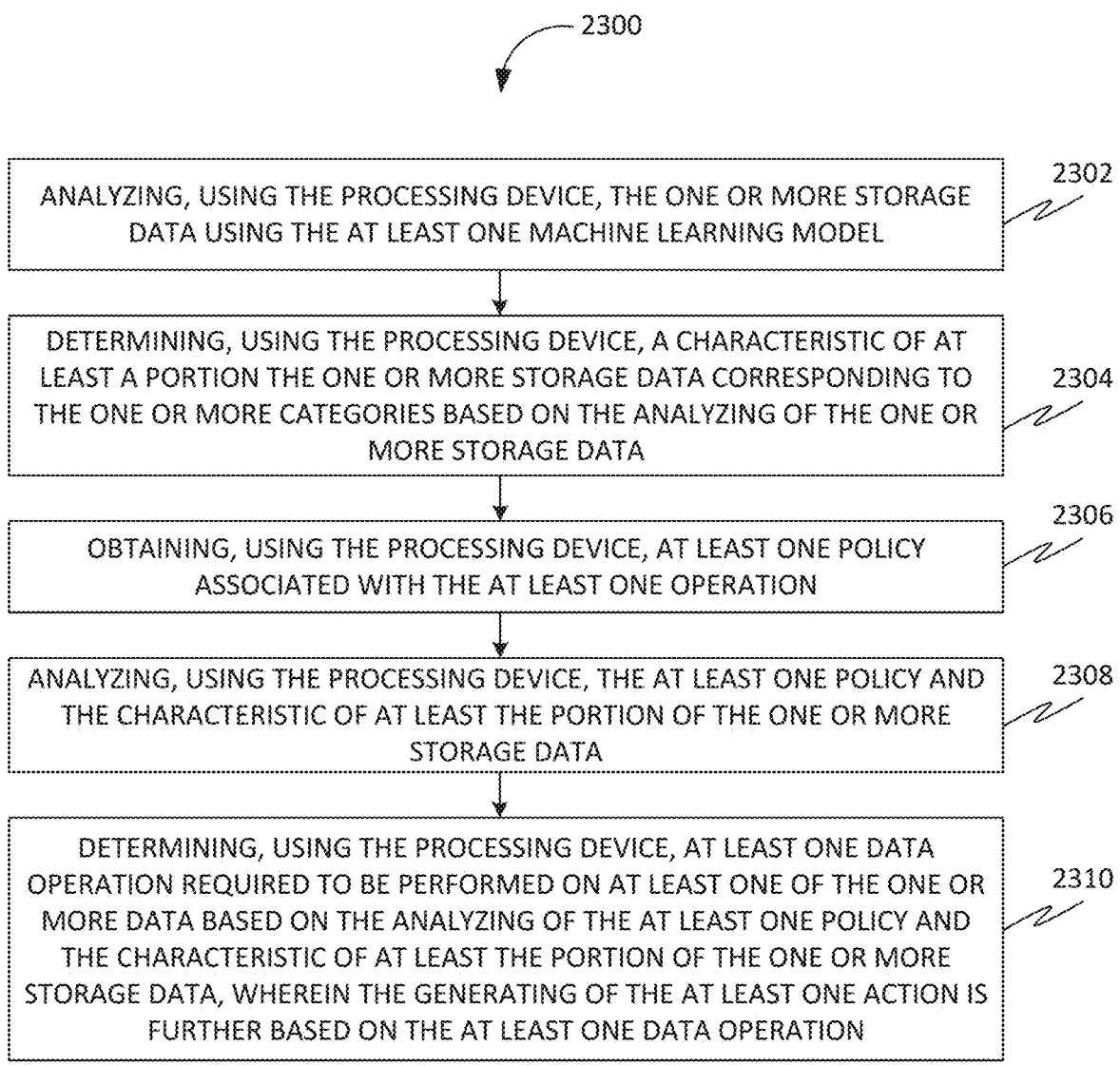
FIG. 23 is a flow chart for a method 2300 for facilitating managing cloud storage for operations, in accordance with some embodiments.

FIG. 23 is a flow chart for a method 2300 for facilitating managing cloud storage for operations, in accordance with some embodiments. Accordingly, at 2302, the method 2300 may include analyzing, using the processing device, the one or more storage data using the at least one machine learning model. Further, the at least one machine learning model may include a third machine learning model. Further, the third machine learning model may be configured for identifying at least one of a pattern, a trend, and a correlation in the one or more storage data.

Further, at 2304, the method 2300 may include determining, using the processing device, a characteristic of at least a portion the one or more storage data corresponding to the one or more categories based on the analyzing of the one or more storage data. Further, the characteristic may include an access pattern, a compliance requirement, a compliance risk, a data value, a cost consideration, etc.

Further, at 2306, the method 2300 may include obtaining, using the processing device, at least one policy associated with the at least one operation.

Further, at 2308, the method 2300 may include analyzing, using the processing device, the at least one policy and the characteristic of at least the portion of the one or more storage data.

Further, at 2308, the method 2300 may include determining, using the processing device, at least one data operation required to be performed on at least one of the one or more data based on the analyzing of the at least one policy and the characteristic of at least the portion of the one or more storage data. Further, the generating of the at least one action may be further based on the at least one data operation. Further, the at least one data operation may include tiering at least the portion of the one or more data, archiving at least the portion of the one or more data, deleting at least the portion of the one or more data, migrating at least the portion of the one or more data, etc. Further, the at least one data operation may include managing duplicates, orphans, snapshots of the cloud storage based on the determined characteristics to optimize data availability and storage efficiency for the at least one cloud account.

Figure 24:
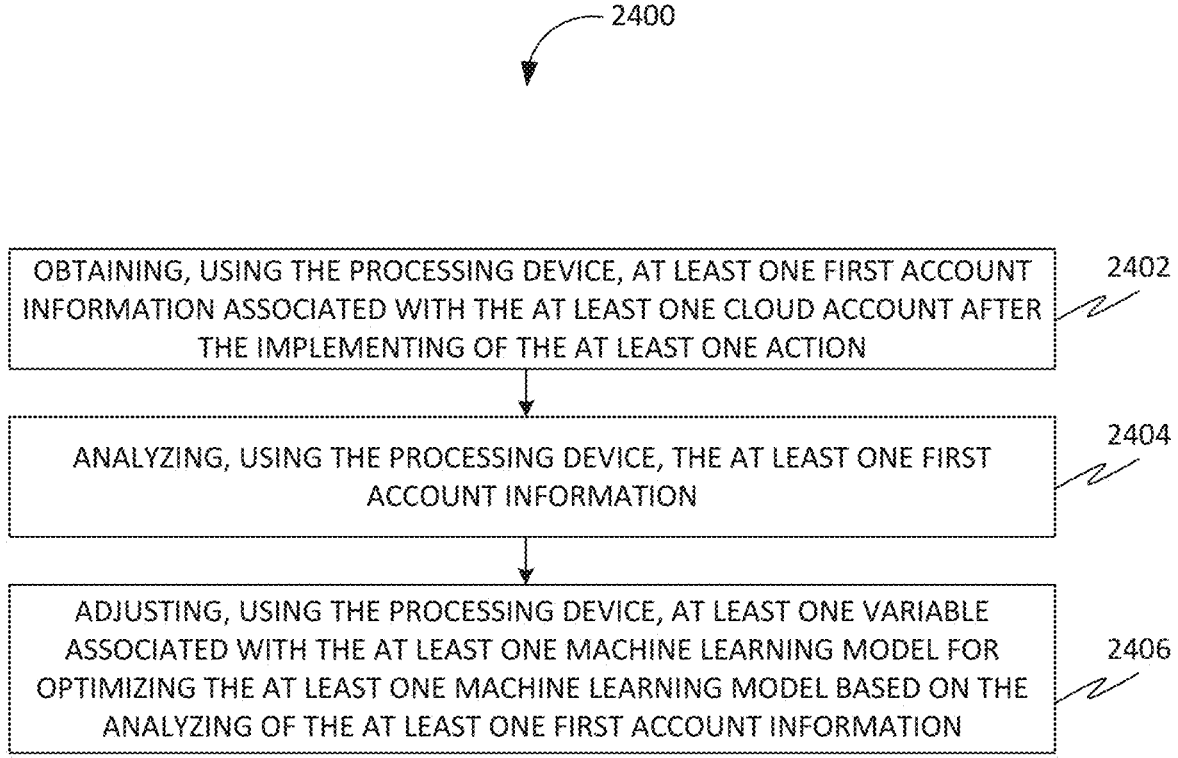
FIG. 24 is a flow chart for a method 2400 for facilitating managing cloud storage for operations, in accordance with some embodiments.

FIG. 24 is a flow chart for a method 2400 for facilitating managing cloud storage for operations, in accordance with some embodiments. Accordingly, at 2402, the method 2400 may include obtaining, using the processing device, at least one first account information associated with the at least one cloud account after the implementing of the at least one action.

Further, at 2404, the method 2400 may include analyzing, using the processing device, the at least one first account information.

Further, at 2406, the method 2400 may include adjusting, using the processing device, at least one variable associated with the at least one machine learning model for optimizing the at least one machine learning model based on the analyzing of the at least one first account information. Further, the at least one variable may include model parameters (weights), hyperparameters, optimizing algorithms, etc. associated with the at least one machine learning model.

Figure 25:
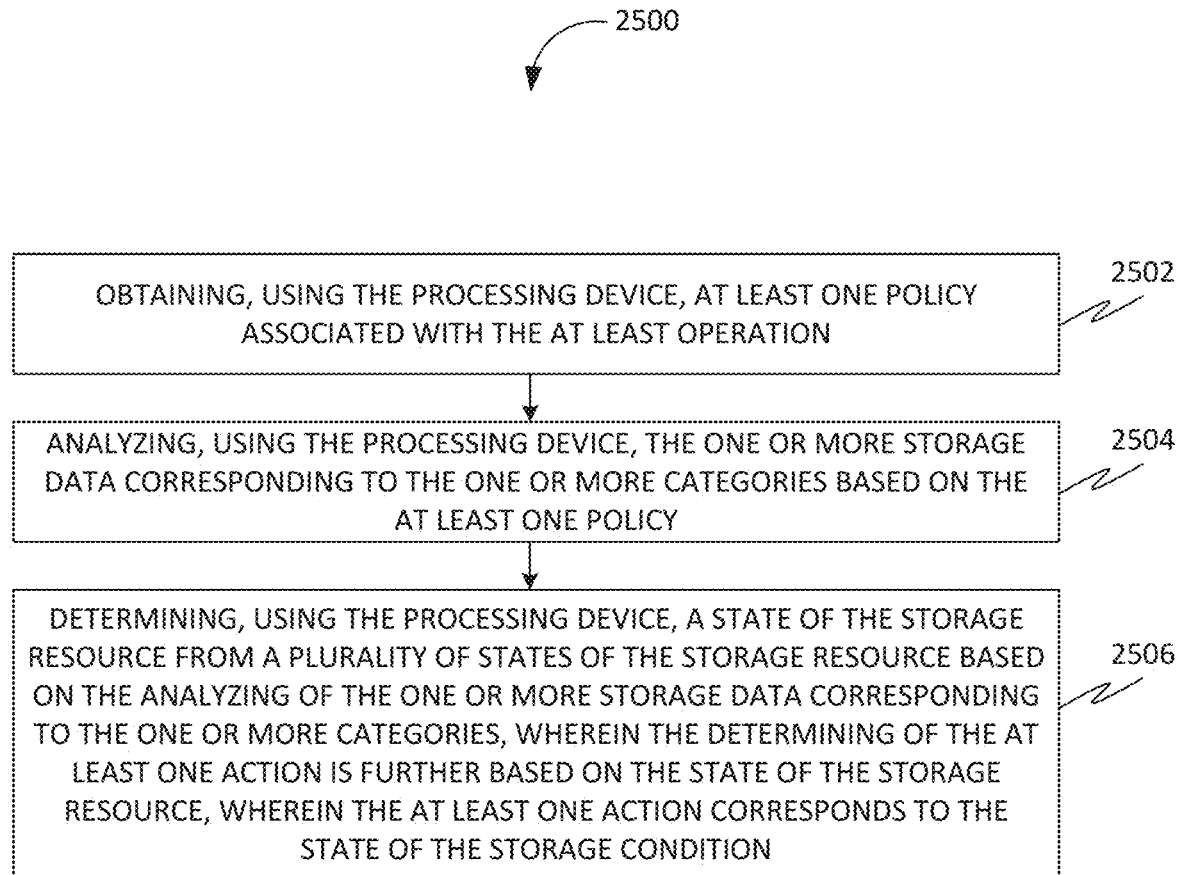
FIG. 25 is a flow chart for a method 2500 for facilitating managing cloud storage for operations, in accordance with some embodiments.

FIG. 25 is a flow chart for a method 2500 for facilitating managing cloud storage for operations, in accordance with some embodiments. Accordingly, at 2502, the method 2500 may include obtaining, using the processing device, at least one policy associated with the at least operation.

Further, at 2504, the method 2500 may include analyzing, using the processing device, the one or more storage data corresponding to the one or more categories based on the at least one policy.

Further, at 2506, the method 2500 may include determining, using the processing device, a state of the storage resource from a plurality of states of the storage resource based on the analyzing of the one or more storage data corresponding to the one or more categories. Further, the determining of the at least one action may be based on the state of the storage resource. Further, the at least one action corresponds to the state of the storage condition.

Figure 26:
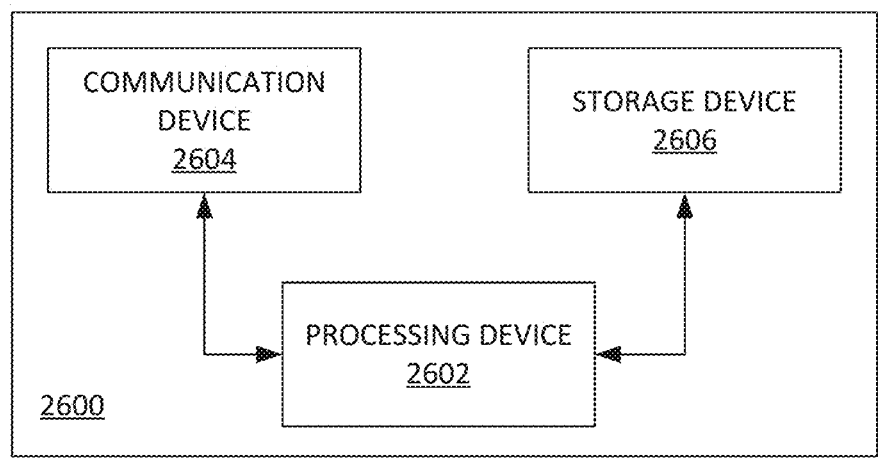
FIG. 26 is a block diagram of a system 2600 for facilitating managing cloud storage for operations, in accordance with some embodiments.

FIG. 26 is a block diagram of a system 2600 for facilitating managing cloud storage for operations, in accordance with some embodiments. Accordingly, the system 2600 may include a processing device 2602, a communication device 2604, and a storage device 2606. Further, the system 2600 may include an AI-driven cloud storage management system.

Further, the processing device 2602 may be configured for obtaining at least one account information associated with at least one cloud account of at least one cloud platform. Further, the at least one cloud account may be associated with at least one operation. Further, the processing device 2602 may be configured for analyzing the at least one account information using at least one machine learning model. Further, the at least one machine learning model may include a first machine learning model. Further, the first machine learning model may be configured for identifying at least one of a pattern, a trend, and a correlation in the at least one account information. Further, the first machine learning model may be configured for classifying a cloud storage resource of the at least one cloud account into one or more categories based on the identifying of at least one of the pattern, the trend, and the correlation. Further, the processing device 2602 may be configured for obtaining one or more storage data corresponding to the one or more categories from the at least one account information based on the analyzing of the at least one account information. Further, the processing device 2602 may be configured for determining at least one value for at least one parameter associated with a utilization of the cloud storage resource based on the one or more storage data. Further, the processing device 2602 may be configured for determining at least one action required to be implemented for the at least one cloud account based on the determining of the at least one value of the at least one parameter. Further, the processing device 2602 may be configured for generating at least one cloud account controlling command for implementing the at least one action for the at least one cloud account based on the at least one action.

Figure 27:
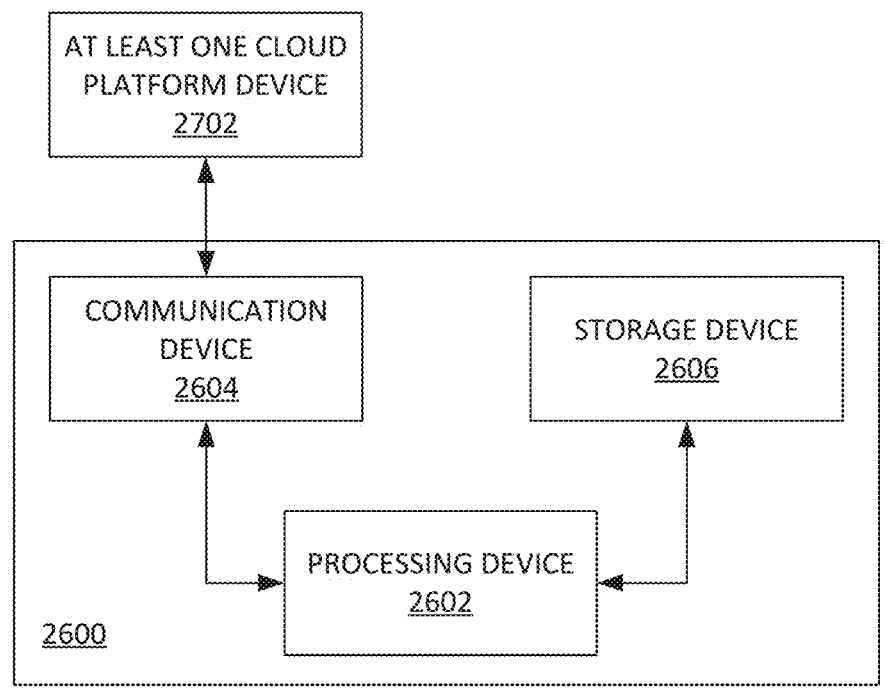
FIG. 27 is a block diagram of the system 2600, in accordance with some embodiments.

Further, the communication device 2604 may be communicatively coupled with the processing device 2602. Further, the communication device 2604 may be configured for transmitting the at least one cloud account controlling command to at least one cloud platform device 2702, as shown in FIG. 27, associated with the at least one cloud platform. Further, the at least one cloud platform device 2702 may include a server, a cloud server, a storage gateway appliance, a storage gateway device, a network attached storage (NAS) device, a load balancer, a networking device, etc.

Further, the storage device 2606 may be communicatively coupled with the communication device 2604. Further, the storage device 2606 may be configured for storing the at least one account information.

Further, in some embodiment, the first machine learning model may be configured for optimizing at least one initial classification criterion based on at least one of the pattern, the trend, and the correlation. Further, the first machine learning model may be configured for determining at least one classification criterion based on the optimizing of the at least one initial classification criterion. Further, the classifying of the cloud storage resource into the one or more categories may be based on the at least one classification criterion.

Further, in some embodiments, the processing device 2602 may be configured for analyzing the one or more storage data corresponding to the one or more categories using the at least one machine learning model. Further, the at least one machine learning model may include a second machine learning model. Further, the second machine learning model may be configured for identifying at least one of a pattern, a trend, and a correlation in the one or more storage data. Further, the processing device 2602 may be configured for predicting at least one predictive value for the at least one parameter based on the analyzing of the one or more storage data. Further, the processing device 2602 may be configured for analyzing the at least one value of the at least one parameter and the at least one predictive value of the at least one parameter based on at least one constraint of an allocation of the cloud storage resource. Further, the determining of the at least one action for the at least one cloud account may be based on the analyzing of the at least one value of the at least one parameter and the at least one predictive value of the at least one parameter.

Further, in an embodiment, the processing device 2602 may be configured for analyzing the at least one constraint. Further, the processing device 2602 may be configured for determining at least one threshold value for the at least one parameter based on the analyzing of the at least one constraint. Further, the processing device 2602 may be configured for analyzing the at least one value of the at least one parameter and the at least one threshold value of the at least one parameter. Further, the processing device 2602 may be configured for determining a level of the utilization of the cloud storage resource based on the analyzing of the at least one value of the at least one parameter and the at least one threshold value of the at least one parameter. Further, the determining of the at least one action required to be implemented for the at least one cloud account may be further based on the level of the utilization.

Figure 28:
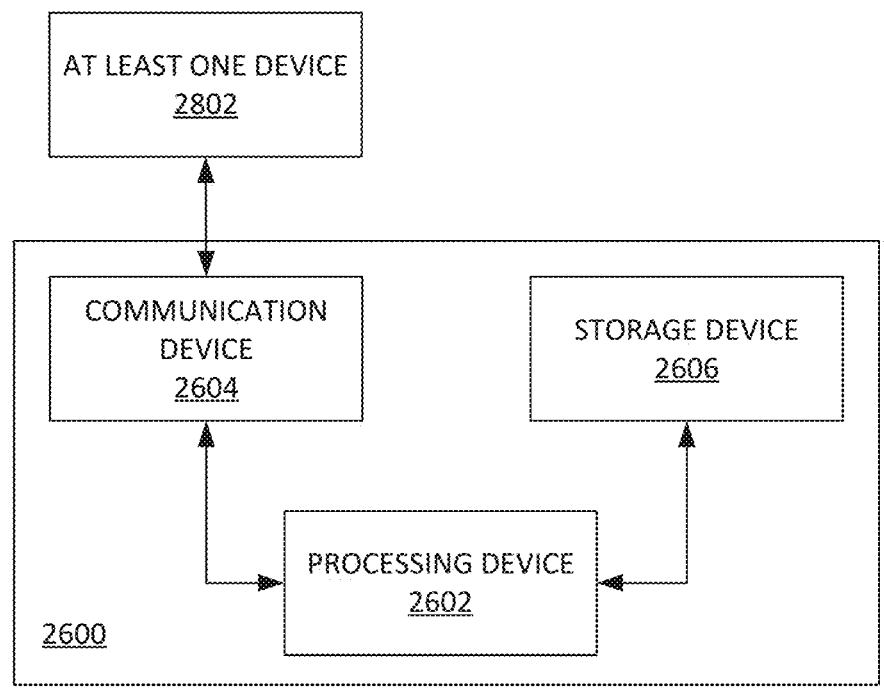
FIG. 28 is a block diagram of the system 2600, in accordance with some embodiments.

Further, in an embodiment, the processing device 2602 may be further configured for generating an alert corresponding to the level of utilization based on the determining of the level of the utilization and the determining of the at least one action. Further, the alert may include a request for an approval for the implementing of the at least one action. Further, the processing device 2602 may be configured for analyzing at least one response. Further, the processing device 2602 may be configured for validating the approval from the implementing of the at least one action based on the analyzing of the at least one response. Further, the generating of the at least one cloud account controlling command may be based on the validating. Further, the communication device 2604 may be configured for transmitting the alert to at least one device 2802, as shown in FIG. 28. Further, the communication device 2604 may be configured for receiving the at least one response for the approval from the at least one device 2802. Further, the at least one device 2802 may include a client device, a user device, a computing device, a sensor, etc.

Further, in an embodiment, the processing device 2602 may be further configured for obtaining at least one initial value of the at least one parameter. Further, the processing device 2602 may be configured for analyzing the at least one initial value of the at least one parameter based on the at least one constraint of the allocation of the cloud storage resource. Further, the processing device 2602 may be configured for determining an adjustment required in the at least one constraint associated with the allocation of the cloud storage resource based on the analyzing of the at least one initial value of the at least one parameter and the analyzing of the at least one value of the at least one parameter and the at least one predictive value of the at least one parameter. Further, the determining of the at least one action may be based on the adjustment.

Further, in an embodiment, the processing device 2602 may be configured for obtaining at least one data associated with the at least one operation. Further, the processing device 2602 may be configured for analyzing the at least one data. Further, the processing device 2602 may be configured for determining the at least one constraint associated with the allocation of the cloud storage resource based on the analyzing of the at least one data. Further, the analyzing of the at least one initial value of the at least one parameter may be based on the determining of the at least one constraint. Further, the analyzing of the at least one value of the at least one parameter and the at least one predictive value of the at least one parameter may be based on the determining of the at least one constraint.

Further, in some embodiments, the processing device 2602 may be configured for analyzing the one or more storage data using the at least one machine learning model. Further, the at least one machine learning model may include a third machine learning model. Further, the third machine learning model may be configured for identifying at least one of a pattern, a trend, and a correlation in the one or more storage data. Further, the processing device 2602 may be configured for determining a characteristic of at least a portion the one or more storage data corresponding to the one or more categories based on the analyzing of the one or more storage data. Further, the processing device 2602 may be configured for obtaining at least one policy associated with the at least one operation. Further, the processing device 2602 may be configured for analyzing the at least one policy and the characteristic of at least the portion of the one or more storage data. Further, the processing device 2602 may be configured for determining at least one data operation required to be performed on at least one of the one or more data based on the analyzing of the at least one policy and the characteristic of at least the portion of the one or more storage data. Further, the generating of the at least one action may be based on the at least one data operation.

Further, in some embodiments, the processing device 2602 may be configured for obtaining at least one first account information associated with the at least one cloud account after the implementing of the at least one action. Further, the processing device 2602 may be configured for analyzing the at least one first account information. Further, the processing device 2602 may be configured for adjusting at least one variable associated with the at least one machine learning model for optimizing the at least one machine learning model based on the analyzing of the at least one first account information.

Further, in some embodiments, the processing device 2602 may be configured for obtaining at least one policy associated with the at least operation. Further, the processing device 2602 may be configured for analyzing the one or more storage data corresponding to the one or more categories based on the at least one policy. Further, the processing device 2602 may be configured for determining a state of the storage resource from a plurality of states of the storage resource based on the analyzing of the one or more storage data corresponding to the one or more categories. Further, the determining of the at least one action may be based on the state of the storage resource. Further, the at least one action corresponds to the state of the storage condition.

Further, the system 2600 may include an interface module configured to integrate with external platforms like observability dashboard or any other third party tools.

FIG. 27 is a block diagram of the system 2600, in accordance with some embodiments.

FIG. 28 is a block diagram of the system 2600, in accordance with some embodiments.

Figure 29:
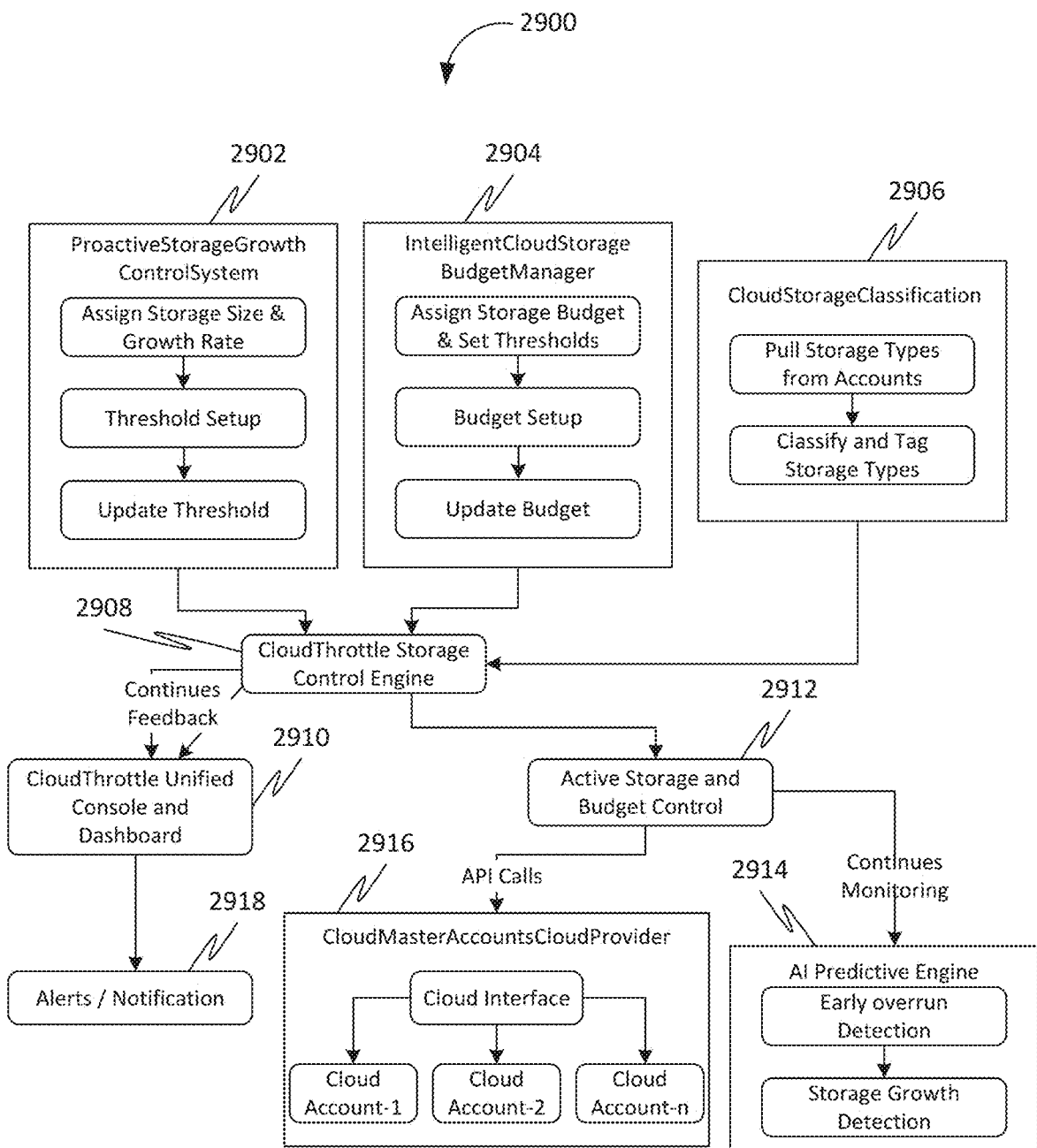
FIG. 29 is a block diagram of a system 2900 for facilitating managing a cloud storage budget using artificial intelligence, in accordance with some embodiments.

FIG. 29 is a block diagram of a system 2900 for facilitating managing a cloud storage budget using artificial intelligence, in accordance with some embodiments. Accordingly, the system 2900 may be configured for proactive management of cloud storage resources to optimize both performance and cost. Further, the system 2900 may include a proactive storage growth control system 2902, an intelligent cloud storage budget management system 2904, a cloud storage classification system 2906, a CloudThrottle storage control engine 2908, a CloudThrottle unified console and dashboard 2910, an active storage and budget control unit 2912, an AI predictive engine 2914, and a cloud provider 2916.

Further, the CloudThrottle storage control engine 2908 may be communicatively coupled with the proactive storage growth control system 2902, the intelligent cloud storage budget management system 2904, the cloud storage classification system 2906, the CloudThrottle unified console and dashboard 2910, and the active storage and budget control unit 2912. Further, the active storage and budget control unit 2912 may be communicatively coupled with the cloud provider 2916 and the AI predictive engine 2914. Further, the alerts/notification 2918 may be communicatively coupled with the CloudThrottle unified console and dashboard 2910. Further, the proactive storage growth control system 2902 may include a mechanism for controlling storage growth by assigning storage sizes and growth rates, setting up thresholds, and updating those thresholds as necessary. Further, the intelligent cloud storage budget management system 2904 focuses on managing storage-related finances by assigning budgets and thresholds, establishing budget setups, and providing a mechanism to update the budget in response to changing needs. Further, the CloudThrottle storage control engine 2908 is a central control unit that links the proactive storage growth control system 2902 and the Intelligent Cloud Storage Budget Management system 2904. Further, the CloudThrottle storage control engine 2908 receives continuous feedback and actively observes the storage and budget control decisions. Further, the CloudThrottle unified console and dashboard 2910 connect to a user interface 2918, which displays alerts and notifications derived from the engine's control activities. Further, the cloud master accounts (cloud provider) 2916 represent the cloud infrastructure's architecture, with a cloud interface serving as a point of interaction for multiple cloud accounts (Cloud Account-1, Cloud Account-2, etc.), which contain the different storage data types. Further, the cloud storage classification system 2906 involves pulling different storage types from accounts, classifying them, and tagging them for organized management. Further, the AI predictive engine 2914 is an AI component that detects early overruns and storage growth to predict and prevent potential issues related to storage capacity and budgeting.

Figure 30:
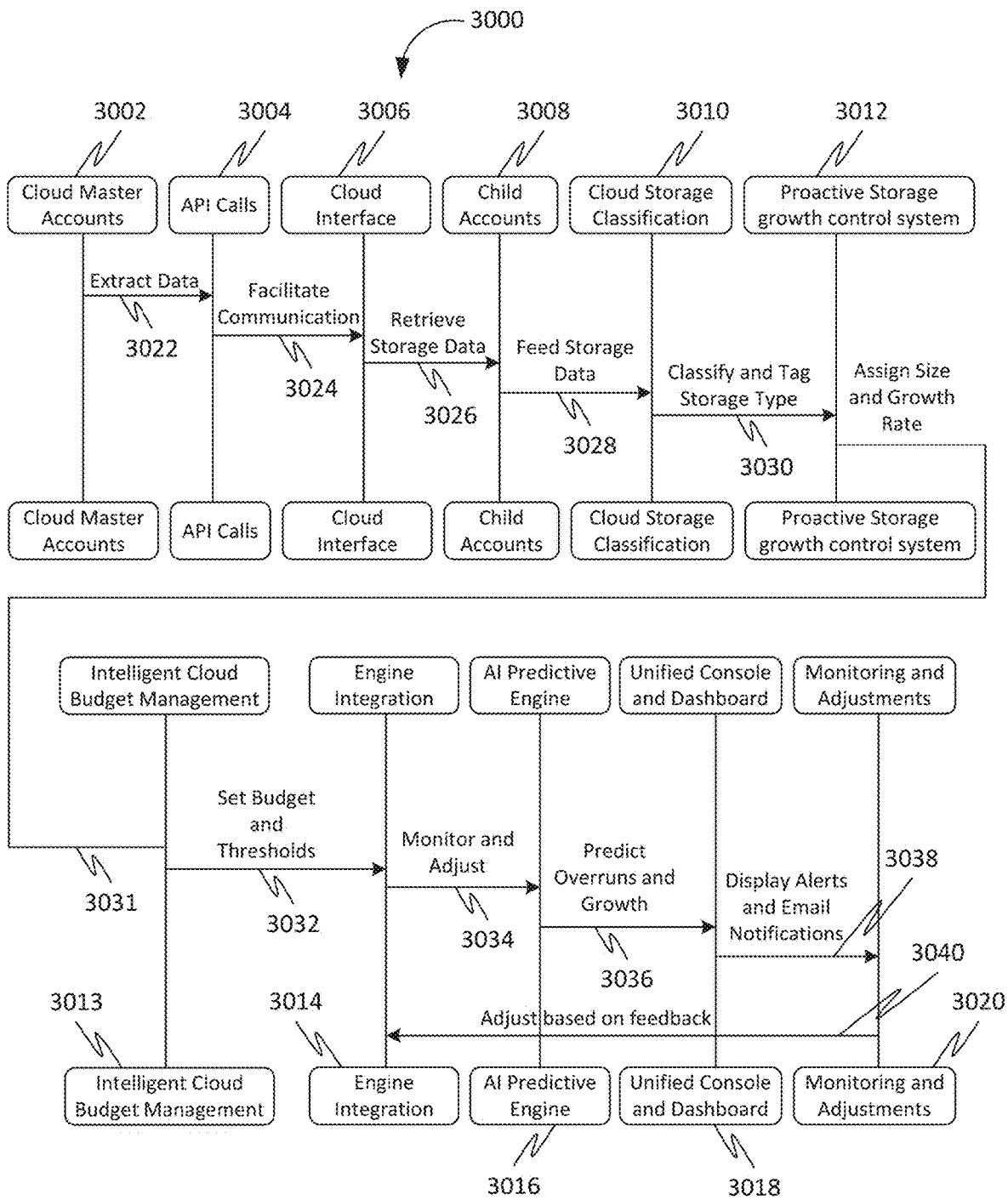
FIG. 30 is a flow diagram of a method 3000 for facilitating managing a cloud storage budget using artificial intelligence, in accordance with some embodiments.

FIG. 30 is a flow diagram of a method 3000 for facilitating managing a cloud storage budget using artificial intelligence, in accordance with some embodiments. Accordingly, the method 3000 may represent a flow of operations and interactions between various components within a cloud storage management system over time.

Further, the method 3000 may include an interaction from cloud master accounts 3002 to API Calls 3004. Further, at 3022, the method 3000 begins with Cloud Master Accounts 3002 initiating communication and makes API calls 3004 to extract data, indicating the first step in data retrieval from the cloud service provider.

Further, the method 3000 may include an interaction from the API calls 3004 to a Cloud Interface 3006. Further, at 3024, the API calls 3004 facilitate communication with the Cloud Interface 3006. Further, the method 3000 may include processing the API calls 3004 to engage with the underlying cloud infrastructure, ensuring the cloud interface 3006 can retrieve the necessary data.

Further, the method 3000 may include an interaction from the Cloud Interface 3006 to Child Accounts 3008. Further, at 3026, the Cloud Interface 3006 proceeds to retrieve storage data by communicating with the Child Accounts 3008. Further, the data is specific to each child account 3008 under the cloud provider's management is accessed.

Further, the method 3000 may include an interaction from the Child Accounts 3008 to Cloud Storage Classification 3010. Further, at 3028, providing the retrieved storage data from the child accounts 3008 to the Cloud Storage Classification 3010. This indicates the classification and organization of storage data, where different types of storage (e.g., block, file, object) are identified and tagged for management purposes.

Further, the method 3000 may include an interaction from the Cloud Storage Classification 3010 to Proactive Storage Growth Control System 3012. Further, at 3030, the storage type is classified and tagged. Once the storage types are classified, the information is passed to the Proactive Storage Growth Control System 3012. This system assigns storage sizes and predicts growth rates, setting up thresholds that trigger alerts or actions when exceeded. It's responsible for managing and controlling the growth of storage based on predefined criteria.

Further, the method 3000 may include an interaction from the Proactive Storage Growth Control System 3012 to Intelligent Cloud Budget Management 3013. This interaction represents the transition from managing storage growth to managing the budget. The system assigns a budget for storage expenses and sets thresholds for spending to control costs, integrating storage management with financial oversight. Further, at 3031, size and growth rate are assigned.

Further, the method 3000 may include an interaction from Intelligent Cloud Budget Management 3013 to Engine Integration 3014. Further, at 3032, budget and threshold are set. The budget and thresholds set by the intelligent cloud budget management 3013 are then integrated into the Engine. This Engine actively regulates and fine-tunes storage utilization and budgeting in real-time, ensuring efficient use of resources and adherence to budget constraints.

Further, the method 3000 may include an interaction from Engine Integration 3014 to AI Predictive Engine 3016. Further, at 3034, monitoring and adjusting are performed. The Engine Integration 3014 sends data to the AI Predictive Engine 3016, which monitors storage usage and adjusts thresholds and budgets based on predictive analytics. This AI engine 3016 is capable of predicting potential budget overruns and storage growth trends, enabling proactive management of resources.

Further, the method 3000 may include an interaction from AI Predictive Engine 3016 to Unified Console and Dashboard 3018. Further, at 3036 overruns and growth are predicted. The predictive insights and alerts generated by the AI Predictive Engine 3016 are then displayed on the Unified Console and Dashboard 3018. This provides a centralized interface for monitoring storage and budget statuses, alerting users to significant occurrences or when set thresholds are crossed.

Further, the method 3000 may include an interaction from Unified Console and Dashboard 3018 for Monitoring and Adjustments 3020. Further, at 3038 alerts and email notifications are displayed. Finally, the system ensures continuous optimization through active monitoring and adjustments. Further, at 3040, with the feedback and insights gained from the dashboard, necessary adjustments are made to storage and budget controls to keep the system within its operational and financial boundaries.

Figure 31:
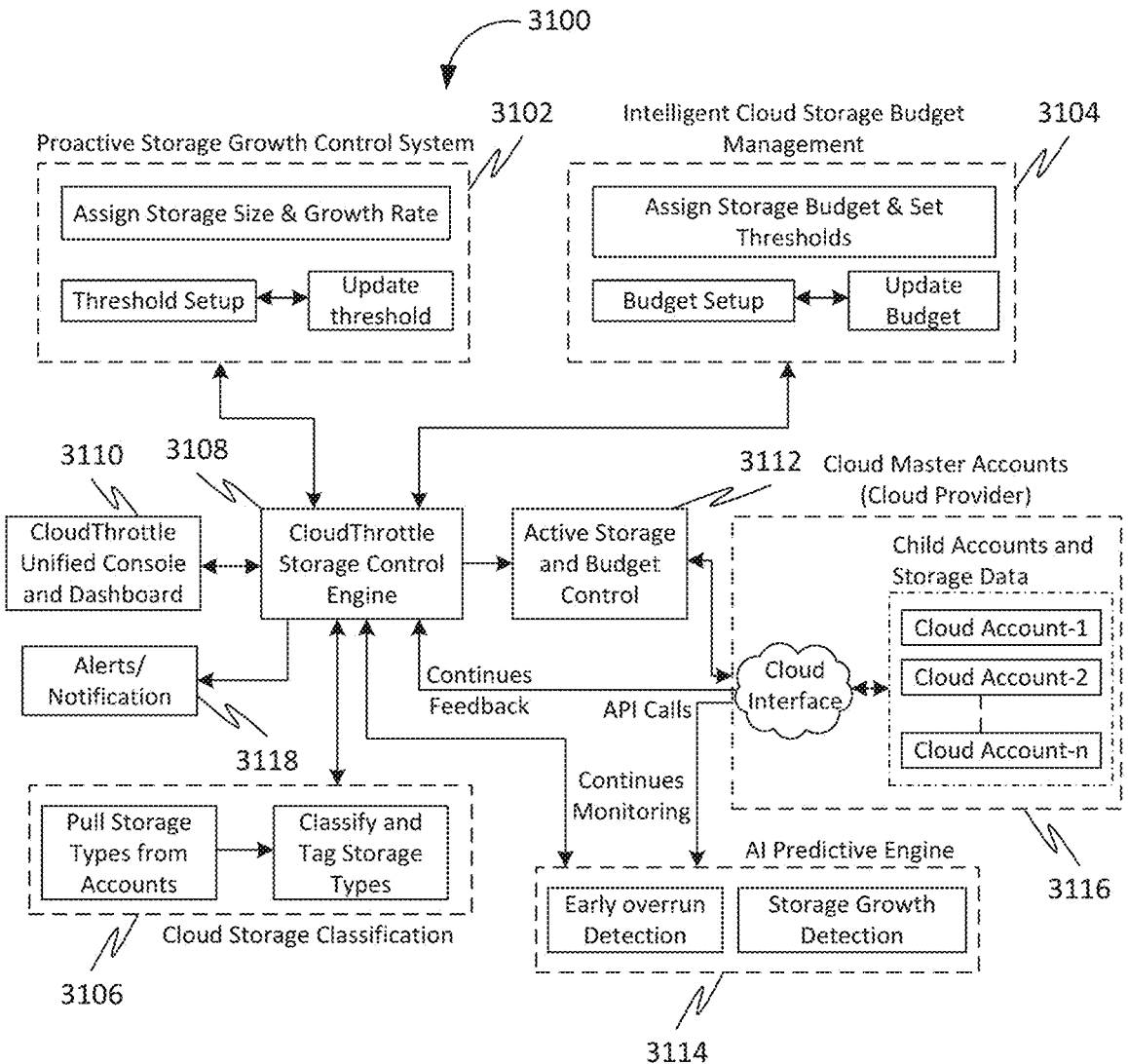
FIG. 31 is a block diagram of a system 3100 for facilitating managing a cloud storage budget using artificial intelligence, in accordance with some embodiments.

FIG. 31 is a block diagram of a system 3100 for facilitating managing a cloud storage budget using artificial intelligence, in accordance with some embodiments. Further, the system 3100 may include a proactive storage growth control system 3102, an intelligent cloud storage budget management system 3104, a cloud storage classification system 3106, a CloudThrottle storage control engine 3108, a CloudThrottle unified console and dashboard 3110, an active storage and budget control unit 3112, an AI predictive engine 3114, a cloud provider 3116, and an interface 3118 for displaying alerts/notification.

Further, the system 3100 may be associated with a process for facilitating managing the cloud storage budget using the artificial intelligence. Further, the process may be associated with connectivity and data retrieval, the cloud storage classification 3106, the proactive storage growth control system 3102, intelligent cloud budget management system 3104, engine integration, AI predictive engine 3114, CloudThrottle unified console and dashboard 3110, and monitoring and adjustment.

Further, the process associated with the connectivity and data retrieval may include establishing connectivity with the cloud service provider's master accounts, which oversee multiple child accounts, utilizing API calls to extract data from master accounts, which includes information from the individual child accounts (Cloud Account-1, Cloud Account-2, ..., Cloud Account-n), engaging with the cloud interface to facilitate the communication and data retrieval from the cloud accounts, obtaining specific storage data from each of the child accounts under the cloud provider's master account, and implementing ongoing surveillance to monitor the storage data and ensure accurate and up-to-date information retrieval.

Further, the process associated with the cloud storage classification system 3106 may include pulling storage types from accounts which includes gathering information on all storage types across the child accounts and classifying and tagging storage types which include categorizing the storage types and assigning tags for simplified management.

Further, the process associated with the proactive storage growth control system 3102 may include assigning storage size & growth rate which includes allocating storage sizes and predicting growth rates for the organized storage types, setting up thresholds which includes establishing thresholds that will trigger alerts or actions when exceeded, updating threshold which includes a provision to revise the thresholds based on the actual usage and growth patterns to maintain control over the storage growth.

Further, the process associated with intelligent cloud budget management system 3104 may include assigning storage budget & setting thresholds which include designating a budget for storage expenses and setting thresholds for spending to preemptively control costs, setting up a budget that includes creating a comprehensive budgeting framework that considers the assigned storage budget and thresholds, and updating budget & threshold which include updating the budget to stay aligned with the actual storage costs and usage.

Further, the process associated with engine Integration may include centralizing the functionality of storage and budget management within the CloudThrottle storage control engine 3108, ensuring the engine actively regulates and fine-tunes storage utilization and budgeting in real-time using the active storage and budget control unit 3116 and providing continuous feedback to the CloudThrottle console by the engine to refine and optimize performance.

Further, the process associated with the AI predictive engine 3114 may include implementing the AI predictive engine 3114 to foresee potential budget overruns before they happen based on early overrun detection and using AI to analyze storage growth trends, aiding in future capacity and budget planning based on the storage growth detection.

Further, the process associated with unified console and dashboard 3110 may include integrating control and monitoring through CloudThrottle, which links to the engine and presents all relevant data, and developing a system within CloudThrottle to notify users of significant occurrences or when set thresholds are crossed based on alerts/notifications through the interface 3118.

Further, the process associated with monitoring and adjustments may include continuing the ongoing management of storage and budget through the engine, with adjustments made as necessary based on the active storage and budget control 3112 and applying modifications based on the active monitoring and the insights from the AI predictive engine 3114 to ensure that storage usage stays within budget and meets organizational needs based on the adjustments.

Further, the process establishes a cohesive system that manages cloud storage classification and budgeting and leverages AI for predictive analytics with a structure that supports continuous adjustments and feedback.

Figure 32:
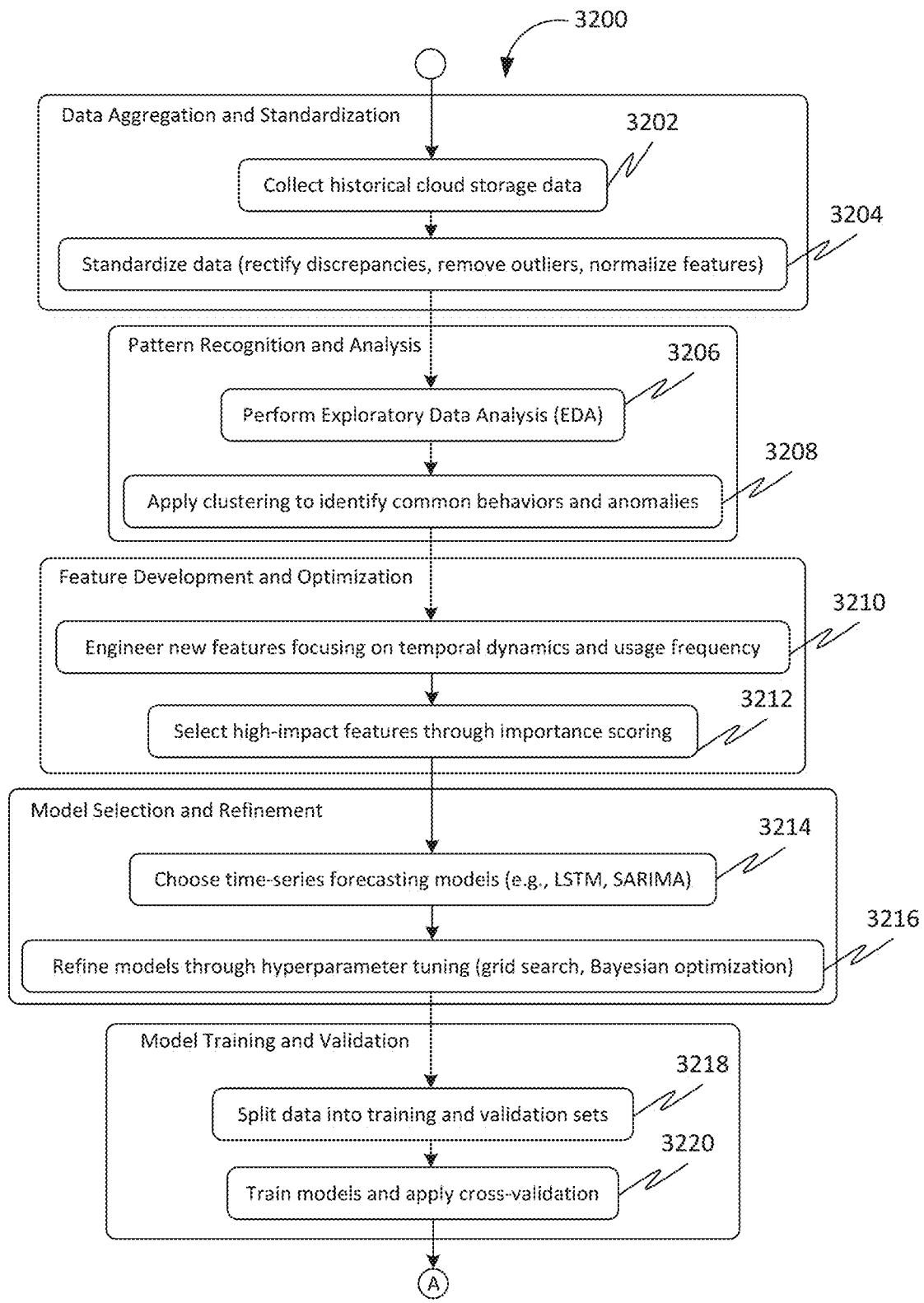
FIG. 32 is a flow diagram of a method 3200 for ProActive Storage & Budget Observability (ProSBO) v, in accordance with some embodiments.

FIG. 32 is a flow diagram of a method 3200 for ProActive Storage & Budget Observability (ProSBO) framework implementation process, in accordance with some embodiments. Accordingly, at 3202, the method 3200 may include collecting historical cloud storage data. Further, at 3204, the method 3200 may include standardizing data (such as rectifying discrepancies, removing outliers, normalizing features, etc.). Further, 3202 and 3204 may be associated with data aggregation and standardization.

Further, at 3206, the method 3200 may include performing exploratory data analysis (EDA). Further, at 3208, the method 3200 may include applying clustering to identify common behaviors and anomalies. Further, 3206 and 3208 may be associated with pattern recognition and analysis.

Further, at 3210, the method 3200 may include engineering new features focusing on temporal dynamics and usage frequency. Further, at 3212, the method 3200 may include selecting high-impact features through importance scoring. Further, 3210 and 3212 may be associated with feature development and optimization.

Further, at 3214, the method 3200 may include choosing time-series forecasting models (e.g., LSTM, SARIMA, etc.). Further, at 3216, the method 3200 may include refining models through hyperparameter tuning (grid search, bayesian optimization, etc.). Further, 3214 and 3216 may be associated with model selection and refinement.

Further, at 3218, the method 3200 may include splitting data into training and validation sets. Further, at 3220, the method 3200 may include training models and apply cross-validation. Further, 3218 and 3220 may be associated with model training and validation.

Further, at 3222, the method 3200 may include evaluating model using metrics (MAE, RMSE, MAPE). Further, at 3224, the method 3200 may include implementing feedback loop for model improvement. Further, 3222 and 3224 may be associated with model assessment and iterative enhancement.

Further, at 3226, the method 3200 may include integrating continuous learning for real-time data assimilation. Further, at 3228, the method 3200 may include establishing a structured model retraining schedule. Further, 3226 and 3228 may be associated with ongoing learning and model adaptation.

Further, at 3230, the method 3200 may include integrating the model into a microservice architecture. Further, at 3232, the method 3200 may include executing thorough deployment and testing. Further, 3230 and 3232 may be associated with framework integration and deployment.

Further, at 3234, the method 3200 may include launching a performance monitoring system. Further, at 3236, the method 3200 may include implementing routine optimization (model reviews and updates). Further, the 3234 and 3236 may be associated with operational monitoring and framework optimization.

Figure 33:
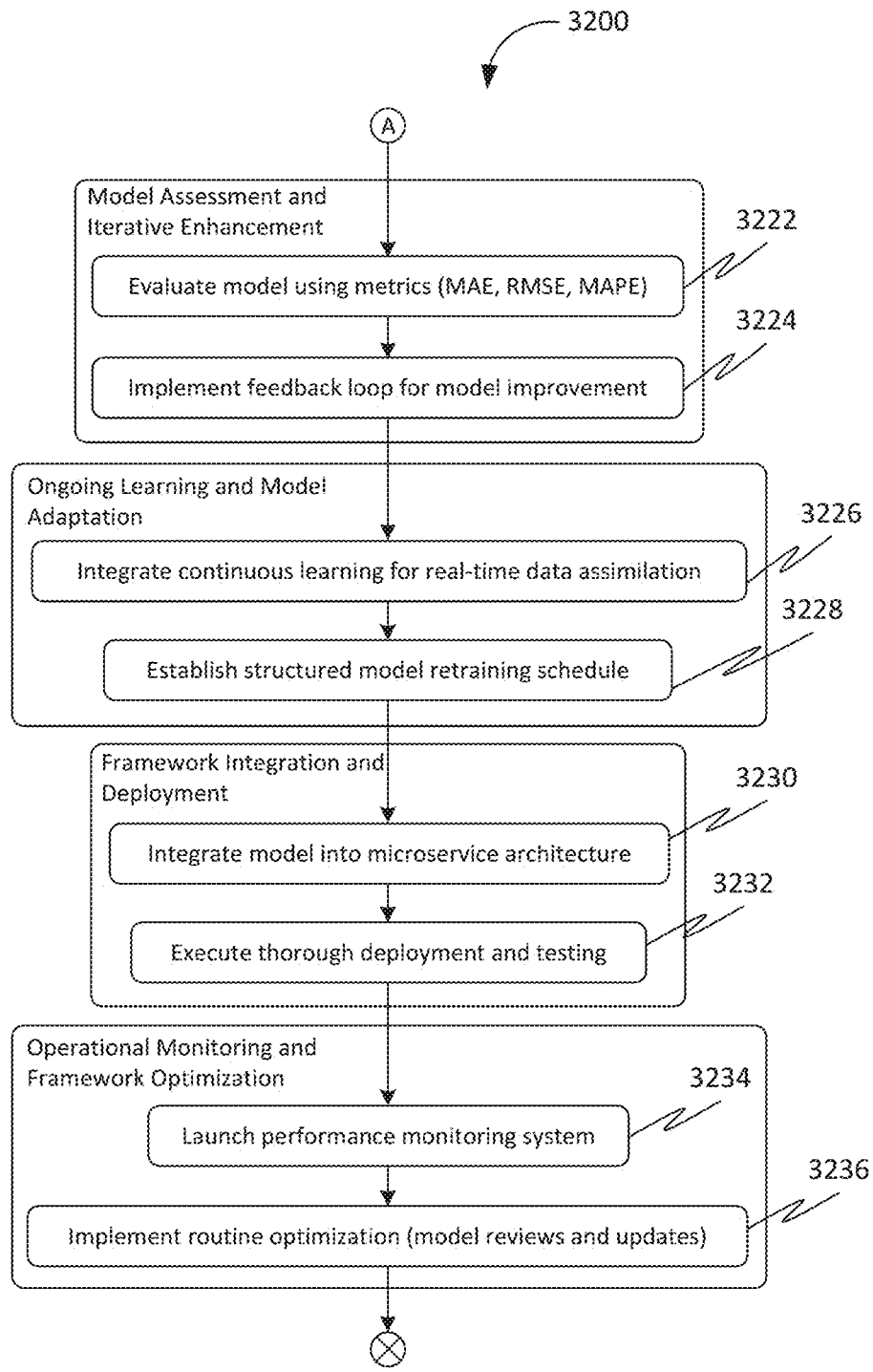
FIG. 33 is a continuation flow diagram of the method 3200 for the ProActive Storage & Budget Observability (ProSBO) framework implementation process, in accordance with some embodiments.

FIG. 33 is a continuation flow diagram of the method 3200 for the ProActive Storage & Budget Observability (ProSBO) framework implementation process, in accordance with some embodiments.

Figure 34:
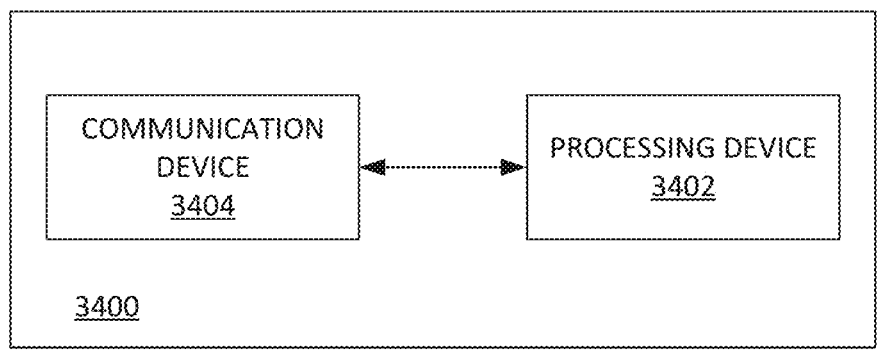
FIG. 34 is a block diagram of a system 3400 for facilitating managing a cloud storage budget using artificial intelligence, in accordance with some embodiments.

FIG. 34 is a block diagram of a system 3400 for facilitating managing a cloud storage budget using artificial intelligence, in accordance with some embodiments. Accordingly, the system 3400 may include a processing device 3402 configured for obtaining at least one cloud data associated with at least one cloud account. Further, the at least one cloud account may belong to at least one user. Further, the at least one user may include an individual, an institution, and an organization. Further, in some embodiments, the obtaining of the at least one data may include receiving the at least cloud data from at least one device via API. Further, the at least one device may include a server associated with at least one cloud service provider.

Further, the processing device 3402 may be configured for classifying the at least one cloud data. Further, the processing device 3402 may be configured for determining at least one storage information associated with the at least one cloud account. Further, the at least one storage information may include a storage indication associated with a storage type from a plurality of storage types. Further, the plurality of storage types may be a block, a file, an object, etc.

Further, the processing device 3402 may be configured for assigning a storage size associated with the plurality of storage types based on the at least one storage information.

Further, the processing device 3402 may be configured for predicting a growth rate based on the storage size. Further, the processing device 3402 may be configured for generating a budget threshold based on at least one of at least one predefined criteria and the growth rate. Further, the processing device 3402 may be configured for analyzing at least one second cloud data and the budget threshold. Further, the processing device 3402 may be configured for generating an alert based on the analyzing of the at least one second cloud data and the budget threshold.

Further, the system 3400 may include a communication device 3404 configured for receiving the at least one second cloud data from at least one user device. Further, the at least one second cloud data may indicate usage of a cloud storage of the at least one cloud account at a second instant of time. Further, the at least one user device may include a smartphone, a tablet, a laptop, etc. Further, the communication device 3404 may be configured for transmitting the alert to the at least one user device.

Figure 35:
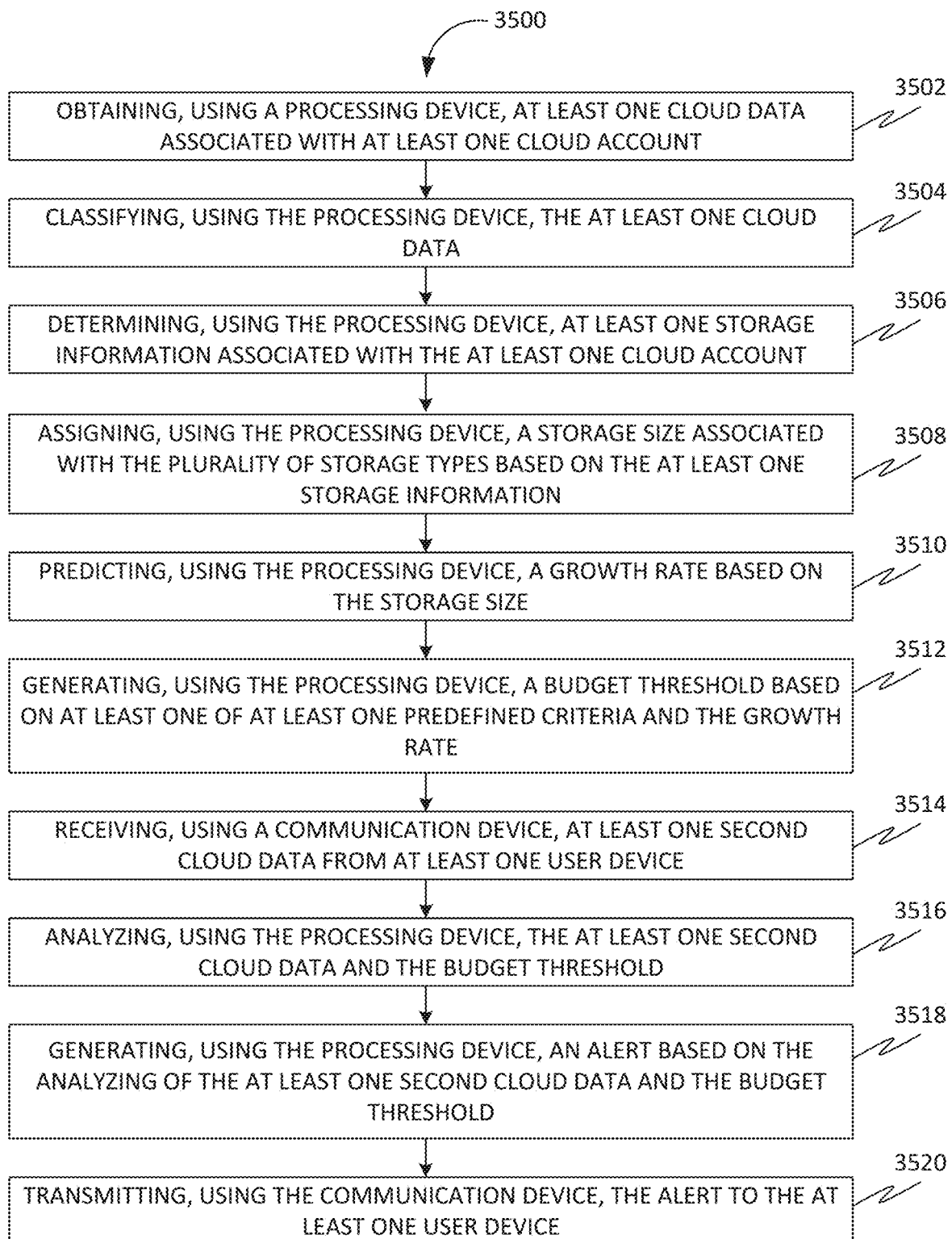
FIG. 35 is a flow chart of a method 3500 for facilitating managing a cloud storage budget using artificial intelligence, in accordance with some embodiments.

FIG. 35 is a flow chart of a method 3500 for facilitating managing a cloud storage budget using artificial intelligence, in accordance with some embodiments. Accordingly, at 3502, the method 3500 may include obtaining, using a processing device, at least one cloud data associated with at least one cloud account. Further, the at least one cloud account may belong to (or be owned by) at least one user. Further, the at least one user may include an individual, an institution, and an organization. Further, in some embodiments, the obtaining of the at least one data may include receiving the at least cloud data from at least one device via API. Further, the at least one device may include a server associated with at least one cloud service provider. Further, the at least one cloud data may be associated with a first instant of time.

Further, at 3504, the method 3500 may include classifying, using the processing device, the at least one cloud data.

Further, at 3506, the method 3500 may include determining, using the processing device, at least one storage information associated with the at least one cloud account. Further, the at least one storage information may include a storage indication associated with a storage type from a plurality of storage types. Further, the plurality of storage types may be a block, a file, an object, etc.

Further, at 3508, the method 3500 may include assigning, using the processing device, a storage size associated with the plurality of storage types based on the at least one storage information.

Further, at 3510, the method 3500 may include predicting, using the processing device, a growth rate based on the storage size.

Further, at 3512, the method 3500 may include generating, using the processing device, a budget threshold based on at least one of at least one predefined criteria and the growth rate.

Further, at 3514, the method 3500 may include receiving, using a communication device, at least one second cloud data from at least one user device. Further, the at least one second cloud data may indicate usage of a cloud storage of the at least one cloud account at a second instant of time that may be later than the first instant of time. Further, the at least one user device may include a smartphone, a tablet, a laptop, etc. Further, in some embodiments, the receiving of the at least one second cloud data may include receiving the at least one second cloud data from the at least one device.

Further, at 3516, the method 3500 may include analyzing, using the processing device, the at least one second cloud data and the budget threshold.

Further, at 3518, the method 3500 may include generating, using the processing device, an alert based on the analyzing of the at least one second cloud data and the budget threshold.

Further, at 3520, the method 3500 may include transmitting, using the communication device, the alert to the at least one user device.

Further, in some embodiments, the method 3500 may include receiving, using the communication device, at least one feedback from the at least one device. Further, the method 3500 may include analyzing, using the processing device, the feedback using an artificial intelligence model.

Further, the artificial intelligence model may be configured to monitor storage usage and adjust the budget threshold.

Further, the method 3500 may include generating, using the processing device, an updated budget threshold based on the analyzing of the feedback. Further, the budget threshold may include the updated budget threshold.

According to some aspects, an AI-driven cloud storage management system is disclosed. Further, the AI-driven cloud storage management system is characterized by its integrated and comprehensive approach to optimizing cloud storage utilization and financial efficiency. Further, the AI-driven cloud storage management system may include an AI-driven predictive analytics engine, a storage classification mechanism, a threshold and alert system, a dynamic resource allocation system, advanced budget management features, advanced growth rate control features, and an operational workflow management system. Further, the AI-driven predictive analytics engine is configured to utilize proprietary machine learning algorithms and advanced statistical models for processing and analyzing extensive volumes of historical and real-time cloud storage usage data, identifying unique patterns, trends, and anomalies. Further, the AI-driven predictive analytics engine is configured to implement real-time monitoring capabilities to ensure accurate, data-driven decision-making. Further, the AI-driven predictive analytics engine is configured to predict future storage requirements with enhanced precision, incorporating adaptive learning mechanisms for the continuous refinement of predictive models, thereby enabling advanced observability and monitoring of storage growth rates.

Further, the storage classification mechanism employs a proprietary algorithm to categorize cloud storage resources into distinct types (object, file, block, and database storage), facilitating a deeper organizational structure for efficient data management. Further, the storage classification mechanism leverages AI to provide organizational suggestions, implementing a metadata-driven framework for enhanced data retrieval and management.

Further, the threshold and alert system is designed to provide customizable thresholds for storage usage and budget allocation, dynamically adjusting based on predictive insights. Further, the threshold and alert system is designed to generate timely alerts through an integrated communication platform, optimizing notification delivery based on stakeholder roles and the urgency of storage conditions.

Further, the dynamic resource allocation system automatically adjusts provisioning and implements control measures in response to critical conditions, utilizing predictive analytics to enforce strategic limits on storage expansion. Further, the dynamic resource allocation system includes an intelligent workflow for managing freezes or resource expansion approvals, thereby optimizing utilization and preventing resource wastage.

Further, the advanced budget management features encompass proration and rollover mechanisms for the dynamic allocation and adjustment of budgetary resources, optimizing financial efficiency. Further, the advanced budget management features encompass a budget override mechanism designed to handle exceptional circumstances necessitating the exceeding of predefined budget limits, ensuring flexibility in managing storage resources. Further, the advanced budget management features encompass triggers and thresholds for initiating automated budgetary adjustments or alerts based on real-time monitoring of storage consumption and financial expenditure, enabling proactive financial oversight.

Further, the advanced growth rate control features are designed to continuously monitor storage growth rates across different cloud storage types, employing predictive analytics for trend detection and analysis. Further, the advanced growth rate control features are designed to implement configurable growth thresholds and alerts, allowing for proactive management and intervention to maintain storage growth within strategic objectives. Further, the advanced growth rate control features are designed to introduce automated controls for managing storage expansion, ensuring alignment with organizational capacity planning and budgetary constraints.

Further, the operational workflow management system features an automated overrun management and control workflow capable of real-time detection of storage usage overruns, initiation of automatic freezes on further storage provisioning, and generation of overrun notifications. Further, the operational workflow management system features a dynamic approval process for resource expansion, incorporating AI-enhanced evaluations, a multi-tiered approval mechanism, and manual override capabilities for administrators, ensuring that storage expansion remains aligned with strategic objectives and budgetary constraints.

Further, in some aspects, the data collection and classification mechanism within CloudThrottle details the mechanism for data collection and classification. Further, the mechanism for data collection and classification employs advanced proprietary data collection techniques and utilizes a unique methodology for real-time monitoring and direct data extraction from various cloud platforms. This technique is characterized by its ability to access deeper, more granular data than traditional methods, leveraging custom query languages and encrypted data streams specifically designed for cloud storage analytics. This approach surpasses standard data gathering techniques by offering enhanced efficiency and a richer dataset for analysis. Further, the mechanism for data collection and classification implements a proprietary classification algorithm with adaptive learning: introduces a groundbreaking machine learning-based classification algorithm, "CloudThrottle IntelliClass" specifically developed to dynamically categorize massive volumes of collected storage data into highly nuanced categories. Unlike conventional classification methods, IntelliClass incorporates an adaptive learning framework capable of self-optimizing its classification criteria based on ongoing analysis of changing cloud storage architectures and evolving data patterns. This allows for unparalleled adaptability to various cloud storage configurations and the extraction of actionable insights that significantly enhance operational decisions. Further, the mechanism for data collection and classification automates storage optimization and strategic decision-making: The classified data, processed through the IntelliClass algorithm, is directly applied to automate complex storage optimization strategies, budget adjustments, and security protocol enhancements. This novel application of machine learning outputs enables CloudThrottle to implement a level of decision-making automation and strategic foresight previously unattainable, employing predictive analytics to preemptively adjust storage configurations before inefficiencies or security vulnerabilities arise. Further, the mechanism for data collection and classification ensures unprecedented cross-platform compatibility: Guarantees seamless integration and interoperability across disparate cloud environments, thanks to a specialized data harmonization layer that translates platform-specific data formats into a universal schema. This capability addresses and overcomes the prevalent industry challenge of managing cloud storage data across diverse platforms with varying standards, enabling a truly unified storage management solution. Further, the mechanism for data collection and classification delivers enhanced operational benefits through technological innovation and achieves significant improvements in efficiency for data retrieval, forecasting accuracy, and proactive risk mitigation. These benefits are directly attributable to the innovative data collection and classification mechanism, which employs advanced algorithms and proprietary technologies to revolutionize the management and strategic planning of cloud storage resources. Enhanced categorization and meticulous organization of cloud storage resources result in superior searchability and management efficiency, setting a new industry standard. Further, the mechanism for data collection and classification leverages detailed categorization for advanced management efficiency: The IntelliClass algorithm's detailed categorization enables an advanced level of searchability and management efficiency. By organizing cloud storage resources into finely segmented categories, CloudThrottle users can quickly navigate and manage their data with unprecedented precision, dramatically reducing the time and resources required for data management tasks.

Further, in some aspects, an enhanced centralized storage management system within CloudThrottle is disclosed. Further, the enhanced centralized storage management system may include a unified management console designed to provide a comprehensive overview of cloud storage and financial metrics. This console is distinguished by its use of a novel analytics engine that employs machine learning and data science techniques to offer predictive insights and optimization strategies. These strategies are tailored to the nuanced requirements of diverse cloud storage types (object, block, file, database storage, etc.) across varied cloud service platforms. Further, the analytics engine within the console leverages a unique set of algorithms to dynamically classify and analyze cloud storage data. This classification goes beyond conventional categories, incorporating factors such as cost efficiency, access patterns, security levels, and environmental impact, thereby enabling a multi-dimensional optimization approach that is responsive to both operational needs and strategic objectives. Further, customized visualization tools embedded within the console provide dynamic, real-time graphical representations of key metrics, including storage utilization trends, cloud storage budget burn rate, cost implications, and efficiency opportunities. These tools are specifically designed to adapt visualizations based on user preferences and the specific insights generated by the analytics engine, ensuring relevance and actionability. Further, an actionable intelligence generated by the system proactively suggests storage optimization and financial management strategies. These recommendations are directly informed by a comprehensive analysis of current and predicted storage usage patterns, budgetary considerations, and historical data trends, all processed through the proprietary analytics engine. This approach ensures that recommendations are both data-driven and aligned with the specific operational context of the organization. Further, direct administrative functionalities are enabled through the console, allowing users to swiftly implement adjustments to storage configurations, initiate data management actions, and modify financial settings. These actions are informed by the detailed, predictive insights provided by the analytics engine, streamlining the management process and facilitating rapid adaptation to changing storage needs. Further, the system promotes collaborative decision-making by enabling shared console access among multiple stakeholders. It features advanced access controls and customizable notification settings, ensuring that relevant parties are kept informed and can contribute effectively to storage and budget decisions. Further, a continuous improvement mechanism is embedded within the analytics engine, utilizing feedback loops and machine learning to refine predictions and recommendations over time. This ensures that the system remains adaptive to evolving storage needs, technological advancements, and organizational priorities. Further, an integration with cloud service provider APIs or any other mechanism is optimized through the analytics engine, ensuring accurate, real-time retrieval of storage usage and cost data. This integration enhances the system's ability to deliver precise growth predictions and financial planning insights, underpinning a strategic approach to cloud storage management.

Further, in some aspects, a growth rate control and prediction mechanism within CloudThrottle is disclosed. Further, the growth rate control and prediction mechanism introduces a proprietary machine learning algorithm, "CloudGrowthPredictor", exclusively developed for CloudThrottle, which leverages a unique combination of deep learning techniques and custom-tailored statistical models. This algorithm is specifically designed to process and interpret complex, multi-dimensional datasets comprising both historical and real-time storage usage data across diverse cloud storage types (object, file, block, database storage, etc.). The "CloudGrowthPredictor" algorithm stands apart by its ability to dynamically adjust its analytical frameworks based on evolving data patterns, ensuring unprecedented accuracy in forecasting storage growth rates. Further, the growth rate control and prediction mechanism employ a novel data segmentation and analysis technique within "CloudGrowthPredictor" that discerns subtle, type-specific usage patterns and growth trends. This technique utilizes an advanced ensemble of neural network architectures, including Convolutional Neural Networks (CNNs) for spatial pattern recognition and long short-term memory (LSTM) networks for capturing temporal dependencies in storage usage data. This dual approach enables CloudThrottle to accurately predict future storage needs and potential budgetary impacts with a level of granularity and precision not achievable by conventional methods. Further, the growth rate control and prediction mechanism implements a first-of-its-kind "Adaptive Resource Allocation Engine" (ARAE) within CloudThrottle, which integrates directly with "CloudGrowthPredictor" to automatically recalibrate storage allocation limits and budgetary constraints in real-time. ARAE uses a proprietary decision-making algorithm that considers predictive insights, current storage utilization rates, and strategic organizational objectives. This engine facilitates a nuanced, type-specific approach to storage growth management, dynamically adjusting to the unique characteristics and demands of each cloud storage type, thereby optimizing resource utilization and cost efficiency. Further, the Growth Rate Control and Prediction Mechanism integrates an innovative feedback loop mechanism that utilizes a "Predictive Model Refinement Module" (PMRM). PMRM continuously enhances the "CloudGrowthPredictor" by incorporating new data, user feedback, and outcomes from implemented growth control strategies. This module employs a sophisticated algorithm that automatically identifies and integrates evolving best practices and technological advancements in cloud storage management, significantly improving CloudThrottle's responsiveness and precision in forecasting and controlling storage growth. Further, the growth rate control and prediction mechanism features a "Strategic Decision Support System" (SDSS), leveraging the predictive analytics generated by "CloudGrowthPredictor" to offer administrators and users personalized, type-specific recommendations for resource allocation, cost management, and capacity planning. SDSS utilizes a complex algorithm to analyze predictive growth across different cloud storage types, offering actionable insights and strategic guidance that align with the organization's long-term storage infrastructure optimization goals. Further, the growth rate control and prediction mechanism incorporates a "Proactive Alert and Mitigation System" (PAMS), designed to notify administrators of forecasted growth exceeding strategic limits for any cloud storage type. PAMS is powered by a unique set of algorithms within "CloudGrowthPredictor" that not only identifies when projected growth approaches or exceeds strategic limits but also suggests type-specific actions for mitigating risks and ensuring alignment with the organization's storage strategy and capacity planning objectives.

According to some aspects, a method for unified management and cost control of diverse cloud storage types is disclosed. Further, the method is implemented by the CloudThrottle system for the unified, centralized management, and cost control of diverse cloud storage types, including but not limited to object storage, file storage, block storage, and database storage, across multiple cloud providers within a cloud computing environment. This method leverages novel integrations of predictive analytics, budget management, cross-provider data harmonization, and storage growth rate monitoring within a single console, uniquely addressing the challenge of hidden creeping costs associated with cloud storage. Further, the method may include comprehensive storage type and cost aggregation: Aggregating, normalizing, classifying, and monitoring storage usage data and associated costs from diverse storage types across multiple cloud providers. Implementing a proprietary data harmonization and cost analysis process to ensure compatibility, comparability, and visibility of storage costs and usage across different cloud environments, directly addressing the issue of creeping costs by making these expenses transparent and manageable under the same hood. Further, the method may include advanced growth rate and budget observation: Introducing an advanced mechanism within CloudThrottle for observing and managing the growth rate of storage usage and the associated budget for each storage type across cloud providers. This includes employing an AI-driven predictive analytics engine to forecast storage needs and potential budget overruns and incorporating adaptive learning to refine forecasts based on real-time data, thereby providing a proactive approach to control and mitigate hidden creeping costs in cloud storage. Further, the method may include a unified storage management and cost control console: Offering a centralized management console that simplifies the task of navigating, monitoring, and controlling the diverse storage types and their associated costs across various cloud providers. The console integrates advanced visualization, analytics, and reporting tools to present a comprehensive view of storage utilization, growth trends, budget allocations, budget burn rate, and optimization strategies, making it straightforward for administrators to preemptively manage resources and costs. Further, the method may include proactive budget management and override mechanism: Implementing a unified, cross-provider budget management and override mechanism that allows for the proactive adjustment of budget allocations in response to predictive insights into storage growth and potential cost overruns. This mechanism assesses the necessity for budget adjustments or temporary expansions based on comprehensive analysis, ensuring efficient resource allocation and preventing unexpected expenses. Further, the method may include automated optimization and detailed cost reporting which include automatically optimizing storage allocations and generating detailed cost reports within the CloudThrottle console. These reports provide insights into the effectiveness of the management strategies, the impact of the optimized allocations on reducing creeping costs, and strategic recommendations for future budget planning and cost control across the unified cloud environment.

According to some aspects, a system and method for AI-driven prediction of budget overruns and storage growth are disclosed. Further, the system and method for predictive management of cloud storage resources may include a data aggregation module which is a module configured to autonomously collect and standardize historical and real-time data pertaining to cloud storage usage, including data on storage volumes, access patterns, financial expenditures, and growth rates across a plurality of storage types, ensuring comprehensive data capture for analysis. Further, the system and method for predictive management of cloud storage resources may include an AI predictive engine which is an artificial intelligence (AI) predictive engine integrated with the data aggregation module, employing machine learning algorithms specifically designed to analyze the aggregated dataset to discern predictive indicators related to cloud storage growth rates and potential budget overruns, facilitating accurate and timely predictions. Further, the system and method for predictive management of cloud storage resources may include a prediction and notification subsystem which is a subsystem linked to the AI predictive engine, programmed to automatically generate and dispatch actionable alerts regarding forecasted deviations from predefined storage growth trajectories and budgetary allocations, thereby enabling preemptive resource management actions to optimize storage utilization and cost efficiency. Further, the system and method for predictive management of cloud storage resources may include an adaptive learning mechanism which is an element within the AI predictive engine that iteratively refines its predictive models based on the continuous influx of updated cloud storage usage data, enhancing the precision of future forecasts and enabling dynamic adaptation to evolving cloud storage patterns and financial constraints. Further, the system and method for predictive management of cloud storage resources may include a proactive management method. This method is implemented by the system and includes collecting and standardizing historical and real-time cloud storage data, employing the AI predictive engine to analyze data and predict potential budget overruns and storage growth rates, generating predictive alerts for system administrators or financial controllers, and dynamically updating machine learning models to refine predictions over time, wherein this system and method provide a proactive approach to cloud storage management by integrating predictive analytics for both budget oversight and growth rate estimation, thereby enabling optimized resource utilization and cost efficiency through the novel application of AI-driven predictive analytics and adaptive learning.

Further, according to some aspects, the system incorporates classification algorithms and data management strategies and includes an automated policy enforcement feature within CloudThrottle. Further, the system innovatively applies proprietary classification algorithms that leverage a proprietary classification algorithm, uniquely developed for CloudThrottle, to execute sophisticated data analysis, enabling the system to automatically apply optimization policies. This algorithm stands apart by its ability to understand complex data structures, recognize patterns of data access and lifecycle stages, and make intelligent decisions on data archiving, deletion, or migration to more cost-effective storage classes. Unlike generic approaches, this algorithm dynamically tailors optimization strategies to the unique characteristics of each dataset, ensuring unparalleled efficiency in storage management. Further, the system uses AI-driven insights for unprecedented data management precision which utilizes advanced AI-driven insights, generated through the proprietary algorithm, to identify data for archival, deletion, or enhanced security measures. This feature is specifically designed to understand the nuanced differences between infrequently accessed data and sensitive data, ensuring that each piece of data is treated according to its specific needs and compliance requirements. The AI insights go beyond simple access frequency analysis, incorporating a multidimensional evaluation of data value, compliance risk, and security requirements. Further, the system includes dynamic data tiering with real-time adaptability which Implements a cutting-edge dynamic data tiering strategy that adjusts data placement across different storage tiers in real-time, based on an intricate analysis of usage patterns, access frequency, and cost considerations. This strategy leverages the proprietary classification algorithm to make granular decisions on data tiering, optimizing storage performance and cost in a way that traditional tiering strategies cannot match. Further, the system includes proactive policy-based responses through real-time monitoring which engages an advanced real-time monitoring system that detects deviations from established storage utilization patterns, automatically triggering policy-based responses. These responses are informed by the proprietary classification algorithm, ensuring that actions to mitigate risks of overutilization or non-compliance are both precise and tailored to the specific context of the deviation. Further, the system includes continuous learning for optimization strategy adaptation. The automated policy enforcement feature is further distinguished by its ability to adapt optimization strategies based on ongoing learning from storage usage trends and the effectiveness of enacted policies. This continuous improvement mechanism, powered by the proprietary algorithm, allows CloudThrottle to refine its storage management practices continually, ensuring they remain effective as data landscapes evolve.

Further, the system includes a customizable policy interface with predictive modeling which includes a unique policy customization interface, integrated with predictive modeling capabilities, that allow system administrators to define, modify, and prioritize storage management policies. This interface is directly supported by the proprietary classification algorithm, enabling administrators to make informed decisions on policy adjustments before critical thresholds are reached, based on forecasts of future storage needs and potential policy triggers.

Further, according to some aspects, the system enhanced by the alert and notification capabilities includes an advanced centralized multi-tiered alert and notification system which is an advanced centralized multi-tiered alert and notification system for proactive cloud storage growth rate and storage-budget management, incorporated within CloudThrottle, characterized by its proprietary and innovative approach to managing cloud storage utilization and storage-budget consumption across multiple cloud service provider accounts in a unified manner, featuring:

Proprietary monitoring module: A specialized module designed for the continuous, real-time observation and analysis of cloud storage utilization and storage budget consumption across diverse cloud accounts. This module leverages CloudThrottle's unique algorithms to assess storage growth rate and storage-budget parameters against pre-established limits, dynamically adjusted based on initial allocations, anticipated growth rates, and real-time data analytics, ensuring comprehensive oversight across the cloud environment.

Adaptive tiered alert framework: A novel framework that automatically generates tiered notifications for storage growth rate or storage-budget utilization, utilizing CloudThrottle's proprietary algorithms to determine:

Preliminary alert threshold (Soft Cap): Configured to trigger proactive alerts at a customized percentage of anticipated monthly or annual storage growth or storage budget increase. This soft cap is uniquely calibrated to reflect the operational dynamics of each cloud account, utilizing predictive analytics to issue alerts that preemptively signal the approach towards threshold limits, thereby enabling efficient resource management and cost optimization strategies.

Critical alert threshold (Hard Cap): Set at a strategically determined higher percentage of anticipated storage growth or storage budget, beyond which an urgent notification is issued. This hard cap triggers based on CloudThrottle's advanced predictive models, signaling imminent resource or budget constraints that require immediate attention to prevent limit exceedances, incorporating the system's capability to learn and adapt to evolving patterns for enhanced precision.

Automated control mechanism with intelligent freezing capability: An innovative feature activated upon reaching the critical alert threshold (Hard Cap), designed to: Temporarily halt or limiting further increases in storage allocation or budget spending, implementing a "freeze" on additional resource consumption or financial expenditure. This unique mechanism is supported by CloudThrottle's proprietary decision-making algorithms that evaluate current utilization trends, predictive outcomes, and organizational policies to enforce limits while allowing for rapid response adjustments.

Include adaptive provisions for the real-time dynamic adjustment of both Soft Cap and Hard Cap thresholds, leveraging CloudThrottle's continuous learning from evolving usage trends, predictive analytics, and feedback loops. This ensures the system's responsiveness to actual needs, enhancing operational flexibility and preventing resource wastage.

Centralized adaptive management solution: CloudThrottle introduces this multi-tiered alert and notification system as part of its core functionality, aiming to deliver an adaptive, real-time management solution for cloud storage growth rate and allocated storage budgeting. This system is engineered to facilitate proactive oversight and strategic decision-making, maintaining operational efficiency and fiscal discipline across cloud resource utilization through its sophisticated, AI-enhanced alert mechanism.

Further, according to some aspects, the system leveraging budget management insights and predictive analytics includes an advanced budget modification feature within CloudThrottle. Further, the CloudThrottle introduces an advanced budget modification feature, leveraging a proprietary combination of predictive analytics, real-time monitoring, and dynamic adjustment mechanisms. This feature uniquely addresses the challenge of maintaining budget flexibility and control across diverse cloud environments, ensuring optimal financial resource allocation while minimizing cloud waste.

Proprietary predictive analytics engine for budget forecasting and adjustment: CloudThrottle's predictive analytics engine is central to its novelty, enabling sophisticated forecasting of cloud storage and budgetary needs. This engine utilizes machine learning algorithms to analyze historical data trends, current usage patterns, and predictive indicators, offering precise, anticipatory adjustments to budget allocations. This proactive approach facilitates the identification of potential budgetary overruns before they occur, allowing for the seamless reallocation of funds and ensuring alignment with project objectives and cloud resource utilization.

Budget override mechanism with justification and accountability: The budget override feature in CloudThrottle is designed with two settings to accommodate unexpected demands or strategic initiatives, ensuring projects continue uninterrupted while maintaining fiscal discipline:

Budget override flag: This innovative setting permits temporary exceedance of predefined budgetary limits ("Hard Caps") for cloud accounts. Activation of the "Override Flag" allows access to 100% of the allocated monthly budget, plus an additional specified percentage, ensuring continuity and responsiveness to unforeseen operational needs. This system is uniquely configured to automatically apply justifications, track override usage, and ensure accountability, thereby enhancing fiscal discipline and resource efficiency.

Budget override amount & additional funds: Distinguished by its ability to grant an exact additional amount over the monthly budget, this setting exemplifies CloudThrottle's flexibility. It enables projects to quickly adapt to unexpected costs or capitalize on emergent opportunities without the lengthy process of budget reallocation. The system's capability to document and justify the allocation of these funds underscores its innovative approach to cloud budget management.

Dynamic budget modification and real-time adjustment: CloudThrottle's budget modification capability stands out for its dynamic and real-time adjustment features. It allows for the immediate increase or decrease in budget allocations based on the predictive analytics engine's forecasts, unexpected project demands, or strategic shifts. This feature includes a unique interface for administrators to make informed adjustments, supported by predictive insights and real-time data analysis, ensuring that budget allocations are always aligned with project needs and cloud resource utilization. Furthermore, CloudThrottle integrates an adaptive learning mechanism, continuously refining its predictive models and adjustment strategies based on new data, feedback, and evolving cloud management practices. This ensures the system remains at the forefront of cloud budget management technology, offering unprecedented flexibility, accuracy, and control in budget allocation and modification.

Further, according to some aspects, the system utilizing the storage management principles and the growth rate analysis includes an advanced storage management and control system for cloud storage growth and budget optimization. An advanced storage management and control system for cloud storage growth and budget optimization within CloudThrottle, characterized by its proprietary and innovative methodology for dynamically managing cloud storage capacity and budget allocations across multiple cloud service provider accounts in a unified and adaptive manner, featuring:

Proprietary storage quota allocation module: A specialized module dedicated to the precise determination and allocation of initial storage quotas for cloud accounts, based on detailed analysis of the requirements of hosted applications. This module harnesses CloudThrottle's unique algorithms to set storage quotas that align with application needs and anticipated data growth, facilitating optimal resource utilization and performance stability.

Growth rate analysis and projection engine: An advanced engine that employs CloudThrottle's proprietary statistical models and machine learning algorithms to establish and adjust anticipated storage growth rates. This engine calculates future storage needs by analyzing historical data patterns, current usage trends, and predictive analytics, ensuring accurate forecasting for strategic capacity planning.

Dynamic monitoring and adjustment framework: A novel framework designed for the continuous, real-time tracking of storage usage against established growth projections. Utilizing CloudThrottle's adaptive algorithms, this framework dynamically adjusts storage allocations and growth projections based on real-time analytics and evolving data consumption patterns, enhancing operational agility and budget efficiency.

Proactive multi-tiered alert system: A multi-tiered notification system that generates customized alerts for impending storage capacity or budgetary thresholds, based on:

Preliminary alert threshold (Soft Cap): Engineered to issue early warnings at a configurable percentage of the projected storage growth, leveraging predictive insights to signal potential overutilization before reaching critical levels.

Critical alert threshold (Hard Cap): Activated at a higher, strategically determined percentage of storage growth, prompting urgent notifications that indicate the necessity for immediate action to mitigate the risk of exceeding planned storage or budget limits.

Automated policy enforcement and resource management mechanism: An innovative mechanism that enforces additional storage restrictions upon reaching critical thresholds, integrating CloudThrottle's decision-support algorithms to automate the implementation of data management policies and storage optimization strategies. This mechanism includes capabilities for:

Intelligent resource freezing and reallocation: Temporarily suspending further storage allocations or budget expenditures and intelligently reallocating resources to maintain system performance and compliance with budgetary constraints.

Adaptive threshold adjustment: Utilizing ongoing data analytics and machine learning insights to refine and recalibrate Soft Cap and Hard Cap settings in alignment with changing storage dynamics and organizational objectives.

Centralized strategic planning interface: Incorporating the advanced storage management and control system as a core component of CloudThrottle, designed to offer a centralized, adaptive solution for the nuanced management of cloud storage growth and budgeting. This system empowers organizations with AI-driven insights and automated controls to proactively manage cloud storage expansion and financial allocations, optimizing both system efficiency and cost-effectiveness through sophisticated, predictive management strategies.

Further, according to some aspects, the system integrating snapshot management efficiencies from the data collection techniques includes a management module for optimized snapshot decision-making. Further, the management module is configured to interface with cloud storage environments for the purpose of snapshot management, characterized by an integrated cost-benefit analysis tool; wherein the cost-benefit analysis tool is specifically designed to evaluate and optimize snapshot-related decisions by:

conducting an automated financial impact assessment of maintaining, creating, or deleting snapshots within the cloud storage environment, utilizing historical usage data, current storage policies, and predefined cost-efficiency and operational effectiveness thresholds;

assessing the operational benefits of snapshots regarding data retention, recovery, and availability to ensure continuity and access in cloud storage operations;

executing a comparative analysis between the calculated financial impacts and assessed operational benefits to generate actionable snapshot management recommendations aimed at balancing cost efficiency with operational needs;

incorporating predictive modeling capabilities, employing machine learning algorithms to project future storage requirements and the potential financial and operational impacts of snapshot decisions over time, adjusting the management recommendations based on dynamic real-time data inputs and evolving conditions within the cloud environment; and wherein the system is configured to either automatically implement these snapshot management recommendations or provide them for user review and manual execution, based on established user preferences or operational policies, thereby facilitating optimized snapshot management that aligns with financial constraints and operational performance objectives.

Further, according to some aspects, the system enhanced by the volume and resource management capabilities includes a cost-benefit analysis tool for cloud volumes/managed disks and orphaned resources management. Cloud-Throttle is further enhanced by integrating a cost-benefit analysis tool for the comprehensive management of cloud volumes/managed disks and orphaned resources, characterized by:

Volume and orphan resource management module: A module specifically designed to interface with cloud storage environments for the optimized management of cloud volumes/managed disks and the identification and handling of orphaned resources. This module is distinguished by an integrated cost-benefit analysis tool that applies CloudThrottle's proprietary algorithms for assessing the financial and operational impact of managing these resources within the cloud storage environment.

Cost-benefit analysis tool for volumes and orphans: This tool is meticulously developed to:

Perform an automated evaluation of the financial implications associated with the provisioning, resizing, and deletion of cloud volumes/managed disks, as well as the detection and removal of orphaned resources, utilizing a comprehensive dataset of historical usage patterns, current storage management policies, and predefined thresholds for cost-efficiency and operational effectiveness.

Assess the operational benefits and potential risks related to the availability, performance, and data integrity of managing cloud volumes/managed disks, including the strategic retention or elimination of orphaned resources to ensure optimal cloud storage utilization and continuity of services.

Conduct a detailed comparative analysis of the financial costs versus operational benefits, generating actionable recommendations for the management of cloud volumes/managed disks and orphaned resources. These recommendations aim to achieve a balanced approach to cost efficiency and operational excellence.

Incorporate advanced predictive modeling techniques, employing machine learning algorithms to forecast future storage requirements, potential cost implications, and operational impacts of decisions regarding cloud volumes/managed disks and orphaned resources. The system dynamically adjusts management strategies based on real-time data analytics and evolving cloud storage conditions.

Automated and manual implementation options: The system is configured to allow for the automatic implementation of these optimized management recommendations for cloud volumes/managed disks and orphaned resources, or to offer them for manual review and execution by administrators, based on established organizational preferences and operational policies. This dual approach enables tailored management strategies that align with the specific financial constraints and performance objectives of the organization, promoting efficient resource utilization and optimized cloud storage operations.

Further, according to some embodiments, the system utilizing the predictive capabilities and the unified management strategies includes an automated management and control workflow for cloud storage and budget overruns. This system encapsulates a novel approach to preemptively managing cloud storage and budget overruns through an automated, intelligent workflow. The workflow incorporates real-time detection, automated provisioning freezes, and a dynamic approval process for resource expansion, utilizing proprietary algorithms and AI-enhanced decision-making. It ensures optimal resource utilization, cost efficiency, and system performance by addressing overruns with a multi-faceted, responsive strategy tailored to the specific needs and roles of involved stakeholders.

An automated overrun management and control workflow is configured to detect storage usage overruns in real-time by comparing current usage metrics against predictive forecasts and predefined thresholds, employing proprietary algorithms that account for both historical data trends and future projections in their analysis. Further, the automated overrun management and control workflow is configured to Initiate an automatic freeze on further storage provisioning upon reaching a critical alert threshold (Hard Cap), where the freeze mechanism is based on a unique, rule-based logic that considers the severity of the overrun, the specific cloud storage types involved, and the potential impact on system performance and cost. Further, the automated overrun management and control workflow is configured to generate and route overrun notifications and freeze alerts to designated administrators and stakeholders through an intelligent communication system that customizes the message content and delivery channel based on the recipient's role, preferences, and the urgency of the situation, ensuring timely and effective responses.

A dynamic approval process for resource expansion configured to trigger an automated workflow for requesting additional storage resources when predictive analytics indicate impending storage needs or in response to an overrun situation where the freeze has been enacted. This process involves a novel, AI-enhanced evaluation of the request based on factors such as the reason for the overrun, historical usage patterns, projected growth, and budgetary implications. Further, the dynamic approval process for resource expansion is configured to incorporate a multi-tiered approval mechanism that routes requests through a hierarchy of decision-makers, each with the authority to approve, modify, or reject the request based on predefined criteria and the system's predictive insights. This mechanism is designed to balance the need for additional resources with cost control and efficiency objectives. Further, the dynamic approval process for resource expansion is configured to enable manual override capabilities for administrators, allowing for the temporary lifting of freezes or the approval of critical resource expansions based on exceptional circumstances, with the system automatically documenting the rationale, decision-maker identity, and expected impact of such overrides for audit and review purposes.

Further, according to some aspects, the system describes Integration with external observability platforms. An enhancement within the AI-driven cloud storage management system, characterized by its capability to integrate with external observability platforms, is configured for interface development by incorporating a set of APIs and interface modules designed specifically for seamless integration with a variety of third-party observability and monitoring platforms. This interface supports real-time data exchange, enabling the cloud storage management system to send and receive storage performance metrics, alerts, and logs. Further, the enhancement within the AI-driven cloud storage management system includes a data harmonization engine that standardizes and translates cloud storage metrics, alerts, and logs into formats compatible with external observability platforms. This engine ensures that data from diverse cloud storage environments can be accurately represented and analyzed within third-party tools, enhancing the comprehensiveness of observability across cloud services. Further, the enhancement within the AI-driven cloud storage management system includes enhanced monitoring and alerting capabilities that Leverage the advanced monitoring and alerting mechanisms of third-party observability platforms by extending the system's native alerting functions. This includes customizing alert thresholds and notifications based on combined insights from both the cloud storage management system and the integrated external platforms, offering a unified observability experience. Further, the enhancement within the AI-driven cloud storage management system includes performance optimization algorithms by utilizing proprietary machine learning algorithms to analyze data collected from both the cloud storage management system and external observability platforms. These algorithms identify optimization opportunities and predictive maintenance actions, improving storage efficiency and system performance based on a holistic view of cloud storage operations. Further, the enhancement within the AI-driven cloud storage management system includes collaborative security and compliance monitoring which enable collaborative security and compliance monitoring by integrating the cloud storage management system's security protocols with those of third-party tools/observability platforms. This collaboration ensures that security and compliance checks are comprehensive, covering both system-specific and platform-wide standards, thereby enhancing the overall security posture. Further, the enhancement within the AI-driven cloud storage management system includes adaptive learning for enhanced observability which employs an adaptive learning mechanism that continuously refines the integration process based on feedback from the external observability platforms. This mechanism optimizes data exchange, alert configuration, and performance optimization strategies over time, ensuring that the system remains effective in the face of evolving cloud storage technologies and monitoring tools.

Although the present disclosure has been explained in relation to its preferred embodiment, it is to be understood that many other possible modifications and variations can be made without departing from the spirit and scope of the disclosure.

What is claimed is:

1. A method for facilitating managing cloud storage for operations, the method comprising:
obtaining, using a processing device, at least one account information associated with at least one cloud account of at least one cloud platform, wherein the at least one cloud account is associated with at least one operation;
analyzing, using the processing device, the at least one account information using at least one machine learning model, wherein the at least one machine learning model comprises a first machine learning model, wherein the first machine learning model is configured for:
identifying at least one of a pattern, a trend, and a correlation in the at least one account information; and
classifying a cloud storage resource of the at least one cloud account into one or more categories based on the identifying of at least one of the pattern, the trend, and the correlation;
obtaining, using the processing device, one or more storage data corresponding to the one or more categories from the at least one account information based on the analyzing of the at least one account information;
determining, using the processing device, at least one value for at least one parameter associated with a utilization of the cloud storage resource based on the one or more storage data;
determining, using the processing device, at least one action required to be implemented for the at least one cloud account based on the determining of the at least one value of the at least one parameter;
generating, using the processing device, at least one cloud account controlling command for implementing the at least one action for the at least one cloud account based on the at least one action;
transmitting, using a communication device, the at least one cloud account controlling command to at least one cloud platform device associated with the at least one cloud platform;
storing, using a storage device, the at least one account information;
analyzing, using the processing device, the one or more storage data corresponding to the one or more categories using the at least one machine learning model, wherein the at least one machine learning model further comprises a second machine learning model, wherein the second machine learning model is configured for identifying at least one of a pattern, a trend, and a correlation in the one or more storage data;
predicting, using the processing device, at least one predictive value for the at least one parameter based on the analyzing of the one or more storage data; and
analyzing, using the processing device, the at least one value of the at least one parameter and the at least one predictive value of the at least one parameter based on at least one constraint of an allocation of the cloud storage resource, wherein the determining of the at least one action for the at least one cloud account is further based on the analyzing of the at least one value of the at least one parameter and the at least one predictive value of the at least one parameter;
analyzing, using the processing device, the at least one constraint;
determining, using the processing device, at least one threshold value for the at least one parameter based on the analyzing of the at least one constraint;

analyzing, using the processing device, the at least one value of the at least one parameter and the at least one threshold value of the at least one parameter; and determining, using the processing device, a level of the utilization of the cloud storage resource based on the analyzing of the at least one value of the at least one parameter and the at least one threshold value of the at least one parameter, wherein the determining of the at least one action required to be implemented for the at least one cloud account is further based on the level of the utilization.

2. The method of claim 1, wherein the first machine learning model is further configured for:
  optimizing at least one initial classification criterion based on at least one of the pattern, the trend, and the correlation; and
  determining at least one classification criterion based on the optimizing of the at least one initial classification criterion, wherein the classifying of the cloud storage resource into the one or more categories is further based on the at least one classification criterion.

3. The method of claim 1 further comprising:
  generating, using the processing device, an alert corresponding to the level of utilization based on the determining of the level of the utilization and the determining of the at least one action, wherein the alert comprises a request for an approval for the implementing of the at least one action;
  transmitting, using the communication device, the alert to at least one device;
  receiving, using the communication device, at least one response for the approval from the at least one device;
  analyzing, using the processing device, the at least one response; and
  validating, using the processing device, the approval from the implementing of the at least one action based on the analyzing of the at least one response, wherein the generating of the at least one cloud account controlling command is further based on the validating.

4. The method of claim 1 further comprising:
  obtaining, using the processing device, at least one initial value of the at least one parameter;
  analyzing, using the processing device, the at least one initial value of the at least one parameter based on the at least one constraint of the allocation of the cloud storage resource; and
  determining, using the processing device, an adjustment required in the at least one constraint associated with the allocation of the cloud storage resource based on the analyzing of the at least one initial value of the at least one parameter and the analyzing of the at least one value of the at least one parameter and the at least one predictive value of the at least one parameter, wherein the determining of the at least one action is further based on the adjustment.

5. The method of claim 3 further comprising:
  obtaining, using the processing device, at least one data associated with the at least one operation;
  analyzing, using the processing device, the at least one data; and
  determining, using the processing device, the at least one constraint associated with the allocation of the cloud storage resource based on the analyzing of the at least one data, wherein the analyzing of the at least one initial value of the at least one parameter is based on the determining of the at least one constraint, wherein the analyzing of the at least one value of the at least one parameter and the at least one predictive value of the at least one parameter is based on the determining of the at least one constraint.

6. The method of claim 1 further comprising:
  analyzing, using the processing device, the one or more storage data using the at least one machine learning model, wherein the at least one machine learning model comprises a third machine learning model, wherein the third machine learning model is configured for identifying at least one of a pattern, a trend, and a correlation in the one or more storage data;
  determining, using the processing device, a characteristic of at least a portion the one or more storage data corresponding to the one or more categories based on the analyzing of the one or more storage data;
  obtaining, using the processing device, at least one policy associated with the at least one operation;
  analyzing, using the processing device, the at least one policy and the characteristic of at least the portion of the one or more storage data; and
  determining, using the processing device, at least one data operation required to be performed on at least one of the one or more data based on the analyzing of the at least one policy and the characteristic of at least the portion of the one or more storage data, wherein the generating of the at least one action is further based on the at least one data operation.

7. The method of claim 1 further comprising:
  obtaining, using the processing device, at least one first account information associated with the at least one cloud account after the implementing of the at least one action;
  analyzing, using the processing device, the at least one first account information; and
  adjusting, using the processing device, at least one variable associated with the at least one machine learning model for optimizing the at least one machine learning model based on the analyzing of the at least one first account information.

8. The method of claim 1 further comprising:
  obtaining, using the processing device, at least one policy associated with the at least one operation;
  analyzing, using the processing device, the one or more storage data corresponding to the one or more categories based on the at least one policy; and
  determining, using the processing device, a state of the storage resource from a plurality of states of the storage resource based on the analyzing of the one or more storage data corresponding to the one or more categories, wherein the determining of the at least one action is further based on the state of the storage resource, wherein the at least one action corresponds to the state of the storage condition.

9. A system for facilitating managing cloud storage for operations, the system comprising:
  a processing device configured for:
    obtaining at least one account information associated with at least one cloud account of at least one cloud platform, wherein the at least one cloud account is associated with at least one operation;
    analyzing the at least one account information using at least one machine learning model, wherein the at least one machine learning model comprises a first machine learning model, wherein the first machine learning model is configured for:

identifying at least one of a pattern, a trend, and a correlation in the at least one account information; and classifying a cloud storage resource of the at least one cloud account into one or more categories based on the identifying of at least one of the pattern, the trend, and the correlation;

obtaining one or more storage data corresponding to the one or more categories from the at least one account information based on the analyzing of the at least one account information;

determining at least one value for at least one parameter associated with a utilization of the cloud storage resource based on the one or more storage data;

determining at least one action required to be implemented for the at least one cloud account based on the determining of the at least one value of the at least one parameter; and generating at least one cloud account controlling command for implementing the at least one action for the at least one cloud account based on the at least one action;

a communication device communicatively coupled with the processing device, wherein the communication device is configured for transmitting the at least one cloud account controlling command to at least one cloud platform device associated with the at least one cloud platform; and a storage device communicatively coupled with the communication device, wherein the storage device is configured for storing the at least one account information;

the processing device being further configured for:

analyzing the one or more storage data corresponding to the one or more categories using the at least one machine learning model, wherein the at least one machine learning model further comprises a second machine learning model, wherein the second machine learning model is configured for identifying at least one of a pattern, a trend, and a correlation in the one or more storage data;

predicting at least one predictive value for the at least one parameter based on the analyzing of the one or more storage data;

analyzing the at least one value of the at least one parameter and the at least one predictive value of the at least one parameter based on at least one constraint of an allocation of the cloud storage resource, wherein the determining of the at least one action for the at least one cloud account is further based on the analyzing of the at least one value of the at least one parameter and the at least one predictive value of the at least one parameter;

analyzing the at least one constraint;

determining at least one threshold value for the at least one parameter based on the analyzing of the at least one constraint;

analyzing the at least one value of the at least one parameter and the at least one threshold value of the at least one parameter; and determining a level of the utilization of the cloud storage resource based on the analyzing of the at least one value of the at least one parameter and the at least one threshold value of the at least one parameter, wherein the determining of the at least one action required to be implemented for the at least one cloud account is further based on the level of the utilization.

10. The system of claim 9, wherein the first machine learning model is further configured for:

optimizing at least one initial classification criterion based on at least one of the pattern, the trend, and the correlation; and determining at least one classification criterion based on the optimizing of the at least one initial classification criterion, wherein the classifying of the cloud storage resource into the one or more categories is further based on the at least one classification criterion.

11. The system of claim 9, wherein the processing device is further configured for:

generating an alert corresponding to the level of utilization based on the determining of the level of the utilization and the determining of the at least one action, wherein the alert comprises a request for an approval for the implementing of the at least one action;

analyzing at least one response; and validating the approval from the implementing of the at least one action based on the analyzing of the at least one response, wherein the generating of the at least one cloud account controlling command is further based on the validating, wherein the communication device is further configured for:

transmitting the alert to at least one device; and receiving the at least one response for the approval from the at least one device.

12. The system of claim 9, wherein the processing device is further configured for:

obtaining at least one initial value of the at least one parameter;

analyzing the at least one initial value of the at least one parameter based on the at least one constraint of the allocation of the cloud storage resource; and determining an adjustment required in the at least one constraint associated with the allocation of the cloud storage resource based on the analyzing of the at least one initial value of the at least one parameter and the analyzing of the at least one value of the at least one parameter and the at least one predictive value of the at least one parameter, wherein the determining of the at least one action is further based on the adjustment.

13. The system of claim 11, wherein the processing device is further configured for:

obtaining at least one data associated with the at least one operation;

analyzing the at least one data; and determining the at least one constraint associated with the allocation of the cloud storage resource based on the analyzing of the at least one data, wherein the analyzing of the at least one initial value of the at least one parameter is based on the determining of the at least one constraint, wherein the analyzing of the at least one value of the at least one parameter and the at least one predictive value of the at least one parameter is based on the determining of the at least one constraint.

14. The system of claim 9, wherein the processing device is further configured for:

analyzing the one or more storage data using the at least one machine learning model, wherein the at least one machine learning model comprises a third machine learning model, wherein the third machine learning model is configured for identifying at least one of a pattern, a trend, and a correlation in the one or more storage data;

determining a characteristic of at least a portion the one or more storage data corresponding to the one or more categories based on the analyzing of the one or more storage data;

obtaining at least one policy associated with the at least one operation;

analyzing the at least one policy and the characteristic of at least the portion of the one or more storage data; and determining at least one data operation required to be performed on at least one of the one or more data based on the analyzing of the at least one policy and the characteristic of at least the portion of the one or more storage data, wherein the generating of the at least one action is further based on the at least one data operation.

15. The system of claim 9, wherein the processing device is further configured for:

obtaining at least one first account information associated with the at least one cloud account after the implementing of the at least one action;

analyzing the at least one first account information; and adjusting at least one variable associated with the at least one machine learning model for optimizing the at least one machine learning model based on the analyzing of the at least one first account information.

16. The system of claim 9, wherein the processing device is further configured for:

obtaining at least one policy associated with the at least operation;

analyzing the one or more storage data corresponding to the one or more categories based on the at least one policy; and determining a state of the storage resource from a plurality of states of the storage resource based on the analyzing of the one or more storage data corresponding to the one or more categories, wherein the determining of the at least one action is further based on the state of the storage resource, wherein the at least one action corresponds to the state of the storage condition.

* * * * *